United States Patent
Khoshnevisan et al.

(10) Patent No.: US 11,641,655 B2
(45) Date of Patent: May 2, 2023

(54) REFERENCE SIGNAL PORT MAPPING FOR CONTROL CHANNELS

(71) Applicant: QUALCOMM Incorporated, San Diego, CA (US)

(72) Inventors: Mostafa Khoshnevisan, San Diego, CA (US); Tao Luo, San Diego, CA (US); Xiaoxia Zhang, San Diego, CA (US); Jing Sun, San Diego, CA (US); Sungwoo Park, Seoul (KR); Arumugam Chendamarai Kannan, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 17/174,242

(22) Filed: Feb. 11, 2021

(65) Prior Publication Data

US 2021/0258928 A1     Aug. 19, 2021

Related U.S. Application Data

(60) Provisional application No. 62/976,178, filed on Feb. 13, 2020.

(51) Int. Cl.
*H04W 72/04* (2009.01)
*H04L 5/00* (2006.01)
*H04B 7/08* (2006.01)

(52) U.S. Cl.
CPC ........ *H04W 72/042* (2013.01); *H04B 7/0842* (2013.01); *H04L 5/0048* (2013.01); *H04L 5/0007* (2013.01)

(58) Field of Classification Search
CPC ... H04W 72/042; H04B 7/0842; H04L 5/0048
See application file for complete search history.

(56) References Cited

U.S. PATENT DOCUMENTS

| 9,648,588 B2* | 5/2017 | Kim ..................... H04L 5/0023 |
| 2021/0226754 A1* | 7/2021 | Khoshnevisan ...... H04L 5/0051 |

* cited by examiner

*Primary Examiner* — Ronald B Abelson
(74) *Attorney, Agent, or Firm* — Holland & Hart LLP

(57) ABSTRACT

Methods, systems, and devices for wireless communications are described. A user equipment (UE) may receive a configuration message indicating that a control resource set for a downlink control channel is associated with a plurality of demodulation reference signal (DMRS) ports. The UE may determine, based at least in part on the configuration message, that a first set of DMRS resource elements in a first symbol of the control resource set correspond to a first DMRS port of the plurality of DMRS ports and a second set of DMRS resource elements in a second symbol of the control resource set correspond to a second DMRS port of the plurality of DMRS ports. The UE may decode the downlink control channel based at least in part on the determining.

29 Claims, 25 Drawing Sheets

REFERENCE SIGNAL PORT MAPPING FOR CONTROL CHANNELS

CROSS REFERENCE

The present Application for patent claims the benefit of U.S. Provisional Patent Application No. 62/976,178 by KHOSHNEVISAN et al., entitled "REFERENCE SIGNAL PORT MAPPING FOR CONTROL CHANNELS," filed Feb. 13, 2020, assigned to the assignee hereof, and expressly incorporated by reference herein.

FIELD OF TECHNOLOGY

The following relates generally to wireless communications and more specifically to reference signal port mapping for control channels.

BACKGROUND

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communication systems, a device may attempt to decode (e.g., blind decode) a control channel (e.g., a physical downlink control channel (PDCCH)). The device may attempt to decode the control channel based on a configured control resource set (CORESET) and may perform channel estimation based on decoding the control channel to identify channel characteristics associated with the control channel. In some cases, the device may attempt to decode and perform channel estimation of the control channel based on a transmission configuration indicator (TCI) state associated with the control channel. For example, the control channel may be associated with a TCI state, which may provide quasi-colocation (QCL) information associated with one or more reference signals. The device may use the QCL information associated with the one or more reference signals to decode and perform channel estimation of the control channel. However, in some cases, the QCL information provided by a single TCI may be insufficient (e.g., when the control channel is associated with a poor channel quality).

SUMMARY

The described techniques relate to improved methods, systems, devices, and apparatuses that support reference signal port mapping for control channels. Generally, the described techniques provide various mechanisms for enhancing diversity and reliability and to enable a more robust communications system. To achieve such improvements, a downlink control channel (e.g., a physical downlink control channel (PDCCH)) may be configured to support multiple transmission configuration indicator (TCI) states. For example, two TCI states may be configured for a control resource set (CORESET) associated with the PDCCH. A CORESET may include one or more resource elements (REs) that may be used to transmit demodulation reference signals (DMRSs) and other REs used to transmit coded bits of downlink control information (DCI). In some cases, spatial division multiplexing (SDM) may be used to enable the plurality of TCI states for a CORESET. As such, multiple (e.g., two or more) DMRS ports may be enabled for a PDCCH. As described herein, a memory may be coupled (e.g., communicatively, electronically, operatively, etc.) with one or more processors.

In one non-limiting example of the described techniques, a base station may identify or otherwise determine the plurality of TCI states for a CORESET for a user equipment (UE). The base station may configure the CORESET such that a first set of REs in a first symbol of the CORESET correspond to a first DMRS port associated with a first TCI state and a second set of REs in the second symbol of the CORESET correspond to a second DMRS port associated with the second TCI state. That is, in some examples the first set of REs in the first symbol and the second set of REs in the second symbol may be the same (e.g., occupy the same subcarriers in the frequency domain). The base station may transmit a configuration message to the UE to carry or otherwise convey the indication of the configured CORESET having the plurality of TCI states. The UE may receive the configuration message, identify its CORESET configuration, and use this information for receiving and decoding the PDCCH from the base station.

In another non-limiting example, the UE may be configured with no DMRS in some REs of one or more resource element groups (REGs). For example, the base station may identify or otherwise determine a first TCI state for a first UE and a second TCI state for a second UE. The base station may configure the CORESET for each UE such that the first set of REs in a first symbol of the CORESET correspond to the first TCI state and the second set of REs in the second symbol of the CORESET correspond to the second set TCI state. The base station may transmit a first configuration message to the first UE identifying or otherwise conveying an indication that the first set of REs (e.g., DMRS REs) in the first symbol correspond to the first TCI state and that the second set of REs corresponding to the second TCI state are empty (e.g., from the perspective of the first UE). The base station may transmit a second configuration message to the second UE indicating that the second set of REs (e.g., DMRS REs) in the second symbol correspond to the second TCI state and that the first set of REs are empty (e.g., from the perspective of the second UE). The first UE may receive the first configuration message and identify or otherwise determine that the first set of REs of the CORESET are associated with the first TCI state and that the second set of REs, corresponding to the first set of REs, (e.g., the same REs in the frequency domain) in the second symbol of the CORESET are empty. Similarly, the second UE may receive the second configuration message and identify or otherwise determine that the second set of REs of the CORESET are associated with the second TCI state and that the first set of REs corresponding to the second set of REs (e.g., the same REs in the frequency domain) in the first symbol of the CORESET are empty. Accordingly, the first and second UE may each decode their corresponding PDCCH according to the configuration messages (e.g., based on their configured CORESET). In some aspects, this may include each UE rate matching around the empty REs when decoding control information in the surrounding control REs.

In yet another non-limiting example, the base station may determine or otherwise identify a plurality of TCI states for a CORESET for a PDCCH for a UE to monitor. The base station may identify or otherwise determine a set of control elements (e.g., control channel elements (CCEs)) for the CORESET based on a weighting factor and the plurality of TCI states. That is, the base station may apply the weighting factor to CCEs associated with a multi-TCI state CORESET configuration to offset for decoding complexity in that situation. This may reduce the total number of CCEs available for configuration for the UE, but account for the increased complexity. The base station may transmit or otherwise convey a configuration message to the UE indicating the set of control elements (e.g., the CORESET configuration). The UE may receive the configuration message from the base station indicating that the CORESET for a PDCCH is associated with the plurality of reference signal ports (e.g., DMRS ports). The UE may determine a set of candidates for the PDCCH based on the weighting factor and number of control elements associated with the plurality of reference signal ports. The UE may monitor the set of candidates within a search space for the PDCCH accordingly.

A method of wireless communications at a UE is described. The method may include receiving a configuration message indicating that a CORESET for a downlink control channel is associated with a set of DMRS ports, determining, based on the configuration message, that a first set of DMRS resource elements in a first symbol of the CORESET correspond to a first DMRS port of the plurality of DMRS ports and a second set of DMRS resource elements in a second symbol of the CORESET correspond to a second DMRS port of the plurality of DMRS ports, and decoding the downlink control channel based on the determining.

An apparatus for wireless communications at a UE is described. The apparatus may include a processor, memory coupled with the processor, and instructions stored in the memory. The instructions may be executable by the processor to cause the apparatus to receive a configuration message indicating that a CORESET for a downlink control channel is associated with a set of DMRS ports, determine, based on the configuration message, that a first set of DMRS resource elements in a first symbol of the CORESET correspond to a first DMRS port of the plurality of DMRS ports and a second set of DMRS resource elements in a second symbol of the CORESET correspond to a second DMRS port of the plurality of DMRS ports, and decode the downlink control channel based on the determining.

Another apparatus for wireless communications at a UE is described. The apparatus may include means for receiving a configuration message indicating that a CORESET for a downlink control channel is associated with a set of DMRS ports, determining, based on the configuration message, that a first set of DMRS resource elements in a first symbol of the CORESET correspond to a first DMRS port of the plurality of DMRS ports and a second set of DMRS resource elements in a second symbol of the CORESET correspond to a second DMRS port of the plurality of DMRS ports, and decoding the downlink control channel based on the determining.

A non-transitory computer-readable medium storing code for wireless communications at a UE is described. The code may include instructions executable by a processor to receive a configuration message indicating that a CORESET for a downlink control channel is associated with a set of DMRS ports, determine, based on the configuration message, that a first set of DMRS resource elements in a first symbol of the CORESET correspond to a first DMRS port of the plurality of DMRS ports and a second set of DMRS resource elements in a second symbol of the CORESET correspond to a second DMRS port of the plurality of DMRS ports, and decode the downlink control channel based on the determining.

Some examples of the method, apparatuses, and non-transitory computer-readable medium described herein may further include operations, features, means, or instructions for determining, based on the configuration message, that a set of control resource elements within the first symbol or the second symbol of the CORESET correspond to both the first DMRS port associated with a first layer and the second DMRS port associated with a second layer.

Some examples of the method, apparatuses, and non-transitory computer-readable medium described herein may further include operations, features, means, or instructions for determining, based on the configuration message, that a set of control resource elements within the first symbol or the second symbol of the CORESET correspond to both a first TCI state and a second TCI state.

Some examples of the method, apparatuses, and non-transitory computer-readable medium described herein may further include operations, features, means, or instructions for determining, based on the configuration message, that a first pattern of the first set of DMRS resource elements may be the same across a first set of resource blocks of the first symbol of the CORESET and that a second pattern of the second DMRS resource elements is the same across a second set of resource blocks of the second symbol of the CORESET.

In some examples of the method, apparatuses, and non-transitory computer-readable medium described herein, the first set of resource blocks includes all resource blocks of the first symbol allocated for the CORESET and the second set of resource blocks comprise all resource blocs of the second symbol allocated to the CORESET.

In some examples of the method, apparatuses, and non-transitory computer-readable medium described herein, the first DMRS port corresponds to a first layer, and the second DMRS port corresponds to a second layer.

Some examples of the method, apparatuses, and non-transitory computer-readable medium described herein may further include operations, features, means, or instructions for determining, based on the configuration message, that a third set of DMRS resource elements in a third symbol of the CORESET correspond to one of the first DMRS port or the second DMRS port.

Some examples of the method, apparatuses, and non-transitory computer-readable medium described herein may further include operations, features, means, or instructions for determining, based on the configuration message, that a third set of DMRS resource elements in the first symbol of the CORESET correspond to the second DMRS port, and determining, based on the configuration message, that a fourth set of DMRS resource elements in the second symbol of the CORESET correspond to the first DMRS port.

Some examples of the method, apparatuses, and non-transitory computer-readable medium described herein may further include operations, features, means, or instructions for resourcing blocks that contain the third set of DMRS resource elements may be different from resource blocks that contain the first set of DMRS resource elements.

In some examples of the method, apparatuses, and non-transitory computer-readable medium described herein, the fourth set of DMRS resource elements may be associated with a resource block different from the second set of DMRS resource elements.

In some examples of the method, apparatuses, and non-transitory computer-readable medium described herein, receiving the configuration message may include operations, features, means, or instructions for receiving the configuration message via radio resource control (RRC) signaling.

In some examples of the method, apparatuses, and non-transitory computer-readable medium described herein, the first and second symbols may be orthogonal frequency division multiplexing symbols.

In some examples of the method, apparatuses, and non-transitory computer-readable medium described herein, the first DMRS port is associated with a first TCI state and the second DMRS port is associated with a second TCI state.

A method of wireless communications at a base station is described. The method may include determining a set of TCI states for a CORESET for a downlink control channel for a UE, determining a configuration for the CORESET such that a first set of DMRS resource elements in a first symbol of the CORESET correspond to a first DMRS port associated with a first TCI state of the set of TCI states and a second set of DMRS resource elements in a second symbol of the CORESET correspond to a second DMRS port associated with a second TCI state of the set of TCI states, and transmitting, to the UE, a configuration message indicating the configuration for the CORESET.

An apparatus for wireless communications at a base station is described. The apparatus may include a processor, memory coupled with the processor, and instructions stored in the memory. The instructions may be executable by the processor to cause the apparatus to determine a set of TCI states for a CORESET for a downlink control channel for a UE, determine a configuration for the CORESET such that a first set of DMRS resource elements in a first symbol of the CORESET correspond to a first DMRS port associated with a first TCI state of the set of TCI states and a second set of DMRS resource elements in a second symbol of the CORESET correspond to a second DMRS port associated with a second TCI state of the set of TCI states, and transmit, to the UE, a configuration message indicating the configuration for the CORESET.

Another apparatus for wireless communications at a base station is described. The apparatus may include means for determining a set of TCI states for a CORESET for a downlink control channel for a UE, determining a configuration for the CORESET such that a first set of DMRS resource elements in a first symbol of the CORESET correspond to a first DMRS port associated with a first TCI state of the set of TCI states and a second set of DMRS resource elements in a second symbol of the CORESET correspond to a second DMRS port associated with a second TCI state of the set of TCI states, and transmitting, to the UE, a configuration message indicating the configuration for the CORESET.

A non-transitory computer-readable medium storing code for wireless communications at a base station is described. The code may include instructions executable by a processor to determine a set of TCI states for a CORESET for a downlink control channel for a UE, determine a configuration for the CORESET such that a first set of DMRS resource elements in a first symbol of the CORESET correspond to a first DMRS port associated with a first TCI state of the set of TCI states and a second set of DMRS resource elements in a second symbol of the CORESET correspond to a second DMRS port associated with a second TCI state of the set of TCI states, and transmit, to the UE, a configuration message indicating the configuration for the CORESET.

Some examples of the method, apparatuses, and non-transitory computer-readable medium described herein may further include operations, features, means, or instructions for configuring a set of control resource elements within the first symbol or the second symbol of the CORESET to correspond to both the first DMRS port associated with a first layer and the second DMRS port associated with a second layer.

Some examples of the method, apparatuses, and non-transitory computer-readable medium described herein may further include operations, features, means, or instructions for configuring a set of control resource elements within the first symbol or the second symbol of the CORESET to correspond to both the first TCI state and the second TCI state.

Some examples of the method, apparatuses, and non-transitory computer-readable medium described herein may further include operations, features, means, or instructions for configuring a pattern of the first set of DMRS resource elements to be the same across a set of resource blocks of the first symbol of the CORESET.

Some examples of the method, apparatuses, and non-transitory computer-readable medium described herein may further include operations, features, means, or instructions for configuring a pattern of the second set of DMRS resource elements to be the same across a set of resource blocks of the second symbol of the CORESET.

Some examples of the method, apparatuses, and non-transitory computer-readable medium described herein may further include operations, features, means, or instructions for configuring a third set of DMRS resource elements in a third symbol of the CORESET to correspond to one of the first TCI state or the second TCI state.

Some examples of the method, apparatuses, and non-transitory computer-readable medium described herein may further include operations, features, means, or instructions for configuring a third set of DMRS resource elements in the first symbol of the CORESET to correspond to the second TCI state, and configuring a fourth set of DMRS resource elements in the second symbol of the CORESET to correspond to the first TCI state.

In some examples of the method, apparatuses, and non-transitory computer-readable medium described herein, the third set of DMRS resource elements may be associated with a resource block different from the first set of DMRS resource elements.

In some examples of the method, apparatuses, and non-transitory computer-readable medium described herein, the fourth set of DMRS resource elements may be associated with a resource block different from the second set of DMRS resource elements.

Some examples of the method, apparatuses, and non-transitory computer-readable medium described herein may further include operations, features, means, or instructions for transmitting the configuration message via RRC signaling.

In some examples of the method, apparatuses, and non-transitory computer-readable medium described herein, the first and second symbols may be orthogonal frequency division multiplexing symbols.

A method of wireless communications at a UE is described. The method may include receiving a configuration message indicating that a CORESET for a downlink control channel is associated with a TCI state for the UE, determining, based on the configuration message, that a first set of DMRS resource elements in a first symbol of the CORESET correspond to a first DMRS port associated with a first TCI state and that a second set of DMRS resource elements, corresponding to the first set of DMRS resource elements, in a second symbol of the CORESET are empty, and decoding the downlink control channel based on the determining.

An apparatus for wireless communications at a UE is described. The apparatus may include a processor, memory coupled with the processor, and instructions stored in the memory. The instructions may be executable by the processor to cause the apparatus to receive a configuration message indicating that a CORESET for a downlink control channel is associated with a TCI state for the UE, determine, based on the configuration message, that a first set of DMRS resource elements in a first symbol of the CORESET correspond to a first DMRS port associated with a first TCI state and that a second set of DMRS resource elements, corresponding to the first set of DMRS resource elements, in a second symbol of the CORESET are empty, and decode the downlink control channel based on the determining.

Another apparatus for wireless communications at a UE is described. The apparatus may include means for receiving a configuration message indicating that a CORESET for a downlink control channel is associated with a TCI state for the UE, determining, based on the configuration message, that a first set of DMRS resource elements in a first symbol of the CORESET correspond to a first DMRS port associated with a first TCI state and that a second set of DMRS resource elements, corresponding to the first set of DMRS resource elements, in a second symbol of the CORESET are empty, and decoding the downlink control channel based on the determining.

A non-transitory computer-readable medium storing code for wireless communications at a UE is described. The code may include instructions executable by a processor to receive a configuration message indicating that a CORESET for a downlink control channel is associated with a TCI state for the UE, determine, based on the configuration message, that a first set of DMRS resource elements in a first symbol of the CORESET correspond to a first DMRS port associated with a first TCI state and that a second set of DMRS resource elements, corresponding to the first set of DMRS resource elements, in a second symbol of the CORESET are empty, and decode the downlink control channel based on the determining.

In some examples of the method, apparatuses, and non-transitory computer-readable medium described herein, decoding the downlink control channel may include operations, features, means, or instructions for rate-matching around the second set of DMRS resource elements in the second symbol of the CORESET.

Some examples of the method, apparatuses, and non-transitory computer-readable medium described herein may further include operations, features, means, or instructions for determining, based on the configuration message, that a set of control resource elements within the first symbol of the CORESET may be associated with the first TCI state and the first DMRS port, where the set of control resource elements and the first set of DMRS resource elements may be non-overlapping.

Some examples of the method, apparatuses, and non-transitory computer-readable medium described herein may further include operations, features, means, or instructions for determining, based on the configuration message, that a set of control resource elements within the second symbol of the CORESET may be associated with the first TCI state and the first DMRS port, where the set of control resource elements and the second set of DMRS resource elements may be non-overlapping.

Some examples of the method, apparatuses, and non-transitory computer-readable medium described herein may further include operations, features, means, or instructions for determining, based on the configuration message, that the first set of DMRS resource elements correspond to the first DMRS port associated with the first TCI state.

In some examples of the method, apparatuses, and non-transitory computer-readable medium described herein, the first DMRS port corresponds to a first layer.

Some examples of the method, apparatuses, and non-transitory computer-readable medium described herein may further include operations, features, means, or instructions for determining, based on the configuration message, that a pattern of the first set of DMRS resource elements may be the same across a set of resource blocks of the first symbol of the CORESET.

Some examples of the method, apparatuses, and non-transitory computer-readable medium described herein may further include operations, features, means, or instructions for receiving the configuration message via RRC signaling.

In some examples of the method, apparatuses, and non-transitory computer-readable medium described herein, the first and second symbols may be orthogonal frequency division multiplexing symbols.

A method of wireless communications at a base station is described. The method may include determining a first TCI state for a first UE and a second TCI state for a second UE, configuring a set of CORESETs such that a first set of resource elements in a first symbol of the set of CORESETs correspond to the first TCI state and a second set of resource elements in a second symbol of the set of CORESETs correspond to the second TCI state, transmitting, to the first UE, a first configuration message indicating that the first set of resource elements in the first symbol correspond to the first TCI state and that the second set of resource elements are empty, and transmitting, to the second UE, a second configuration message indicating that the second set of resource elements in the second symbol correspond to the second TCI state and that the first set of resource elements are empty.

An apparatus for wireless communications at a base station is described. The apparatus may include a processor, memory coupled with the processor, and instructions stored in the memory. The instructions may be executable by the processor to cause the apparatus to determine a first TCI state for a first UE and a second TCI state for a second UE, configure a set of CORESETs such that a first set of resource elements in a first symbol of the set of CORESETs correspond to the first TCI state and a second set of resource elements in a second symbol of the set of CORESETs correspond to the second TCI state, transmit, to the first UE, a first configuration message indicating that the first set of resource elements in the first symbol correspond to the first TCI state and that the second set of resource elements are empty, and transmit, to the second UE, a second configuration message indicating that the second set of resource elements in the second symbol correspond to the second TCI state and that the first set of resource elements are empty.

Another apparatus for wireless communications at a base station is described. The apparatus may include means for determining a first TCI state for a first UE and a second TCI state for a second UE, configuring a set of CORESETs such that a first set of resource elements in a first symbol of the set of CORESETs correspond to the first TCI state and a second set of resource elements in a second symbol of the set of CORESETs correspond to the second TCI state, transmitting, to the first UE, a first configuration message indicating that the first set of resource elements in the first symbol correspond to the first TCI state and that the second set of resource elements are empty, and transmitting, to the second UE, a second configuration message indicating that the second set of resource elements in the second symbol correspond to the second TCI state and that the first set of resource elements are empty.

A non-transitory computer-readable medium storing code for wireless communications at a base station is described. The code may include instructions executable by a processor to determine a first TCI state for a first UE and a second TCI state for a second UE, configure a set of CORESETs such that a first set of resource elements in a first symbol of the set of CORESETs correspond to the first TCI state and a second set of resource elements in a second symbol of the set of CORESETs correspond to the second TCI state, transmit, to the first UE, a first configuration message indicating that the first set of resource elements in the first symbol correspond to the first TCI state and that the second set of resource elements are empty, and transmit, to the second UE, a second configuration message indicating that the second set of resource elements in the second symbol correspond to the second TCI state and that the first set of resource elements are empty.

Some examples of the method, apparatuses, and non-transitory computer-readable medium described herein may further include operations, features, means, or instructions for performing rate-matching around the second set of resource elements for a downlink control channel for the first UE.

Some examples of the method, apparatuses, and non-transitory computer-readable medium described herein may further include operations, features, means, or instructions for performing rate-matching around the first set of resource elements for a downlink control channel for the second UE.

Some examples of the method, apparatuses, and non-transitory computer-readable medium described herein may further include operations, features, means, or instructions for configuring the first set of resource elements for a first DMRS port associated with the first TCI state, and configuring the second set of resource elements for a second DMRS port associated with the second TCI state.

Some examples of the method, apparatuses, and non-transitory computer-readable medium described herein may further include operations, features, means, or instructions for transmitting the first and second configuration messages via RRC signaling.

In some examples of the method, apparatuses, and non-transitory computer-readable medium described herein, the first and second symbols may be orthogonal frequency division multiplexing symbols.

A method of wireless communications at a UE is described. The method may include receiving, from a base station, a configuration message indicating that a CORESET for a downlink control channel is associated with a set of reference signal ports, determining a number of control channel candidates limit or a number of control channel element limit for the downlink control channel based on the configuration message, counting a number of monitored control channel candidates or non-overlapped control channel elements based on a weighting factor and a number of the plurality of reference signal ports of the CORESET, and monitoring one or more search space sets for the downlink control channel based on the determining.

An apparatus for wireless communications at a UE is described. The apparatus may include a processor, memory coupled with the processor, and instructions stored in the memory. The instructions may be executable by the processor to cause the apparatus to receive, from a base station, a configuration message indicating that a CORESET for a downlink control channel is associated with a set of reference signal ports, determine a number of control channel candidates limit or a number of control channel element limit for the downlink control channel based on the configuration message, count a number of monitored control channel candidates or non-overlapped control channel elements based on a weighting factor and a number of the set of reference signal ports of the CORESET, and monitor one or more search space sets for the downlink control channel based on the determining.

Another apparatus for wireless communications at a UE is described. The apparatus may include means for receiving, from a base station, a configuration message indicating that a CORESET for a downlink control channel is associated with a set of reference signal ports, determining a number of control channel candidates limit or a number of control channel element limit for the downlink control channel based on the configuration message, counting a number of monitored control channel candidates or non-overlapped control channel elements based on a weighting factor and a number of the set of reference signal ports of the CORESET, and monitoring one or more search space sets for the downlink control channel based on the determining.

A non-transitory computer-readable medium storing code for wireless communications at a UE is described. The code may include instructions executable by a processor to receive, from a base station, a configuration message indicating that a CORESET for a downlink control channel is associated with a set of reference signal ports, determine a number of control channel candidates limit or a number of control channel element limit for the downlink control channel based on the configuration message, count a number of monitored control channel candidates or non-overlapped control channel elements based on a weighting factor and a number of the set of reference signal ports of the CORESET, and monitor one or more search space sets for the downlink control channel based on the determining.

In some examples of the method, apparatuses, and non-transitory computer-readable medium described herein, counting may include operations, features, means, or instructions for multiplying the weighting factor with the number of monitored control channel candidates or the number of non-overlapped control channel elements.

Some examples of the method, apparatuses, and non-transitory computer-readable medium described herein may further include operations, features, means, or instructions for determining that the CORESET may be associated with a single DMRS port, and determining the weighting factor to be a value of 1 based on determining that the CORESET may be associated with the single DMRS port.

Some examples of the method, apparatuses, and non-transitory computer-readable medium described herein may further include operations, features, means, or instructions for determining that the CORESET may be associated with multiple DMRS ports, and determining the weighting factor to be a value greater than 1 based on determining that the CORESET may be associated with multiple DMRS ports.

Some examples of the method, apparatuses, and non-transitory computer-readable medium described herein may further include operations, features, means, or instructions for transmitting an indication of a capability of the UE to the base station, and receiving an indication of the weighting factor from the base station, where the weighting factor may be based on the capability of the UE.

Some examples of the method, apparatuses, and non-transitory computer-readable medium described herein may further include operations, features, means, or instructions for determining whether the set of reference signal ports correspond to the same or different TCI states, and determining the weighting factor based on whether the set of reference signal ports correspond to the same or different TCI states.

Some examples of the method, apparatuses, and non-transitory computer-readable medium described herein may further include operations, features, means, or instructions for determining whether the set of reference signal ports correspond to one or multiple TCI states, and determining the weighting factor based on whether the set of reference signal ports correspond to one or multiple TCI states.

A method of wireless communications at a base station is described. The method may include determining a set of TCI states for a CORESET for a downlink control channel for a UE, determining a number of control channel candidates or a control channel element limit for the downlink control channel based on a weighting factor and the set of TCI states, and transmitting, to the UE, a configuration message indicating a set of control elements for the CORESET based on the number of control channel candidates or the control channel element limit for the downlink control channel.

An apparatus for wireless communications at a base station is described. The apparatus may include a processor, memory coupled with the processor, and instructions stored in the memory. The instructions may be executable by the processor to cause the apparatus to determine a set of TCI states for a CORESET for a downlink control channel for a UE, determine a number of control channel candidates or a control channel element limit for the downlink control channel based on a weighting factor and the set of TCI states, and transmit, to the UE, a configuration message indicating a set of control elements for the CORESET based on the number of control channel candidates or the control channel element limit for the downlink control channel.

Another apparatus for wireless communications at a base station is described. The apparatus may include means for determining a set of TCI states for a CORESET for a downlink control channel for a UE, determining a number of control channel candidates or a control channel element limit for the downlink control channel based on a weighting factor and the set of TCI states, and transmitting, to the UE, a configuration message indicating a set of control elements for the CORESET based on the number of control channel candidates or the control channel element limit for the downlink control channel.

A non-transitory computer-readable medium storing code for wireless communications at a base station is described. The code may include instructions executable by a processor to determine a set of TCI states for a CORESET for a downlink control channel for a UE, determine a number of control channel candidates or a control channel element limit for the downlink control channel based on a weighting factor and the set of TCI states, and transmit, to the UE, a configuration message indicating a set of control elements for the CORESET based on the number of control channel candidates or the control channel element limit for the downlink control channel.

Some examples of the method, apparatuses, and non-transitory computer-readable medium described herein may further include operations, features, means, or instructions for determining that the CORESET may be associated with a single DMRS port, and determining the weighting factor to be a value of 1 based on determining that the CORESET may be associated with the single DMRS port.

Some examples of the method, apparatuses, and non-transitory computer-readable medium described herein may further include operations, features, means, or instructions for determining that the CORESET may be associated with multiple DMRS ports, and determining the weighting factor to be a value greater than 1 based on determining that the CORESET may be associated with multiple DMRS ports.

Some examples of the method, apparatuses, and non-transitory computer-readable medium described herein may further include operations, features, means, or instructions for receiving an indication of a capability of the UE from the UE, and determining the weighting factor based on the capability of the UE.

Some examples of the method, apparatuses, and non-transitory computer-readable medium described herein may further include operations, features, means, or instructions for transmitting an indication of the weighting factor to the UE.

DETAILED DESCRIPTION

Figure 1:
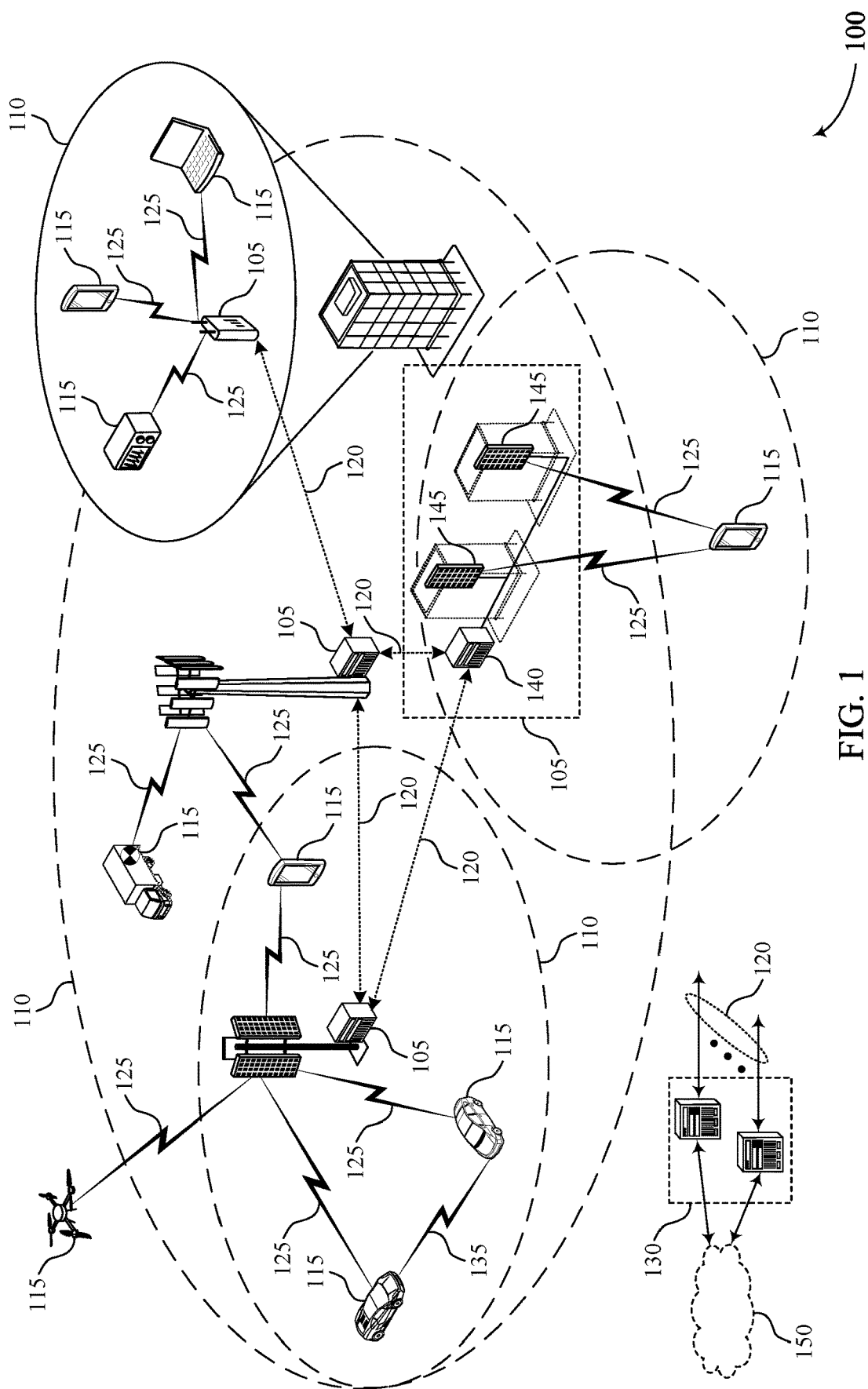
FIG. 1 illustrates an example of a system for wireless communications that supports reference signal port mapping for control channels in accordance with aspects of the present disclosure.

As demand for communication resources increases due to an increasing number of wireless devices communicating over the available spectrum, techniques to efficiently and reliably increase throughput are desirable. In some cases, the overall reliability of a wireless communication system may depend on the reliability of a number of different communication channels. For example, a wireless device, such as a user equipment (UE), may receive downlink data transmissions from a base station over a downlink data channel (e.g., a physical downlink shared channel (PDSCH)) and downlink control transmissions over a downlink control channel (e.g., a physical downlink control channel (PDCCH)) and the overall system reliability may depend on the reliability of both channels. In some cases, the reliability of the channels may be associated with a diversity of the channels. Accordingly, increasing the diversity of a channel may increase the reliability of the channel. In some cases, the diversity of a channel may be associated with a number of transmission configuration indicator (TCI) states associated with the channel. For instance, a downlink data channel may be configured for multi-TCI state operation such that different resources (e.g., spatial layers, resource blocks (RBs), orthogonal frequency division multiplexing (OFDM) symbols, OFDM slots, etc.) associated with the downlink data channel may be associated with different TCI states. In some cases, downlink control information (DCI) may include a TCI field indicating the number of TCI states associated with the PDSCH. Accordingly, the PDSCH may feature enhanced diversity and reliability.

However, in some deployments, downlink control channels (e.g., resources associated with the downlink control channel) may be limited to a single TCI state with no mechanism for assigning the downlink control channel with multiple TCI states. As such, the downlink control channel may be associated with lower transmission diversity and may be less reliable than the PDSCH, which may limit the achievable efficiency and reliability of the overall wireless communication system.

Aspects of the disclosure are initially described in the context of wireless communication systems. Various implementations of the present disclosure relate generally to associating (e.g., defining or assigning) a plurality of TCI states to a downlink control channel. Generally, the described techniques provide various mechanisms for enhancing diversity and reliability and to enable a more robust communications system. To achieve such improvements, a downlink control channel (e.g., a PDCCH) may be configured to support multiple TCI states. For example, two TCI states may be configured for a control resource set (CORESET) associated with the PDCCH. A CORESET may include one or more resource elements (REs) that may be used to transmit demodulation reference signals (DMRSs) and other REs used to transmit coded bits of DCI. In some cases, spatial division multiplexing (SDM) may be used to enable the plurality of TCI states for a CORESET. As such, multiple (e.g., two or more) DMRS ports may be enabled for a PDCCH.

In one non-limiting example of the described techniques, a base station may identify or otherwise determine the plurality of TCI states for a CORESET for a UE. The base station may configure the CORESET such that a first set of REs in a first symbol of the CORESET correspond to a first DMRS port associated with a first TCI state and a second set of REs in the second symbol of the CORESET correspond to a second DMRS port associated with the second TCI state. That is, in some examples the first set of REs in the first symbol and the second set of REs in the second symbol may be the same (e.g., occupy the same subcarriers in the frequency domain). The base station may transmit a configuration message to the UE to carry or otherwise convey the indication of the configured CORESET having the plurality of TCI states. The UE may receive the configuration message, identify its CORESET configuration, and use this information for receiving and decoding the PDCCH from the base station.

In another non-limiting example, the UE may be configured with no DMRS in some REs of one or more resource element groups (REGs). For example, the base station may identify or otherwise determine a first TCI state for a first UE and a second TCI state for a second UE. The base station may configure the CORESET for each UE such that the first set of REs in a first symbol of the CORESET correspond to the first TCI state and the second set of REs in the second symbol of the CORESET correspond to the second set TCI state. The base station may transmit a first configuration message to the first UE identifying or otherwise conveying an indication that the first set of REs (e.g., DMRS REs) in the first symbol correspond to the first TCI state and that the second set of REs corresponding to the second TCI state are empty (e.g., from the perspective of the first UE). The base station may transmit a second configuration message to the second UE indicating that the second set of REs (e.g., DMRS REs) in the second symbol correspond to the second TCI state and that the first set of REs are empty (e.g., from the perspective of the second UE). The first UE may receive the first configuration message and identify or otherwise determine that the first set of REs of the CORESET are associated with the first TCI state and that the second set of REs, corresponding to the first set of REs (e.g., the same REs in the frequency domain), in the second symbol of the CORESET are empty. Similarly, the second UE may receive the second configuration message and identify or otherwise determine that the second set of REs of the CORESET are associated with the second TCI state and that the first set of REs corresponding to the second set of REs (e.g., the same REs in the frequency domain) in the first symbol of the CORESET are empty. Accordingly, the first and second UE may each decode their corresponding PDCCH according to the configuration messages (e.g., based on their configured CORESET). In some aspects, this may include each UE rate matching around the empty REs when decoding control information in the surrounding control REs.

In yet another non-limiting example, the base station may determine or otherwise identify a plurality of TCI states for a CORESET for a PDCCH for a UE to monitor. The base station may identify or otherwise determine a set of control elements (e.g., control channel elements (CCEs)) for the CORESET based on a weighting factor and the plurality of TCI states. That is, the base station may apply the weighting factor to CCEs associated with a multi-TCI state CORESET configuration to offset for decoding complexity in that situation. This may reduce the total number of CCEs available for configuration for the UE, but account for the increased complexity. The base station may transmit or otherwise convey a configuration message to the UE indicating the set of control elements (e.g., the CORESET configuration). The UE may receive the configuration message from the base station indicating that the CORESET for a PDCCH is associated with the plurality of reference signal ports (e.g., DMRS ports). The UE may determine a set of candidates for the PDCCH based on the weighting factor and number of control elements associated with the plurality of reference signal ports. The UE may monitor the set of candidates within a search space for the PDCCH accordingly.

Aspects of the disclosure are further illustrated by and described with reference to apparatus diagrams, system diagrams, and flowcharts that relate to reference signal port mapping for control channels.

FIG. 1 illustrates an example of a wireless communication system 100 that supports reference signal port mapping for control channels in accordance with aspects of the present disclosure. The wireless communication system 100 may include one or more base stations 105, one or more UEs 115, and a core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element (RE) may consist of one symbol period (e.g., a duration of one modulation symbol) and one subcarrier, where the symbol period and subcarrier spacing are inversely related. The number of bits carried by each RE may depend on the modulation scheme (e.g., the order of the modulation scheme, the coding rate of the modulation scheme, or both). Thus, the more REs that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

To enhance DMRS reliability and increase network robustness, a CORESET may be configured to support more than one TCI state for multi-TCI state PDCCH. In some cases, a UE may receive a configuration message that indicates that a CORESET for a PDCCH may be associated with multiple TCI states. The UE may determine that a first set of DMRS REs in a first symbol of the CORESET correspond to a first DMRS port that is associated with a first TCI state. The UE may also determine that a second set of DMRS REs in a second symbol of the CORESET correspond to a second DMRS port that is associated with a second TCI state. In some cases, the UE may determine, based on the configuration message, that a set of the CORESET elements within the first symbol or the second symbol correspond to the first DMRS port that is associated with the first layer and to the second DMRS port associated with a second layer. In some cases, the UE may determine, based on the configuration message, that a set of the CORESET elements with the first symbol or the second symbol of the CORESET correspond to both of the first TCI and the second TCI states. Additionally or alternatively, the UE may determine from the configuration message that a pattern of the first set of DMRS REs is the same across a set of resource blocks of the first symbol of the CORESET. The reference signal port mapping for control channel techniques that enable multi-TCI state PDCCH, as described herein, may enhance DMRS diversity and improve reliability.

A UE 115 may receive a configuration message indicating that a CORESET for a downlink control channel is associated with a plurality of TCI states. The UE 115 may determine, based at least in part on the configuration message, that a first set of REs in a first symbol of the CORESET correspond to a first DMRS port associated with a first TCI state and a second set of REs in a second symbol of the CORESET correspond to a second DMRS port associated with a second TCI state. The UE 115 may decode the downlink control channel based at least in part on the determining.

A base station 105 may determine a plurality of TCI states for a CORESET for a downlink control channel for a UE 115. The base station 105 may determine a configuration for the CORESET such that a first set of REs in a first symbol of the CORESET correspond to a first DMRS port associated with a first TCI state of the plurality of TCI states and a second set of REs in a second symbol of the CORESET correspond to a second DMRS port associated with a second TCI state of the plurality of TCI states. The base station 105 may transmit, to the UE 115, a configuration message indicating the configuration for the CORESET.

A UE 115 may receive a configuration message indicating that a CORESET for a downlink control channel is associated with a TCI state for the UE 115. The UE 115 may determine, based at least in part on the configuration message, that a first set of REs in a first symbol of the CORESET is associated with a first TCI state and a second set of REs, corresponding to the first set of REs, in a second symbol of the CORESET are empty. The UE 115 may decode the downlink control channel based at least in part on the determining.

A base station 105 may determine a first TCI state for a first UE 115 and a second TCI state for a second UE 115. The base station 105 may configure a CORESET such that a first set of REs in a first symbol of the CORESET correspond to the first TCI state and a second set of REs in a second symbol of the CORESET correspond to the second TCI state. The base station 105 may transmit, to the first UE 115, a first configuration message indicating that the first set of REs in the first symbol correspond to the first TCI state and that the second set of REs are empty. The base station 105 may transmit, to the second UE 115, a second configuration message indicating that the second set of REs in the second symbol correspond to the second TCI state and that the first set of REs are empty.

A UE 115 may receive, from a base station 105, a configuration message indicating that a CORESET for a downlink control channel is associated with a plurality of reference signal ports. The UE 115 may determine a set of candidates for the downlink control channel based at least in part on a weighting factor and a number of the plurality of control elements associated with the plurality of reference signal ports. The UE 115 may monitor the set of candidates within a search space for the downlink control channel based at least in part on the determining.

A base station 105 may determine a plurality of TCI states for a CORESET for a downlink control channel for a UE 115. The base station 105 may determine a set of control elements for the CORESET based at least in part on a weighting factor and the plurality of TCI states. The base station 105 may transmit, to the UE 115, a configuration message indicating the set of control elements for the CORESET.

Figure 2:
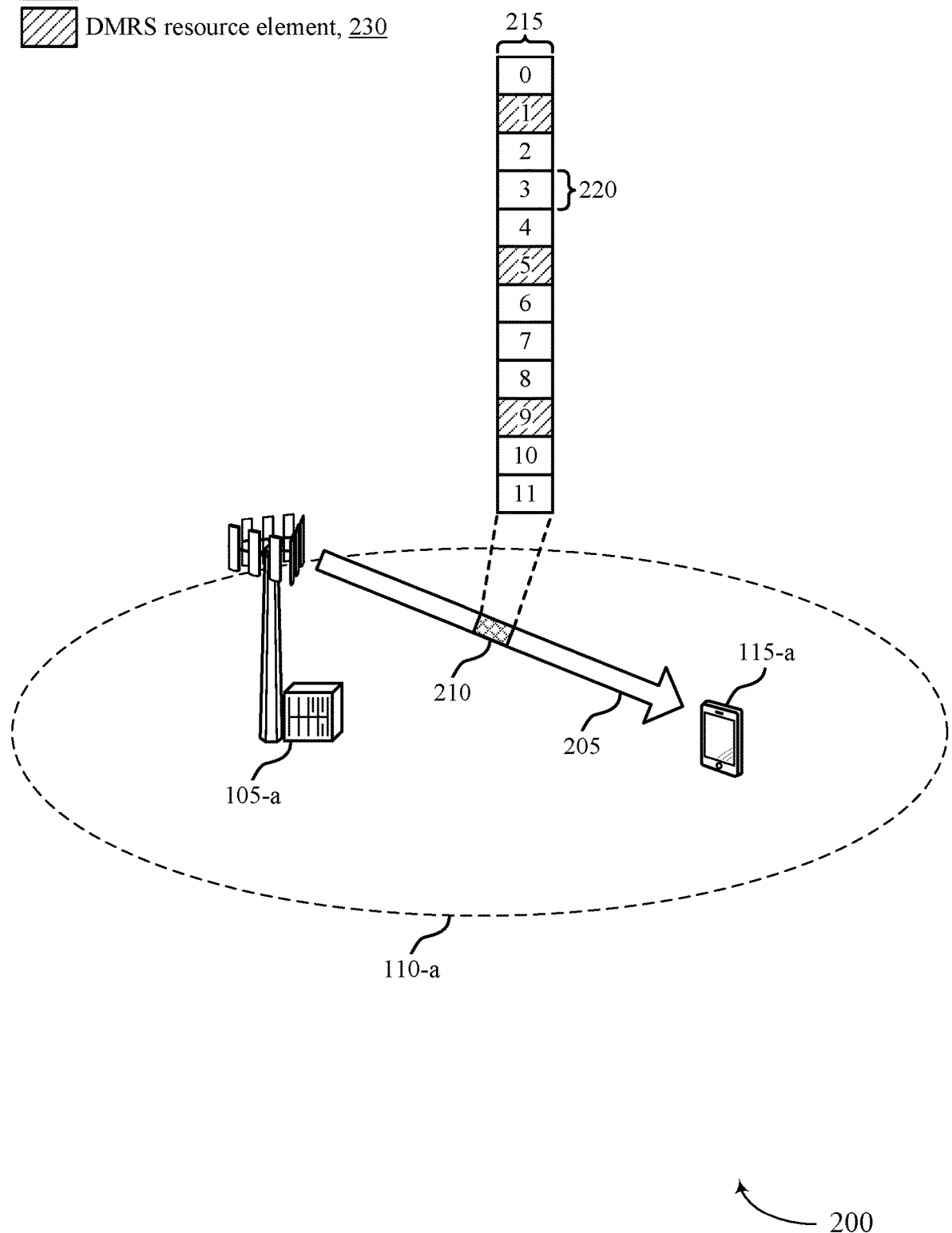
FIG. 2 illustrates an example of a system for wireless communications that supports reference signal port mapping for control channels in accordance with aspects of the present disclosure.

FIG. 2 illustrates an example of a wireless communication system 200 that supports reference signal port mapping for control channels in accordance with aspects of the present disclosure. The wireless communication system 200 may include base station 105-a and UE 115-a, which may be examples of the corresponding devices described herein. Base station 105-a may serve a geographic coverage area 110-a.

In some cases, base station 105-a may implement a reference signal port (e.g., DMRS port) mapping scheme for enabling multi-TCI state PDCCH. For example, base station 105-a may determine reference signal port mapping to support the transmission of PDCCH DMRSs over different DMRS ports and TCI states to improve DMRS/channel estimation reliability. Additionally or alternatively, other wireless devices, such as UE 115-a, may implement reference signal port mapping schemes to enable multi-TCI PDCCH.

In some wireless communication systems, a base station may transmit DCI to a UE via a PDCCH such as through downlink communication link 205. Resources such as REs may be allocated for the PDCCH. The allocated REs may be part of a CORESET 210, where a CORESET 210 may include a complete set of resources for one or more PDCCH candidates. The CORESET 210 may include one or more REGs that may include one or more REs, where each RE is one OFDM symbol 215 in the time domain by one subcarrier 220 in the frequency domain. Each REG of a CORESET 210 includes twelve REs in one OFDM symbol in a single RB. In some cases, base station 105-a may use some of the REs in a REG to transmit DMRSs (e.g., one, two, three, etc., REs used for DMRS transmissions). Base station 105-a may use the remaining REs to transmit coded bits of DCI. For example, CORESET 210 may include one or more control REs 225, and one or more DMRS REs 230. A control RE 225 may be allocated for coded DCI bits and a DMRS RE 230 may be allocated for DMRSs that the UE may use for channel estimation purposes. In some cases, DMRS REs may be allocated for certain REs, such as REs 1, 5, and 9. In such a case, the DMRS density per antenna port may be equal to ¼ (e.g., three DMRS REs of twelve total REs).

In some cases, a UE (e.g., UE 115-a) may receive scheduling parameters for a PDSCH in DCI of a PDCCH. The scheduling parameters may include a TCI field that may indicate one or more TCI states for the PDSCH. Different TCI states, distinguished by different values of the TCI field, may correspond to QCL relationships with different reference signal transmissions. For example, each TCI state may be associated with one of the previously received reference signals. The TCI state may provide a spatial QCL reference that the UE can use to set its receive beam. By configuring the TCI states at the UE, the base station can dynamically select transmit beam(s) for downlink transmission(s) to the UE, and the UE can select the corresponding receive beam(s) to receive the downlink transmission(s). For a downlink transmission, such as a PDSCH, base station 105-a may transmit an indication of the TCI state to UE 115-a, and UE 115-a may select the corresponding receive beam based on the indicated TCI state to receive the downlink transmission. The TCI states may be configured via higher layer signaling, e.g., RRC signaling, MAC-CE signaling, etc.

A multi-TCI state PDSCH may enhance diversity and reliability as compared to a single TCI state PDSCH. In some implementations, different spatial layers, RBs, or OFDM symbols or slots from PDSCH may have different TCI states which may enhance signaling diversity. In some cases, a PDCCH may be configured to support a single TCI state. In such cases, the overall reliability of the network may depend on the reliability of both downlink control channel and downlink data channel. To increase network robustness and improve reliability, a CORESET may be configured to support multi-TCI state PDCCH.

In some implementations, reference signal port mapping techniques may be applied to support the multi-TCI state PDCCH. For example, a reference signal port mapping scheme may include different TCI states within a single CORESET, where the TCI states may overlap in time and/or frequency. In some cases, multiple (e.g., two) DMRS ports may be enabled for a PDCCH. Each DMRS port may be associated with a different spatial layer. For example, a first spatial layer and a first DMRS port may be associated with a first TCI state and a second spatial layer and a second DMRS port may be associated with a second TCI state.

In some aspects, the described techniques support enablement of two orthogonal DMRS ports (and therefore enabling an SDM approach where different spatial layers of the PDCCH are transmitted with different TCI states) without the need to change the DMRS pattern. For example, aspects of the described techniques introduce two orthogonal DMRS ports for PDCCH transmissions. This may be based on a dual-layer approach corresponding to the two PDCCH DMRS ports. For example, a first spatial layer/DMRS port may be associated with a first TCI state and a second spatial layer/DMRS port may be associated with a second TCI state. The DMRS pattern within each REG may be unchanged between TCI states. For example, DMRS REs in a first set of REGs may be associated with the first DMRS port (which is itself associated with a first spatial layer/first TCI state) while DMRS REs in a second set of REGs may be associated with the second DMRS port (which is itself associated with the second spatial layer/second TCI state). In some aspects, for each REG (irrespective of the first set or second set) the control REs may consist of two layers corresponding to the first TCI state and second TCI state. The first set of REGs may correspond to REGs in the first set of OFDM symbols of the CORESET and the second set of REGs may correspond to REGs in the second set of OFDM symbols of the CORESET. This may include TDM the DMRS ports in order to enable the SDM approach. The two sets of OFDM symbols can be configured (e.g., the RRC signaling) as part of the CORESET configuration or may be based on some fixed rule (e.g., for a two-symbol CORESET, it's always the first/second symbol(s)).

In different RBs, several alternatives are available. In one alternative, the same mapping or pattern may be followed (e.g., in all RBs of the CORESET, DMRS port 0 is associated with DMRS REs in the REGs/RBs in the first set of OFDM symbols). In another alternative, the DMRS port/TCI state may be swapped in different RBs. For example, in a first set of RBs DMRS port 0 may be associated with DMRS REs in the REGs in the first set of OFDM symbols of the CORESET, while DMRS port 1 may be associated with DMRS REs in the REGs in the second set of OFDM symbols of the CORESET. In a second set of RBs, DMRS port 0 may be associated with DMRS REs in the REGs in the second set of OFDM symbols of the CORESET, while DMRS port 1 may be associated with DMRS REs in the REGs in the first set of OFDM symbols of the CORESET. The first/second set of RBs may be configured (e.g., using RRC signaling) as part of the CORESET configuration (in addition to the first/second set of OFDM symbols) or can be based on some fixed rule (e.g., first/second half of RBs).

Accordingly, base station 105-*a* may identify or otherwise determine the plurality of TCI states for a CORESET for PDCCH for UE 115-*a*. Base station 105-*a* may determine the configuration for the CORESET (e.g., the CORESET configuration) such that the first set of DMRS REs 230 in a first symbol of the CORESET correspond to a first DMRS port associated with a first TCI state and that a second set of DMRS REs 230 in a second symbol of the CORESET correspond to a second DMRS port associated with a second TCI state. The base station 105-*a* may transmit or otherwise convey an indication of the CORESET configuration to UE 115-*a* in a configuration message (e.g., RRC signaling). UE 115-*a* may receive the configuration message and determine or otherwise identify the CORESET configuration configured by base station 105-*a*. Accordingly, UE 115-*a* may receive and decode the downlink control channel (e.g., PDCCH) according to the CORESET configuration.

In other aspects of the described techniques, UE 115-*a* a be configured with no DMRS in some REGs. That is, the RE which would have been used for DMRS may be empty (e.g., no DMRS and no control RE from the perspective of UE 115-*a*). This may support orthogonal MU-MIMO across different UEs for PDCCH transmissions. In some aspects, this may not be considered SDM for a single UE, but instead may be SDM across different UEs. Each UE may be configured with only one DMRS port and one spatial layer, and one CORESET (configured per UE) has one TCI state. A set of OFDM symbols of the CORESET may be RRC configured for the UE in which the position of DMRS REs in each REG of that set of symbols are empty. The coded bits of PDCCH (e.g., control REs 225) may be rate matched around the empty REs.

Accordingly, base station 105-*a* may identify or otherwise determine a first TCI state for a first UE and a second TCI state for a second UE. Base station 105-*a* may configure the plurality of CORESETs such that a first set of REs (e.g., DMRS REs 230) in a first symbol of the plurality of CORESETs correspond to the first TCI state and a second set of REs (e.g., empty REs) in a second symbol of the plurality of CORESETs correspond to the second TCI state. Base station 105-*a* may transmit the first configuration message to a first UE (e.g., UE-115-*a*) carrying or otherwise conveying an indication that the first set of REs in the first symbol correspond to the first TCI state and that the second set of REs are empty (e.g., are blank or zero-power (ZP) DMRS REs). Base station 105-*a* may transmit a second configuration message to a second UE (not shown) carrying or otherwise conveying an indication that the second set of REs in the second symbol correspond to the second TCI state and that the first set of REs are empty (at least from the perspective of the second UE).

UE 115-*a* may receive the configuration message and identify or otherwise determine that the first set of DMRS REs in the first symbol of the CORESET correspond to the first DMRS port associated with a first TCI state and that a second set of DMRS REs in a second symbol of the CORESET are empty (e.g., ZP-DMRS REs). Accordingly, UE 115-*a* may decode the downlink control channel based on the CORESET configuration, e.g., perform channel estimation using the DRMS REs in the first symbol and rate match around the empty REs in the second symbol.

Further aspects of the described techniques relate to a blind-decoding (BD)/CCE limit configured for the UE. That is, conventionally the monitored PDCCH candidates (e.g., BD/CCE limit) for PDCCH monitoring within a given slot and for a single CC may be based on the subcarrier spacing (SCS). The generalized concept of "PDCCH monitoring span" may be defined for defining limits and a time unit smaller than the slot.

However, aspects of the described techniques may support a CORESET configured with two DMRS ports where the number of monitored PDCCH candidates or the number of monitored non-overlapped CCEs (e.g., one or more PDCCH candidates or one or more non-overlapped CCEs monitored by the UE in a search space set (SSS) associated with the CORESET) is counted as x (a weighting factor) times towards the PDCCH candidate limit or the non-overlapping CCE limits per slot (or per-PDCCH monitoring span). For example, if the UE is configured to monitor N1 CCEs with one DMRS port (e.g., in CORESET configurations with one DMRS port) and N2 CCEs with two DMRS ports (e.g., in CORESET configurations with two DMRS ports) in one slot (or one PDCCH monitoring span), then N1+x*N2 should be less than or equal to the non-overlapped CCE limit. That is, aspects of the described techniques apply a weighting factor towards the non-overlapped CCE limit when the UE is configured with two DMRS ports to account for the increased complexity associated with channel estimations per-CCE being more difficult when there are two DMRS ports to estimate. The value of x (the weighting factor) may be fixed (e.g., 1.25, 1.5, 1.75, 2.0, 2.5, 3.0, 5, 10, etc.) or may be indicated as part of a UE capability signaling (e.g., in a UE capability message). The value of x (the weighting factor) may also be a function of whether the two DMRS ports are associated with the same TCI state or with two different TCI states. These techniques may be also applied for the BD limit, e.g., monitored PDCCH candidates. This is because when there are two spatial layers it increases the complexity of demodulation/decoding. This technique can also be based on whether a CCE is associated with two TCI states (e.g., instead of whether a CCE is configured with two DMRS ports).

Accordingly, base station 105-a may identify or otherwise determine the plurality of TCI states for a CORESET for UE 115-a. Base station 105-a may identify or otherwise determine a number of control channel candidates (e.g., PDCCH monitoring candidates) and/or a number of non-overlapped CCE limit for the control channel based on the weighting factor (e.g., x) in the plurality of TCI states. Base station 105-a may transmit or otherwise convey an indication of a configuration message to UE 115-a. The configuration may carry or convey an indication of a set of PDCCH candidates and the corresponding aggregation level per search space set (e.g., control REs 225) associated with the CORESET based on the number of control channel candidates and/or the CCE limit for the downlink control channel. UE 115-a may receive the configuration message and determine the number of control channel candidates or the number of non-overlapped CCEs for the downlink control channel, based on the numbers not exceeding the corresponding limits. UE 115-a may monitor search space set(s) for the downlink control channel based on the determination. UE 115-a may count the number of monitored control channel candidates or non-overlapping CCEs based on the weighting factor (e.g., x) and the number of reference signal ports (e.g., DMRS ports) of the CORESET.

Figure 3A:
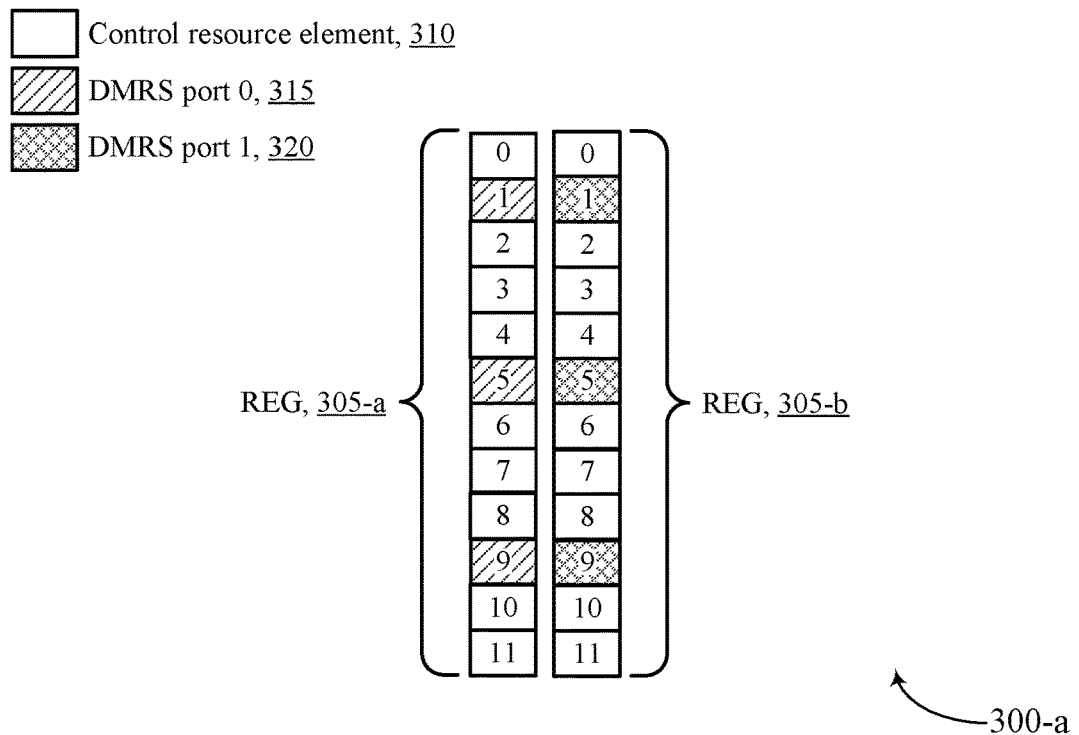
FIGS. 3A through 4B illustrate examples of control resource sets (CORESETs) that support reference signal port mapping for control channels in accordance with aspects of the present disclosure.
Figure 3B:
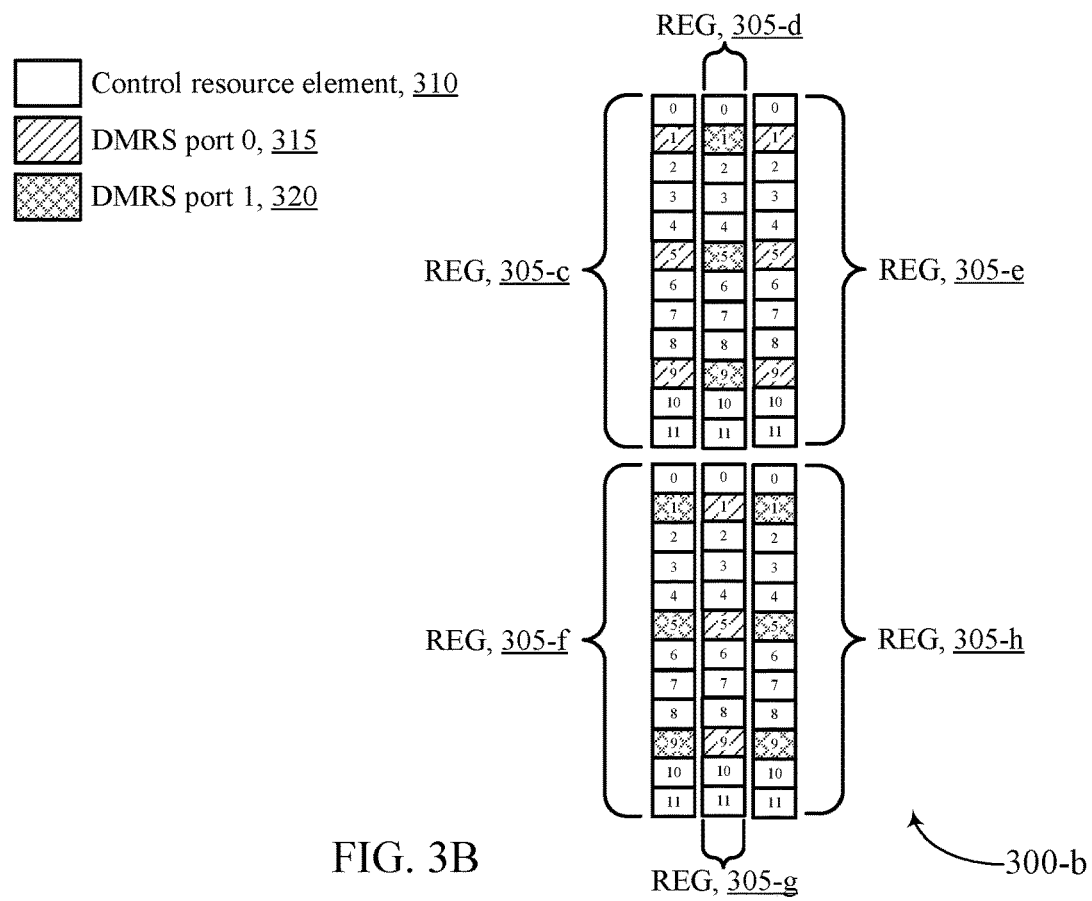

FIGS. 3A and 3B illustrate examples of CORESETs 300 that support reference signal port mapping for control channels in accordance with aspects of the present disclosure. In some examples, the CORESETs 300 may implement aspects of wireless communication system 100. The CORESETs 300 may be implemented by a base station or UE, which may be examples of the corresponding devices described herein. Generally, CORESET 300-a illustrates an example CORESET configuration spanning two OFDM symbols and CORESET 300-b illustrates an example CORESET configuration spanning three OFDM symbols.

In some cases, CORESETs 300 may be configured to support multi-TCI state PDCCH. For example, reference signal port mapping for control channels techniques may be applied to CORESETs 300 to support the transmission of PDCCH DMRSs over different DMRS ports/spatial layers and TCI states to enhance diversity of PDCCHs by allowing multiple beams or TCI states in one CORESET while also allowing for separate channel estimation for the two DMRS ports corresponding to the two TCI states.

CORESET 300-a illustrates a CORESET that supports multiple DMRS ports, where the different DMRS ports are assigned to the same REs of a REG 305. For example, FIG. 3A depicts REG 305-a (a first REG) and REG 305-b (a second REG) of a CORESET configuration. REG 305-a and REG 305-b may be the same REG 305 but are depicted separately for clarity. Within the same REs of REG 305, two DMRS ports (e.g., DMRS port 315, which is assigned DMRS port number 0, and DMRS port 320, which is assigned DMRS port number 1) may be configured. For example, REs 1, 5, and 9 may be configured for DMRS using DMRS port 0 (e.g., DMRS port 315) in a first spatial layer corresponding to a first TCI state, as depicted by REG 305-a, and using DRMS port one (e.g., DMRS port 320) in a second spatial layer corresponding to a second TCI state, as depicted by REG 305-b. REs 0, 2-4, 6-8, and 10-11 may be configured as control REs 310 which carry coded DCI bits. However, it is to be understood that any number of DMRS REs and/or control REs 310 in any combination or order may be configured for DMRS port 0, DMRS port 1, or control REs 310, or any combination thereof.

A base station or UE may be configured to determine or otherwise implement the SDM techniques as illustrated in FIG. 3A (e.g., different DMRS ports assigned to the same REs in different OFDM symbols). For example, the SDM configuration may be include in an RRC message as part of the CORESET configuration information. In some cases, the number of DMRS ports may be configurable and may be indicated in the RRC as part of the CORESET configuration information.

For example, a base station may identify or otherwise determine a plurality of TCI states for a CORESET for a downlink control channel (e.g., PDCCH) for the UE. The base station may identify a configuration for the CORESET that includes or otherwise accounts for the plurality of TCI states. For example, the CORESET configuration may include a first set of DMRS REs (e.g., REs 1, 5, and 9 of REG 305-a) in a first symbol of the CORESET that correspond to a first DMRS port (e.g., DMRS Port 315) associated with a first TCI state/spatial layer. The CORESET configuration may also include a second set of DMRS REs (e.g., REs 1, 5, and 9 of REG 305-b) in a second symbol of the CORESET that correspond to a second DMRS port (e.g., DMRS port 320) associated with a second TCI state/spatial layer. That is, REs 1, 5, and 9 of REG 305-a may be associated with DMRS port 315 of a first TCI state and REs 1, 5, and 9 of REG 305-b may be associated with DMRS port 320 of a second TCI state. The base station may transmit a configuration message to the UE that carries or conveys an indication of the CORESET configuration.

In some aspects, a set of control REs 310 within the first symbol and/or the second symbol of the CORESET may correspond to the first DMRS port (e.g., DMRS port 315)

associated with the first layer (e.g., spatial layer) and the second DMRS port (e.g., DMRS port 320) associated with a second layer (e.g., spatial layer). In some aspects, a set of control REs 310 within the first symbol and/or the second symbol of the CORESET may correspond to the first TCI state and the second TCI state. As illustrated in CORESET 300, a pattern of the first DMRS REs is the same across a set of RBs of the first symbol of the CORESET. Similarly, the pattern for the second set of DMRS REs may be the same across a set of RBs of the second symbol of the CORESET.

The UE may receive the configuration message from the base station and use the CORESET configuration (e.g., CORESET 300-a) to receive and decode the control signal transmission.

FIG. 3B illustrating CORESET 300-b shows an example of a CORESET where the DMRS ports/TCI states are swapped in different RBs (e.g., in different REGs 305). That is, in a first set of RBs (REGs 305-c through 305-e) the DMRS port 315 is associated with DMRS REs in the REGs 305-c and 305-e in the first and third OFDM symbols, respectively, of the CORESET and DMRS port 320 is associated with the DMRS REs in the REG 305-d in the second OFDM symbol of the CORESET. In the second set of RBs the DMRS port 320 is associated with DMRS REs in the REGs 305-f and 305-h in the first and third set of OFDM symbols, respectively, of the CORESET and DMRS port 315 is associated with the DMRS REs in the REG 305-g in the second OFDM symbol of the CORESET. The first and/or second set of RBs may be configured (e.g., using RRC signaling) as part of the CORESET configuration (in addition to the first/second set of OFDM symbols) or can be based on a fixed or known rule (e.g., first half/second half of RBs).

The base station may identify or otherwise select CORESET 300-b for the UE and transmit or otherwise convey an indication of the CORESET configuration to the UE in RRC signaling. The UE may receive the configuration message from the base station and use the CORESET configuration (e.g., CORESET 300-b) to receive and decode the control signal transmission.

Figure 4A:
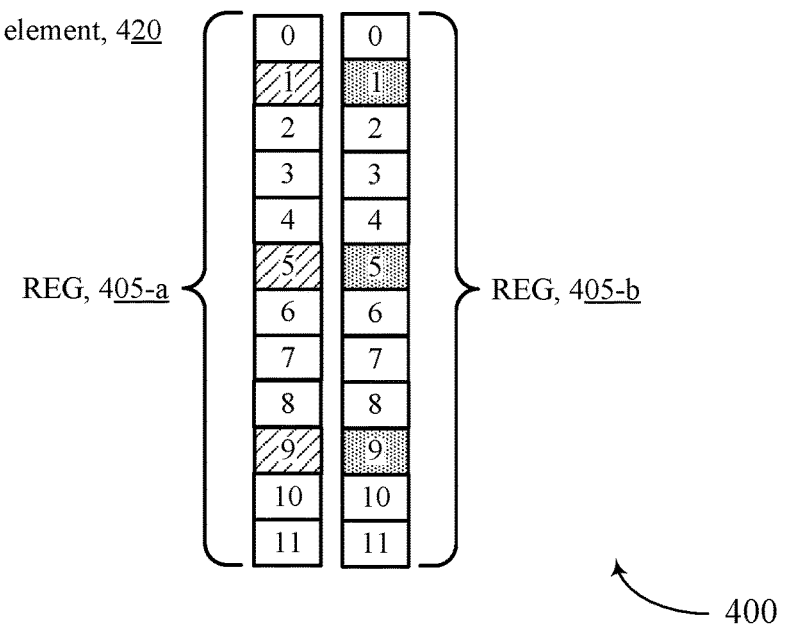
Figure 4B:
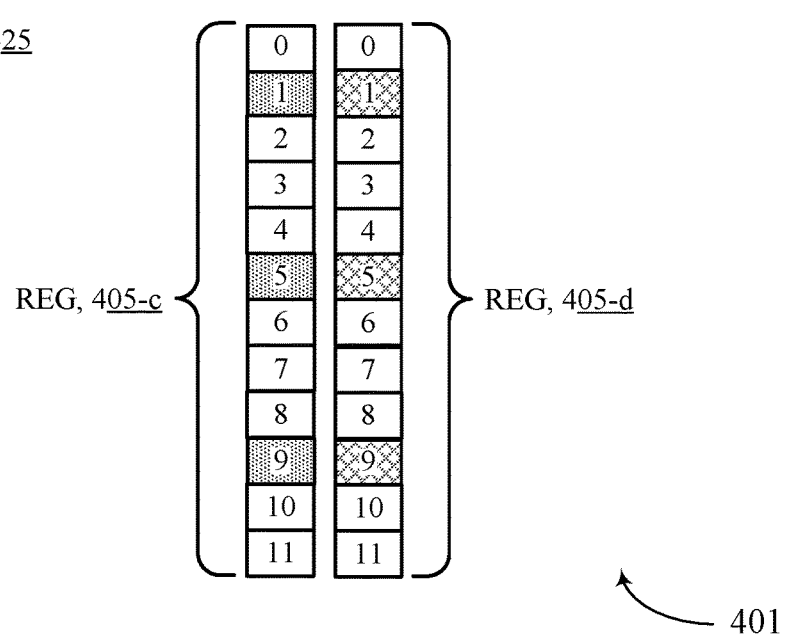

FIGS. 4A and 4B illustrate examples of a CORESET 400 that supports reference signal port mapping for control channels in accordance with aspects of the present disclosure. In some examples, CORESET 400 may implement aspects of wireless communication systems 100 and/or 200, and/or CORESET 300. Aspects of CORESET 400 may be implemented by a UE and/or base station, which may be examples of the corresponding devices described herein. Generally, CORESET 400 illustrates an example CORESET configuration for multiple UEs, with CORESET 400-a illustrating a CORESET configuration for a first UE and CORESET 400-b illustrating a CORESET configuration for a second UE.

As discussed above, aspects of the described techniques may include a base station configuring a CORESET for a UE with no DMRS REs in some REGs. That is, the REs which would have been used as DMRS REs are, instead, empty (e.g., there are no DMRS transmissions and/or control RE 410 transmissions during the empty REs). This may support orthogonal MU-MIMO across different UEs for PDCCH. For example, this may implement SDM techniques across different UEs, rather than for a single UE. Each UE may be configured with only one DMRS port in one spatial layer, and one CORESET (that are configured per-UE) has one TCI state. The set of OFDM symbols of the CORESET may be RRC configured for the UE in which the position of the DMRS REs in each of the REGs of that set of symbols are empty. In some aspects, the coded bits of PDCCH (e.g., the control RE 410) may rate match around the empty REs.

The base station may identify or otherwise determine TCI states for each UE. For example, the base station my may identify or otherwise determine a first TCI state for a first UE and a second TCI state for a second UE and/or first and second TCI states for each UE. The base station may configure the CORESETs for the UEs, e.g., via RRC signaling. For example and referring to CORESET 400-a of FIG. 4A, the CORESET for the first UE may include a first set of REs in a first symbol corresponding to the first TCI state and a second set of REs in a second symbol corresponding to the second TCI state. For example, the CORESET 400-a configured for the first UE may include a first set of REs (e.g., DMRS REs 415, which are assigned DMRS port number 0) in a first symbol of REG 405-a corresponding to the first TCI state and the second set of REs (e.g., empty REs 420) in the second symbol of REG 405-b corresponding to the second TCI state. The remaining REs of REGs 405-a and 405-b are allocated for control REs 410.

Similarly and referring to CORESET 400-b of FIG. 4B, the CORESET for the second UE may include a first set of REs in a first symbol corresponding to the first TCI state and a second set of REs in a second symbol corresponding to the second TCI state. For example, the CORESET 400-b configured for the second UE may include a first set of REs (e.g., empty REs 420) in a first symbol of REG 405-c corresponding to the first TCI state and the second set of REs (e.g., DMRS REs 425, which are assigned DMRS port number 1) in the second symbol of REG 405-b corresponding to the second TCI state. The remaining REs of REGs 405-c and 405-d are allocated for control REs 410.

The base station may then transmit a first configuration message to the first UE indicating its CORESET configuration (e.g., CORESET 400-a) and transmit a second configuration message to the second UE indicating its CORESET configuration (e.g., CORESET 400-b). Accordingly, REs 1, 5, and 9 in the second symbol of REG 405-b are empty REs 420 from the perspective of the first UE and REs 1, 5, and 9 in the first symbol of REG 405-c are empty REs 420 from the perspective of the second UE. As discussed above, each UE may rate match around its empty REs 420.

Each of the UEs may receive their respective configuration messages indicating their configured CORESETs. Accordingly, the first UE may determine that the first set of DMRS REs 415 in a first symbol of the CORESET correspond to a first DMRS port (e.g., DMRS REs 415 assigned DMRS port 0) and that the second set of DMRS REs, corresponding to the first set of DMRS REs, in a second symbol of the CORESET are empty (e.g., empty REs 420). Conversely, the second UE may determine that the second set of DMRS REs 425 in a second symbol of the CORESET correspond to a second DMRS port (e.g., DMRS REs 425 assigned DMRS port 1) and that the first set of DMRS REs corresponding to the second set of DMRS REs in the first symbol of the CORESET are empty (e.g., empty REs 420). Accordingly, the first and second UEs may each decode their respective downlink control channel transmissions based on their configured CORESET. For example, each UE may determine that a pattern of the respective DMRS REs is the same across of set of REs of the first symbol of the CORESET. More particularly, each UE may perform channel estimation using the DMRS REs for their respective CORESET configuration and rate match around empty REs.

Figure 5:
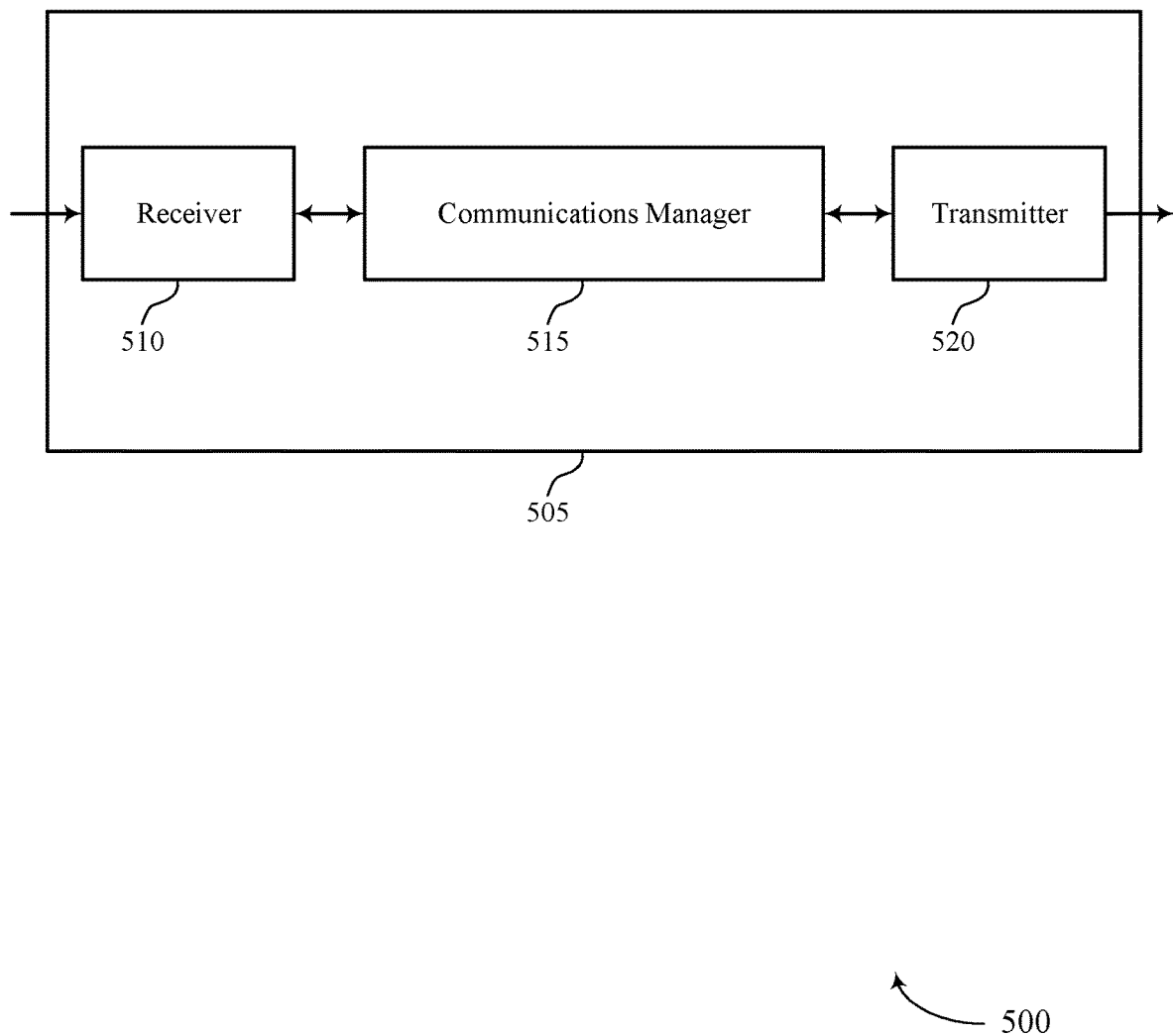
FIGS. 5 and 6 show block diagrams of devices that support reference signal port mapping for control channels in accordance with aspects of the present disclosure.

FIG. 5 shows a block diagram 500 of a device 505 that supports reference signal port mapping for control channels in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to reference signal port mapping for control channels, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive a configuration message indicating that a CORESET for a downlink control channel is associated with a set of DMRS ports, determine, based on the configuration message, that a first set of DMRS REs in a first symbol of the CORESET correspond to a first DMRS port of the plurality of DMRS ports and a second set of DMRS REs in a second symbol of the CORESET correspond to a second DMRS port of the plurality of DMRS ports, and decode the downlink control channel based on the determining.

The communications manager 515 may also receive a configuration message indicating that a CORESET for a downlink control channel is associated with a TCI state for the UE, determine, based on the configuration message, that a first set of DMRS REs in a first symbol of the CORESET correspond to a first DMRS port associated with a first TCI state and that a second set of DMRS REs, corresponding to the first set of DMRS REs, in a second symbol of the CORESET are empty, and decode the downlink control channel based on the determining.

The communications manager 515 may also receive, from a base station, a configuration message indicating that a CORESET for a downlink control channel is associated with a set of reference signal ports, determine a number of control channel candidates limit or a number of CCE limit for the downlink control channel based on the configuration message, count a number of monitored control channel candidates or non-overlapped CCEs based on a weighting factor and a number of the set of reference signal ports of the CORESET, and monitor one or more search space sets for the downlink control channel based on the determining. The communications manager 515 may be an example of aspects of the communications manager 810 described herein.

The communications manager 515, or its sub-components, may be implemented in hardware, code (e.g., software) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
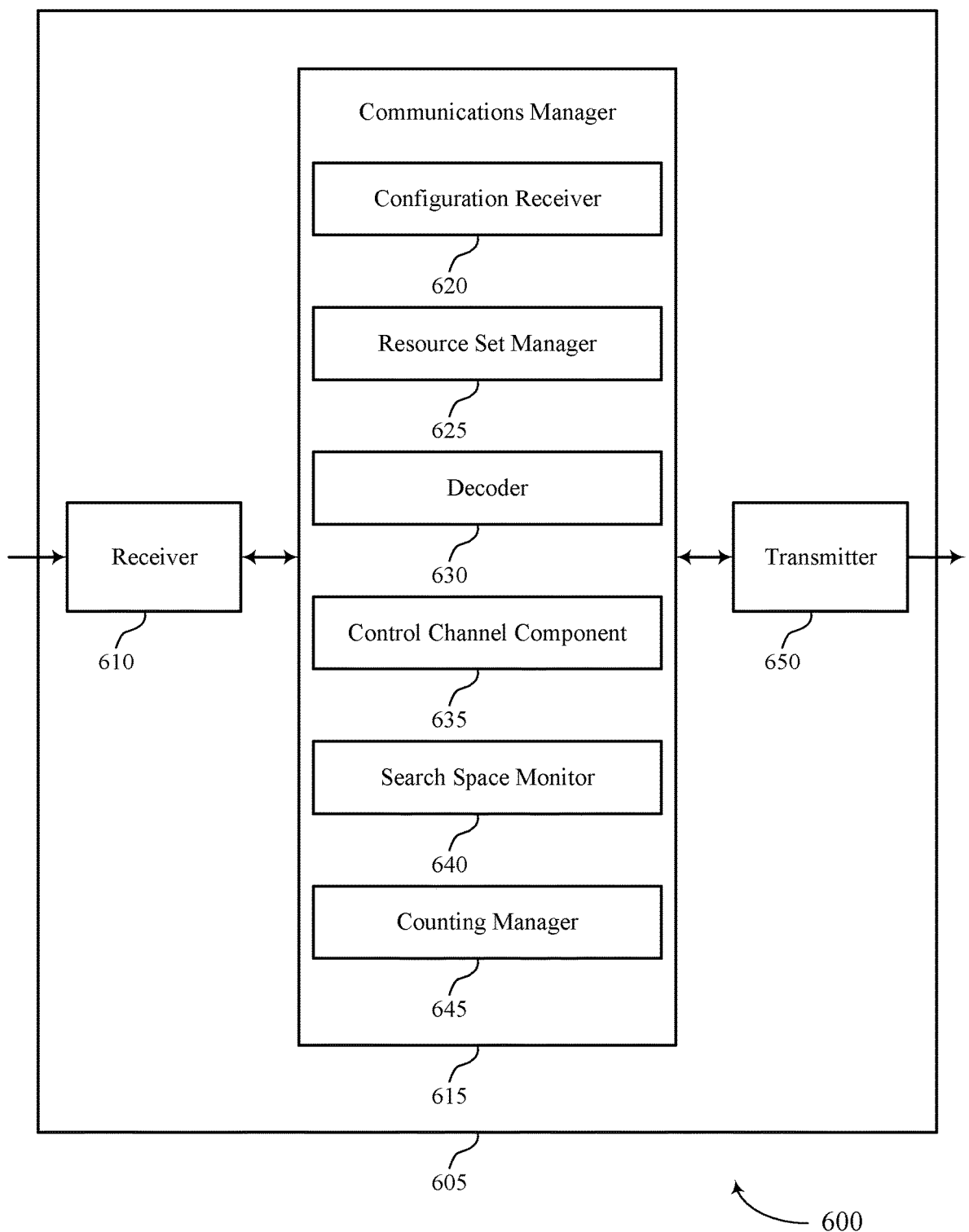

FIG. 6 shows a block diagram 600 of a device 605 that supports reference signal port mapping for control channels in accordance with aspects of the present disclosure. The device 605 may be an example of aspects of a device 505, or a UE 115 as described herein. The device 605 may include a receiver 610, a communications manager 615, and a transmitter 650. The device 605 may also include a processor. Each of these components may be in communication with one another (e.g., via one or more buses).

The receiver 610 may receive information such as packets, user data, or control information associated with various information channels (e.g., control channels, data channels, and information related to reference signal port mapping for control channels, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a configuration receiver 620, a resource set manager 625, a decoder 630, a control channel component 635, a search space monitor 640, and a counting manager 645. The communications manager 615 may be an example of aspects of the communications manager 810 described herein.

The configuration receiver 620 may receive a configuration message indicating that a CORESET for a downlink control channel is associated with a set of DMRS ports.

The resource set manager 625 may determine, based on the configuration message, that a first set of DMRS REs in a first symbol of the CORESET correspond to a first DMRS port of the set of DMRS ports and a second set of DMRS REs in a second symbol of the CORESET correspond to a second DMRS port of the set of DMRS ports.

The decoder 630 may decode the downlink control channel based on the determining.

The configuration receiver 620 may receive a configuration message indicating that a CORESET for a downlink control channel is associated with a TCI state for the UE.

The resource set manager 625 may determine, based on the configuration message, that a first set of DMRS REs in a first symbol of the CORESET correspond to a first DMRS port associated with a first TCI state and that a second set of DMRS REs, corresponding to the first set of DMRS REs, in a second symbol of the CORESET are empty.

The configuration receiver 620 may receive, from a base station, a configuration message indicating that a CORESET for a downlink control channel is associated with a set of reference signal ports.

The control channel component 635 may determine a number of control channel candidates limit or a number of CCE limit for the downlink control channel based on the configuration message.

The search space monitor 640 may monitor one or more search space sets for the downlink control channel based on the determining.

The counting manager 645 may count a number of monitored control channel candidates or non-overlapped CCEs based on a weighting factor and a number of the set of reference signal ports of the CORESET.

The transmitter 650 may transmit signals generated by other components of the device 605. In some examples, the transmitter 650 may be collocated with a receiver 610 in a transceiver module. For example, the transmitter 650 may be an example of aspects of the transceiver 820 described with reference to FIG. 8. The transmitter 650 may utilize a single antenna or a set of antennas.

Figure 7:
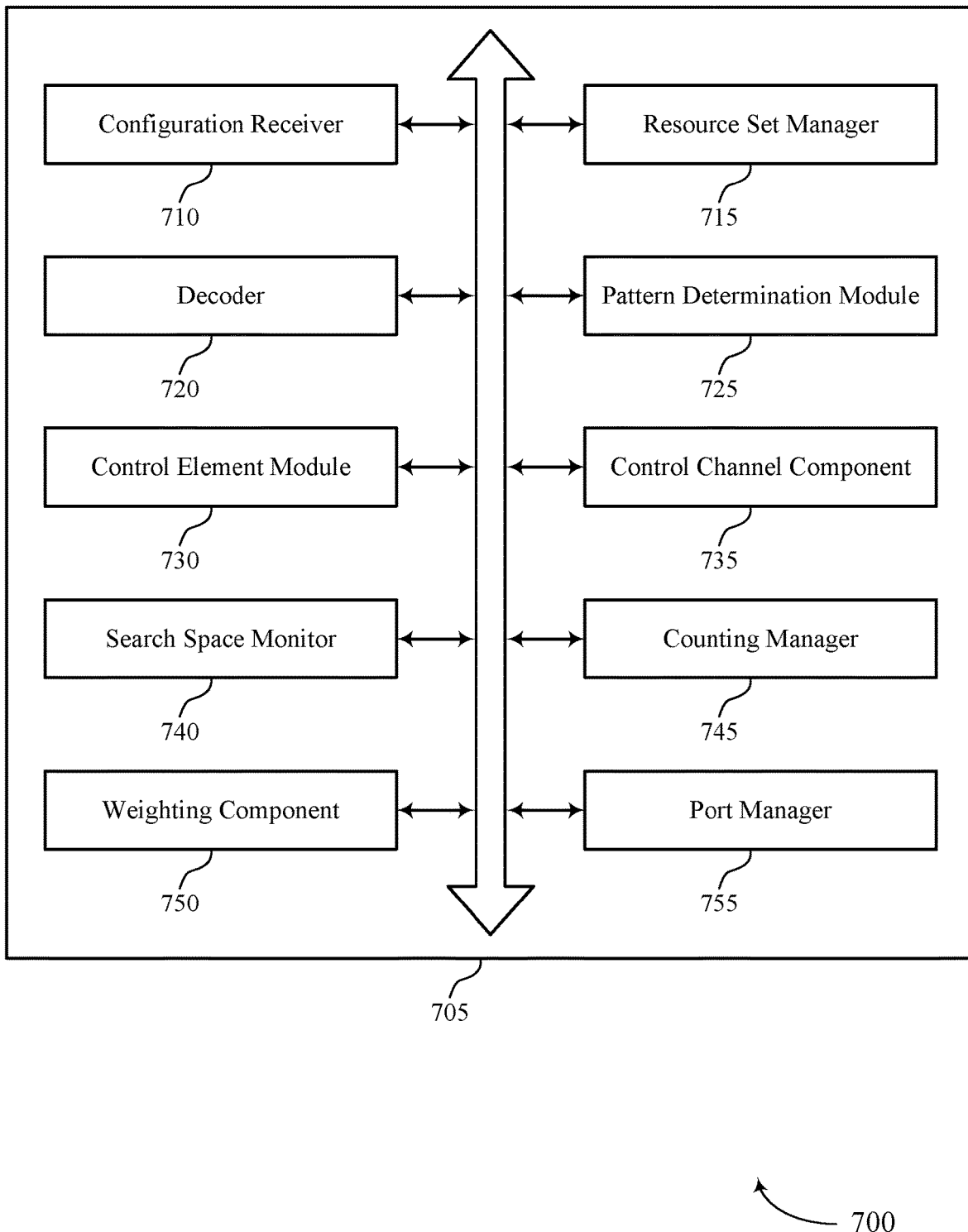
FIG. 7 shows a block diagram of a communications manager that supports reference signal port mapping for control channels in accordance with aspects of the present disclosure.

FIG. 7 shows a block diagram 700 of a communications manager 705 that supports reference signal port mapping for control channels in accordance with aspects of the present disclosure. The communications manager 705 may be an example of aspects of a communications manager 515, a communications manager 615, or a communications manager 810 described herein. The communications manager 705 may include a configuration receiver 710, a resource set manager 715, a decoder 720, a pattern determination module 725, a control element module 730, a control channel component 735, a search space monitor 740, a counting manager 745, a weighting component 750, and a port manager 755. Each of these modules may communicate, directly or indirectly, with one another (e.g., via one or more buses).

The configuration receiver 710 may receive a configuration message indicating that a CORESET for a downlink control channel is associated with a set of DMRS ports. In some examples, the configuration receiver 710 may receive a configuration message indicating that a CORESET for a downlink control channel is associated with a TCI state for the UE. In some examples, the configuration receiver 710 may receive, from a base station, a configuration message indicating that a CORESET for a downlink control channel is associated with a set of reference signal ports. In some examples, the configuration receiver 710 may receive the configuration message via RRC signaling. In some examples, the configuration receiver 710 may receive the configuration message via RRC signaling.

The resource set manager 715 may determine, based on the configuration message, that a first set of DMRS REs in a first symbol of the CORESET correspond to a first DMRS port of the plurality of DMRS ports and a second set of DMRS REs in a second symbol of the CORESET correspond to a second DMRS port of the plurality of DMRS ports. In some examples, the resource set manager 715 may determine, based on the configuration message, that a first set of DMRS REs in a first symbol of the CORESET correspond to a first DMRS port associated with a first TCI state and that a second set of DMRS REs, corresponding to the first set of DMRS REs, in a second symbol of the CORESET are empty.

In some examples, the resource set manager 715 may determine, based on the configuration message, that a set of control REs within the first symbol or the second symbol of the CORESET correspond to both the first DMRS port associated with a first layer and the second DMRS port associated with a second layer. In some examples, the resource set manager 715 may determine, based on the configuration message, that a set of control REs within the first symbol or the second symbol of the CORESET correspond to both the first TCI state and the second TCI states. In some examples, the resource set manager 715 may determine, based on the configuration message, that a third set of DMRS REs in a third symbol of the CORESET correspond to one of the first DMRS port or the second DMRS port.

In some examples, the resource set manager 715 may determine, based on the configuration message, that a third set of DMRS REs in the first symbol of the CORESET correspond to the second DMRS port. In some examples, the resource set manager 715 may determine, based on the configuration message, that a fourth set of DMRS REs in the second symbol of the CORESET correspond to the first DMRS port. In some examples, the resource set manager 715 may determine that the resource blocks that contain the third set of DMRS REs are different from resource blocks that contain the first set of DMRS REs.

In some examples, the resource set manager 715 may determine, based on the configuration message, that the first set of DMRS REs correspond to the first DMRS port associated with the first TCI state. In some cases, the first DMRS port correspond to a first layer. In some cases, the second DMRS port correspond to a second layer. In some cases, the fourth set of DMRS REs is associated with a resource block different from the second set of DMRS REs. In some cases, the first and second symbols are OFDM symbols. In some cases, the first DMRS port correspond to a first layer. In some cases, the first and second symbols are OFDM symbols.

The decoder 720 may decode the downlink control channel based on the determining. In some examples, the decoder 720 may rate-match around the second set of DMRS REs in the second symbol of the CORESET.

The control channel component 735 may determine a number of control channel candidates limit or a number of CCE limit for the downlink control channel based on the configuration message.

The search space monitor 740 may monitor one or more search space sets for the downlink control channel based on the determining.

The counting manager 745 may count a number of monitored control channel candidates or non-overlapped CCEs based on a weighting factor and a number of the set of reference signal ports of the CORESET. In some examples, the counting manager 745 may multiply the weighting factor with the number of monitored control channel candidates or the number of non-overlapped CCEs.

The pattern determination module 725 may determine, based on the configuration message, that a pattern of the first set of DMRS REs is the same across a set of resource blocks of the first symbol of the CORESET. In some examples, the pattern determination module 725 may determine, based on the configuration message, that a pattern of the second set of DMRS REs is the same across a set of resource blocks of the second symbol of the CORESET. In some examples, the pattern determination module 725 may determine, based on the configuration message, that a pattern of the first set of DMRS REs is the same across a set of resource blocks of the first symbol of the CORESET. In some cases, the set of resource blocks includes all resource blocks of the first symbol allocated for the CORESET. In some cases, the set of resource blocks includes all resource blocks of the second symbol allocated for the CORESET.

The control element module 730 may determine, based on the configuration message, that a set of control REs within the first symbol of the CORESET is associated with the first TCI state and the first DMRS port, where the set of control REs and the first set of DMRS REs are non-overlapping. In some examples, the control element module 730 may determine, based on the configuration message, that a set of control REs within the second symbol of the CORESET is associated with the first TCI state and the first DMRS port, where the set of control REs and the second set of DMRS REs are non-overlapping.

The weighting component 750 may determine that the CORESET is associated with a single DMRS port. In some examples, the weighting component 750 may determine the weighting factor to be a value of 1 based on determining that the CORESET is associated with the single DMRS port. In some examples, the weighting component 750 may determine that the CORESET is associated with multiple DMRS ports. In some examples, the weighting component 750 may determine the weighting factor to be a value greater than 1 based on determining that the CORESET is associated with multiple DMRS ports.

In some examples, the weighting component 750 may transmit an indication of a capability of the UE to the base station. In some examples, the weighting component 750 may receive an indication of the weighting factor from the base station, where the weighting factor is based on the capability of the UE. In some examples, the weighting component 750 may determine the weighting factor based on whether the set of reference signal ports correspond to the same or different TCI states. In some examples, the weighting component 750 may determine the weighting factor based on whether the set of reference signal ports correspond to one or multiple TCI states.

The port manager 755 may determine whether the set of reference signal ports correspond to the same or different TCI states. In some examples, the port manager 755 may determine whether the set of reference signal ports correspond to one or multiple TCI states.

Figure 8:
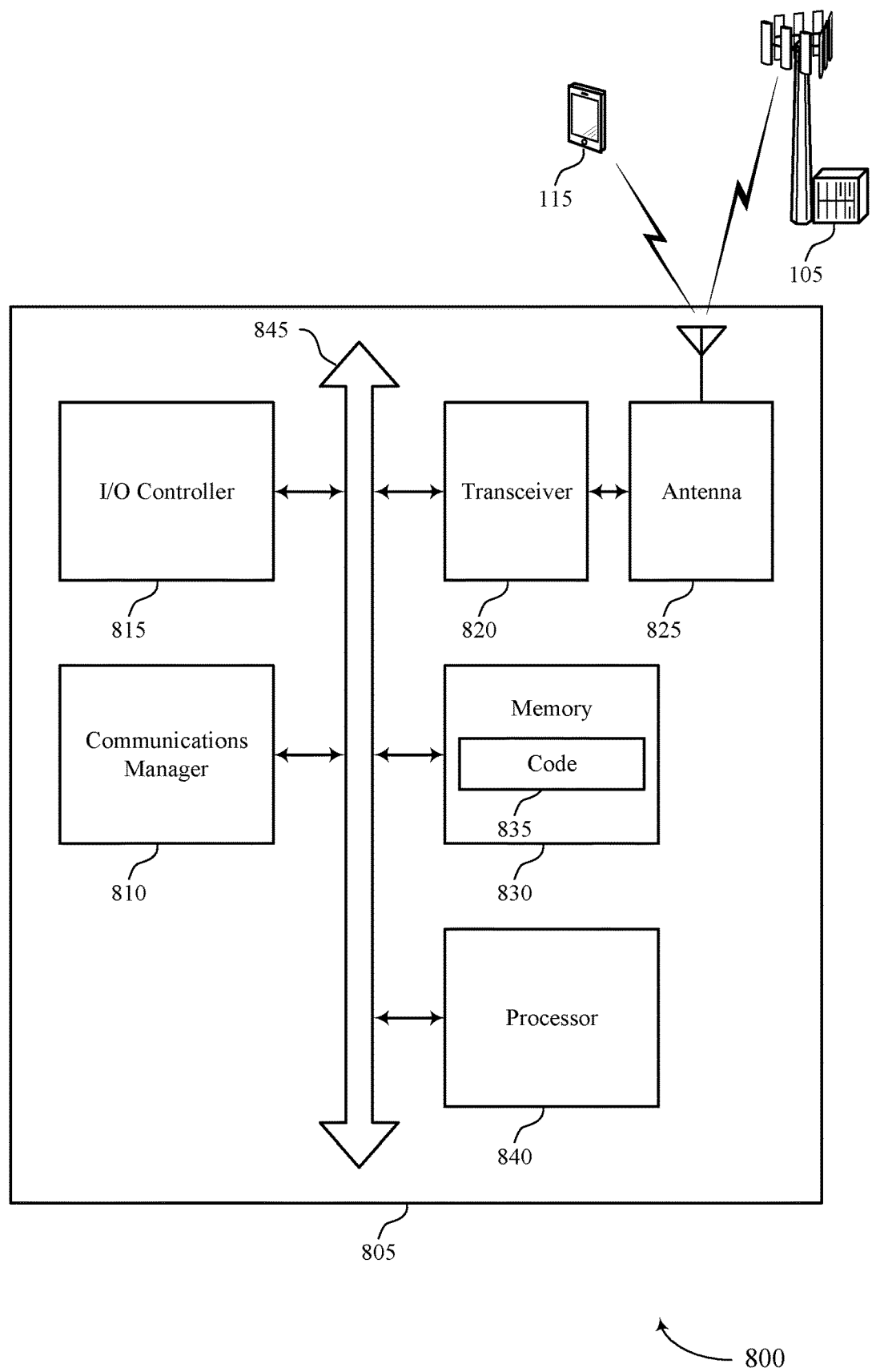
FIG. 8 shows a diagram of a system including a device that supports reference signal port mapping for control channels in accordance with aspects of the present disclosure.

FIG. 8 shows a diagram of a system 800 including a device 805 that supports reference signal port mapping for control channels in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive a configuration message indicating that a CORESET for a downlink control channel is associated with a set of DMRS ports, determine, based on the configuration message, that a first set of DMRS REs in a first symbol of the CORESET correspond to a first DMRS port of the set of DMRS ports and a second set of DMRS REs in a second symbol of the CORESET correspond to a second DMRS port of the set of DMRS ports, and decode the downlink control channel based on the determining.

The communications manager 810 may also receive a configuration message indicating that a CORESET for a downlink control channel is associated with a TCI state for the UE, determine, based on the configuration message, that a first set of DMRS REs in a first symbol of the CORESET correspond to a first DMRS port associated with a first TCI state and that a second set of DMRS REs, corresponding to the first set of DMRS REs, in a second symbol of the CORESET are empty, and decode the downlink control channel based on the determining.

The communications manager 810 may also receive, from a base station, a configuration message indicating that a CORESET for a downlink control channel is associated with a set of reference signal ports, determine a number of control channel candidates limit or a number of CCE limit for the downlink control channel based on the configuration message, count a number of monitored control channel candidates or non-overlapped CCEs based on a weighting factor and a number of the set of reference signal ports of the CORESET, and monitor one or more search space sets for the downlink control channel based on the determining.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting reference signal port mapping for control channels).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
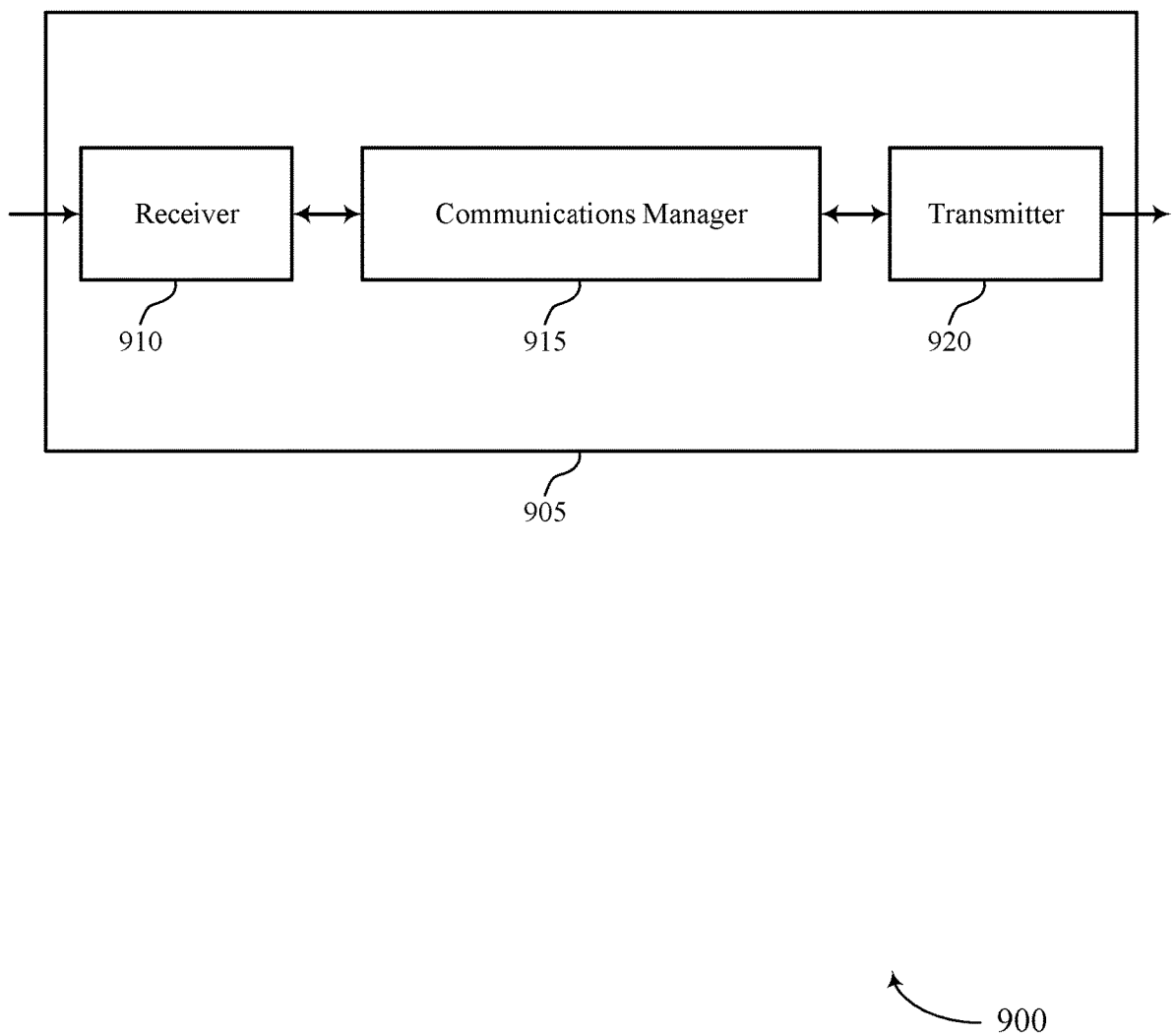
FIGS. 9 and 10 show block diagrams of devices that support reference signal port mapping for control channels in accordance with aspects of the present disclosure.

FIG. 9 shows a block diagram 900 of a device 905 that supports reference signal port mapping for control channels in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to reference signal port mapping for control channels, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may determine a set of TCI states for a CORESET for a downlink control channel for a UE, determine a configuration for the CORESET such that a first set of DMRS REs in a first symbol of the CORESET correspond to a first DMRS port associated with a first TCI state of the set of TCI states and a second set of DMRS REs in a second symbol of the CORESET correspond to a second DMRS port associated with a second TCI state of the set of TCI states, and transmit, to the UE, a configuration message indicating the configuration for the CORESET.

The communications manager 915 may also determine a first TCI state for a first UE and a second TCI state for a second UE, configure a set of CORESETs such that a first set of REs in a first symbol of the set of CORESETs correspond to the first TCI state and a second set of REs in a second symbol of the set of CORESETs correspond to the second TCI state, transmit, to the first UE, a first configuration message indicating that the first set of REs in the first symbol correspond to the first TCI state and that the second set of REs are empty, and transmit, to the second UE, a second configuration message indicating that the second set of REs in the second symbol correspond to the second TCI state and that the first set of REs are empty.

The communications manager 915 may also determine a set of TCI states for a CORESET for a downlink control channel for a UE, determine a number of control channel candidates or a CCE limit for the downlink control channel based on a weighting factor and the set of TCI states, and transmit, to the UE, a configuration message indicating a set of control elements for the CORESET based on the number of control channel candidates or the CCE limit for the downlink control channel. The communications manager 915 may be an example of aspects of the communications manager 1210 described herein.

The communications manager 915, or its sub-components, may be implemented in hardware, code (e.g., software) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
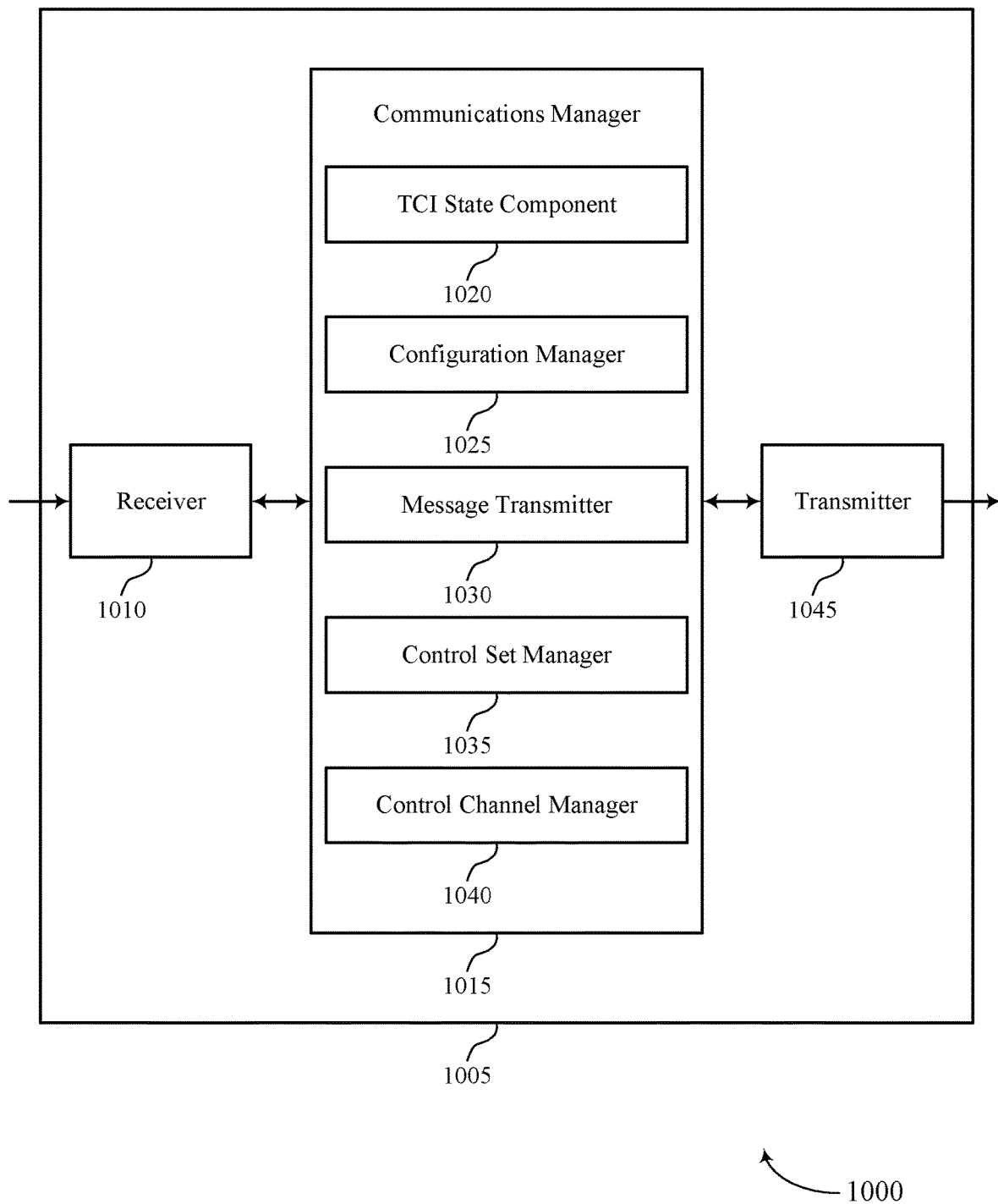

FIG. 10 shows a block diagram 1000 of a device 1005 that supports reference signal port mapping for control channels in accordance with aspects of the present disclosure. The device 1005 may be an example of aspects of a device 905, or a base station 105 as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to reference signal port mapping for control channels, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a TCI state component 1020, a configuration manager 1025, a message transmitter 1030, a control set manager 1035, and a control channel manager 1040. The communications manager 1015 may be an example of aspects of the communications manager 1210 described herein.

The TCI state component 1020 may determine a set of TCI states for a CORESET for a downlink control channel for a UE.

The configuration manager 1025 may determine a configuration for the CORESET such that a first set of DMRS REs in a first symbol of the CORESET correspond to a first DMRS port associated with a first TCI state of the set of TCI states and a second set of DMRS REs in a second symbol of the CORESET correspond to a second DMRS port associated with a second TCI state of the set of TCI states.

The message transmitter 1030 may transmit, to the UE, a configuration message indicating the configuration for the CORESET.

The TCI state component 1020 may determine a first TCI state for a first UE and a second TCI state for a second UE.

The control set manager 1035 may configure a set of CORESETs such that a first set of REs in a first symbol of the set of CORESETs correspond to the first TCI state and a second set of REs in a second symbol of the set of CORESETs correspond to the second TCI state.

The message transmitter 1030 may transmit, to the first UE, a first configuration message indicating that the first set of REs in the first symbol correspond to the first TCI state and that the second set of REs are empty and transmit, to the second UE, a second configuration message indicating that the second set of REs in the second symbol correspond to the second TCI state and that the first set of REs are empty.

The TCI state component 1020 may determine a set of TCI states for a CORESET for a downlink control channel for a UE.

The control channel manager 1040 may determine a number of control channel candidates or a CCE limit for the downlink control channel based on a weighting factor and the set of TCI states.

The message transmitter 1030 may transmit, to the UE, a configuration message indicating a set of control elements for the CORESET based on the number of control channel candidates or the CCE limit for the downlink control channel.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
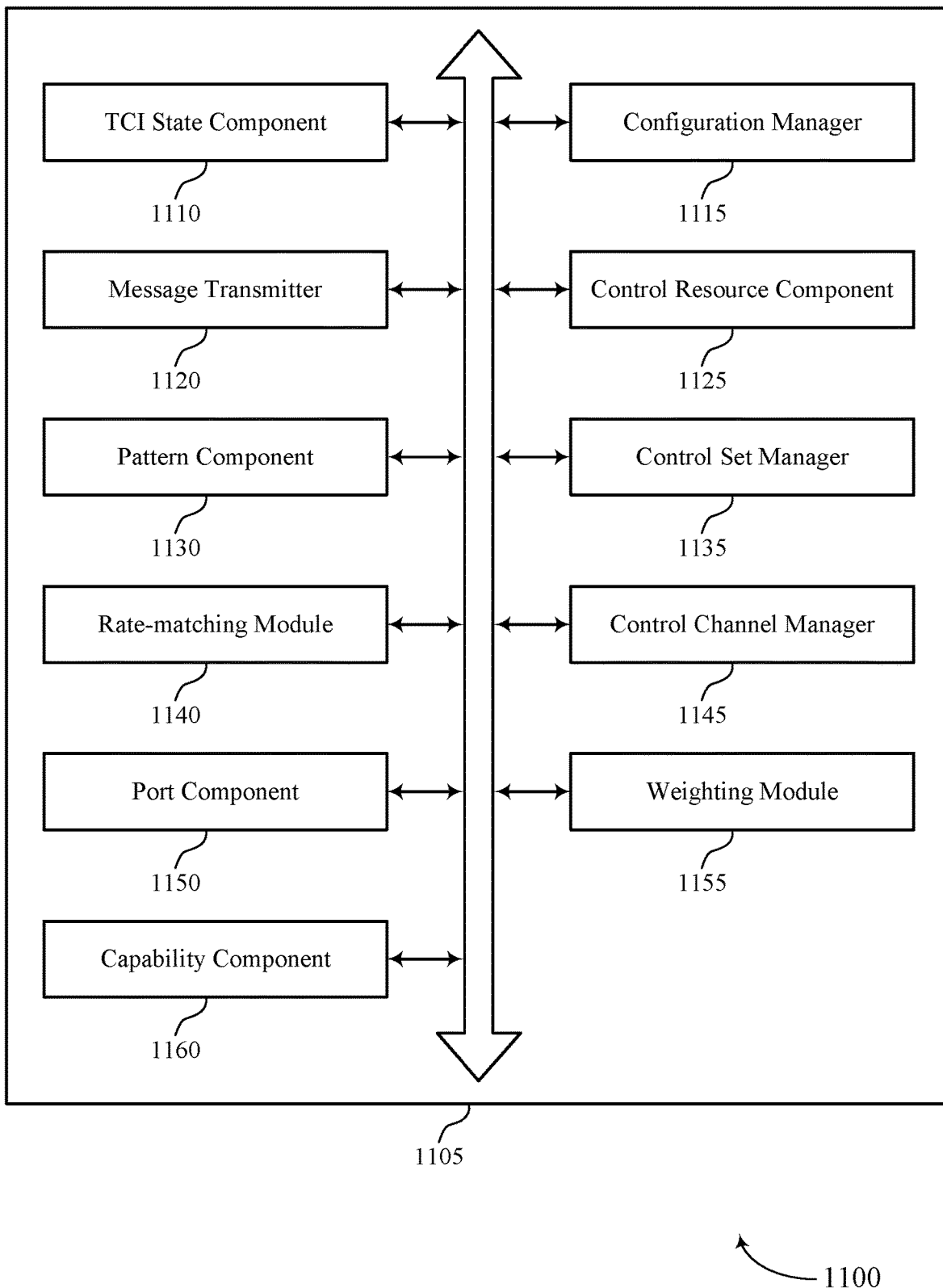
FIG. 11 shows a block diagram of a communications manager that supports reference signal port mapping for control channels in accordance with aspects of the present disclosure.

FIG. 11 shows a block diagram 1100 of a communications manager 1105 that supports reference signal port mapping for control channels in accordance with aspects of the present disclosure. The communications manager 1105 may be an example of aspects of a communications manager 915, a communications manager 1015, or a communications manager 1210 described herein. The communications manager 1105 may include a TCI state component 1110, a configuration manager 1115, a message transmitter 1120, a control resource component 1125, a pattern component 1130, a control set manager 1135, a rate-matching module 1140, a control channel manager 1145, a port component 1150, a weighting module 1155, and a capability component 1160. Each of these modules may communicate, directly or indirectly, with one another (e.g., via one or more buses).

The TCI state component 1110 may determine a set of TCI states for a CORESET for a downlink control channel for a UE. In some examples, the TCI state component 1110 may determine a first TCI state for a first UE and a second TCI state for a second UE.

The configuration manager 1115 may determine a configuration for the CORESET such that a first set of DMRS REs in a first symbol of the CORESET correspond to a first DMRS port associated with a first TCI state of the set of TCI states and a second set of DMRS REs in a second symbol of the CORESET correspond to a second DMRS port associated with a second TCI state of the set of TCI states. In some examples, the configuration manager 1115 may configure a third set of DMRS REs in a third symbol of the CORESET to correspond to one of the first TCI state or the second TCI state. In some examples, the configuration manager 1115 may configure a third set of DMRS REs in the first symbol of the CORESET to correspond to the second TCI state.

In some examples, the configuration manager 1115 may configure a fourth set of DMRS REs in the second symbol of the CORESET to correspond to the first TCI state.

In some cases, the third set of DMRS REs is associated with a resource block different from the first set of DMRS REs. In some cases, the fourth set of DMRS REs is associated with a resource block different from the second set of DMRS REs. In some cases, the first and second symbols are OFDM symbols.

The message transmitter 1120 may transmit, to the UE, a configuration message indicating the configuration for the CORESET. In some examples, the message transmitter 1120 may transmit, to the first UE, a first configuration message indicating that the first set of REs in the first symbol correspond to the first TCI state and that the second set of REs are empty. In some examples, the message transmitter 1120 may transmit, to the second UE, a second configuration message indicating that the second set of REs in the second symbol correspond to the second TCI state and that the first set of REs are empty.

In some examples, the message transmitter 1120 may transmit, to the UE, a configuration message indicating a set of control elements for the CORESET based on the number of control channel candidates or the CCE limit for the downlink control channel. In some examples, the message transmitter 1120 may transmit the configuration message via RRC signaling. In some examples, the message transmitter 1120 may transmit the first and second configuration messages via RRC signaling.

The control set manager 1135 may configure a set of CORESETs such that a first set of REs in a first symbol of the set of CORESETs correspond to the first TCI state and a second set of REs in a second symbol of the set of CORESETs correspond to the second TCI state. In some examples, the control set manager 1135 may configure the first set of REs for a first DMRS port associated with the first TCI state. In some examples, the control set manager 1135 may configure the second set of REs for a second DMRS port associated with the second TCI state. In some cases, the first and second symbols are OFDM symbols.

The control channel manager 1145 may determine a number of control channel candidates or a CCE limit for the downlink control channel based on a weighting factor and the set of TCI states.

The control resource component 1125 may configure a set of control REs within the first symbol or the second symbol of the CORESET to correspond to both the first DMRS port associated with a first layer and the second DMRS port associated with a second layer. In some examples, the control resource component 1125 may configure a set of control REs within the first symbol or the second symbol of the CORESET to correspond to both the first TCI state and the second TCI state.

The pattern component 1130 may configure a pattern of the first set of DMRS REs to be the same across a set of resource blocks of the first symbol of the CORESET. In some examples, the pattern component 1130 may configure a pattern of the second set of DMRS REs to be the same across a set of resource blocks of the second symbol of the CORESET.

The rate-matching module 1140 may perform rate-matching around the second set of REs for a downlink control channel for the first UE. In some examples, the rate-matching module 1140 may perform rate-matching around the first set of REs for a downlink control channel for the second UE.

The port component 1150 may determine that the CORESET is associated with a single DMRS port. In some examples, the port component 1150 may determine that the CORESET is associated with multiple DMRS ports.

The weighting module 1155 may determine the weighting factor to be a value of 1 based on determining that the CORESET is associated with the single DMRS port. In some examples, the weighting module 1155 may determine the weighting factor to be a value greater than 1 based on determining that the CORESET is associated with multiple DMRS ports. In some examples, the weighting module 1155 may determine the weighting factor based on the capability of the UE. In some examples, the weighting module 1155 may transmit an indication of the weighting factor to the UE.

The capability component 1160 may receive an indication of a capability of the UE from the UE.

Figure 12:
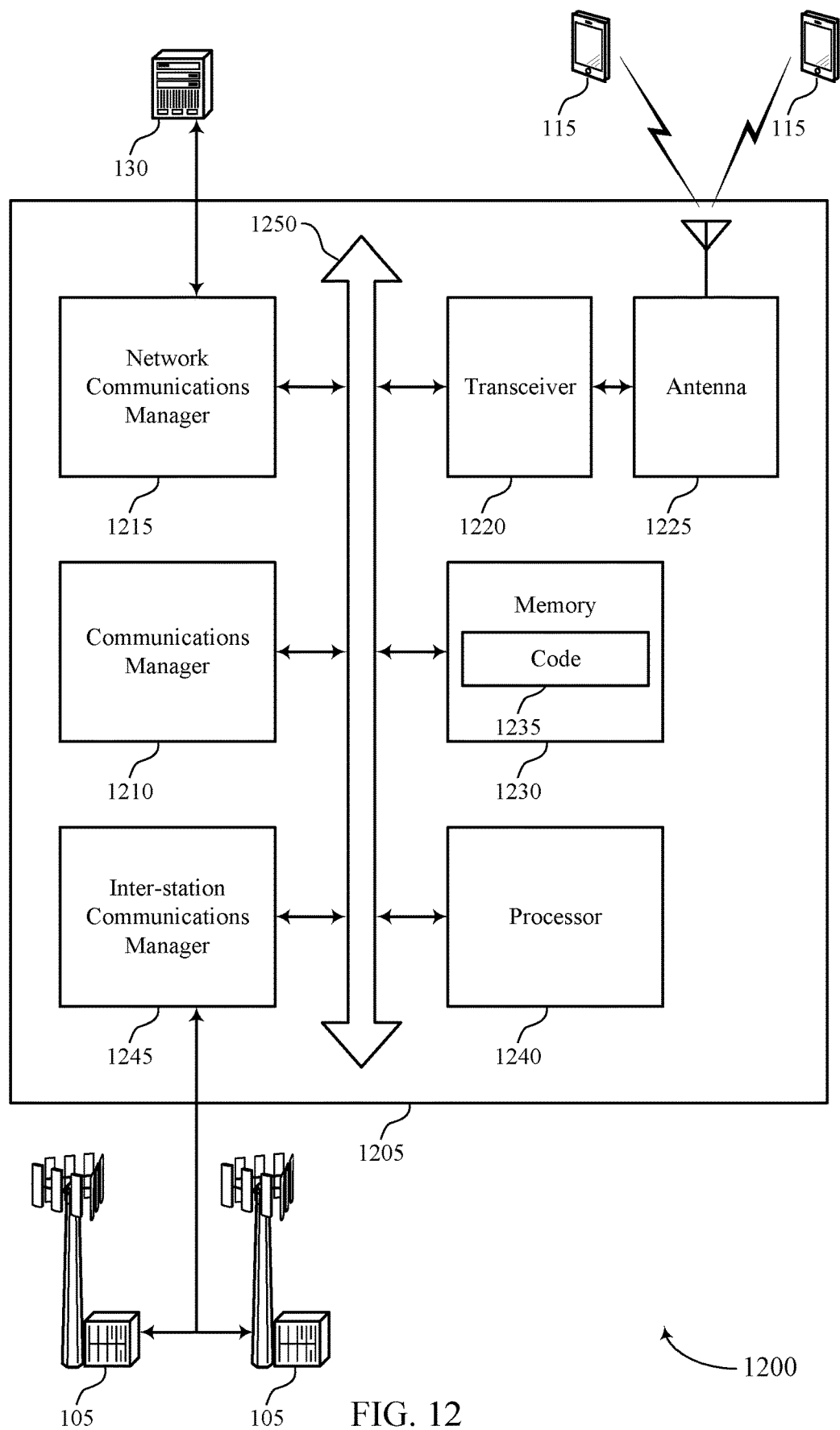
FIG. 12 shows a diagram of a system including a device that supports reference signal port mapping for control channels in accordance with aspects of the present disclosure.

FIG. 12 shows a diagram of a system 1200 including a device 1205 that supports reference signal port mapping for control channels in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may determine a set of TCI states for a CORESET for a downlink control channel for a UE, determine a configuration for the CORESET such that a first set of DMRS REs in a first symbol of the CORESET correspond to a first DMRS port associated with a first TCI state of the set of TCI states and a second set of DMRS REs in a second symbol of the CORESET correspond to a second DMRS port associated with a second TCI state of the set of TCI states, and transmit, to the UE, a configuration message indicating the configuration for the CORESET.

The communications manager 1210 may also determine a first TCI state for a first UE and a second TCI state for a second UE, configure a set of CORESETs such that a first set of REs in a first symbol of the set of CORESETs correspond to the first TCI state and a second set of REs in a second symbol of the set of CORESETs correspond to the second TCI state, transmit, to the first UE, a first configuration message indicating that the first set of REs in the first symbol correspond to the first TCI state and that the second set of REs are empty, and transmit, to the second UE, a second configuration message indicating that the second set of REs in the second symbol correspond to the second TCI state and that the first set of REs are empty.

The communications manager 1210 may also determine a set of TCI states for a CORESET for a downlink control channel for a UE, determine a number of control channel candidates or a CCE limit for the downlink control channel based on a weighting factor and the set of TCI states, and transmit, to the UE, a configuration message indicating a set of control elements for the CORESET based on the number of control channel candidates or the CCE limit for the downlink control channel.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting reference signal port mapping for control channels).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
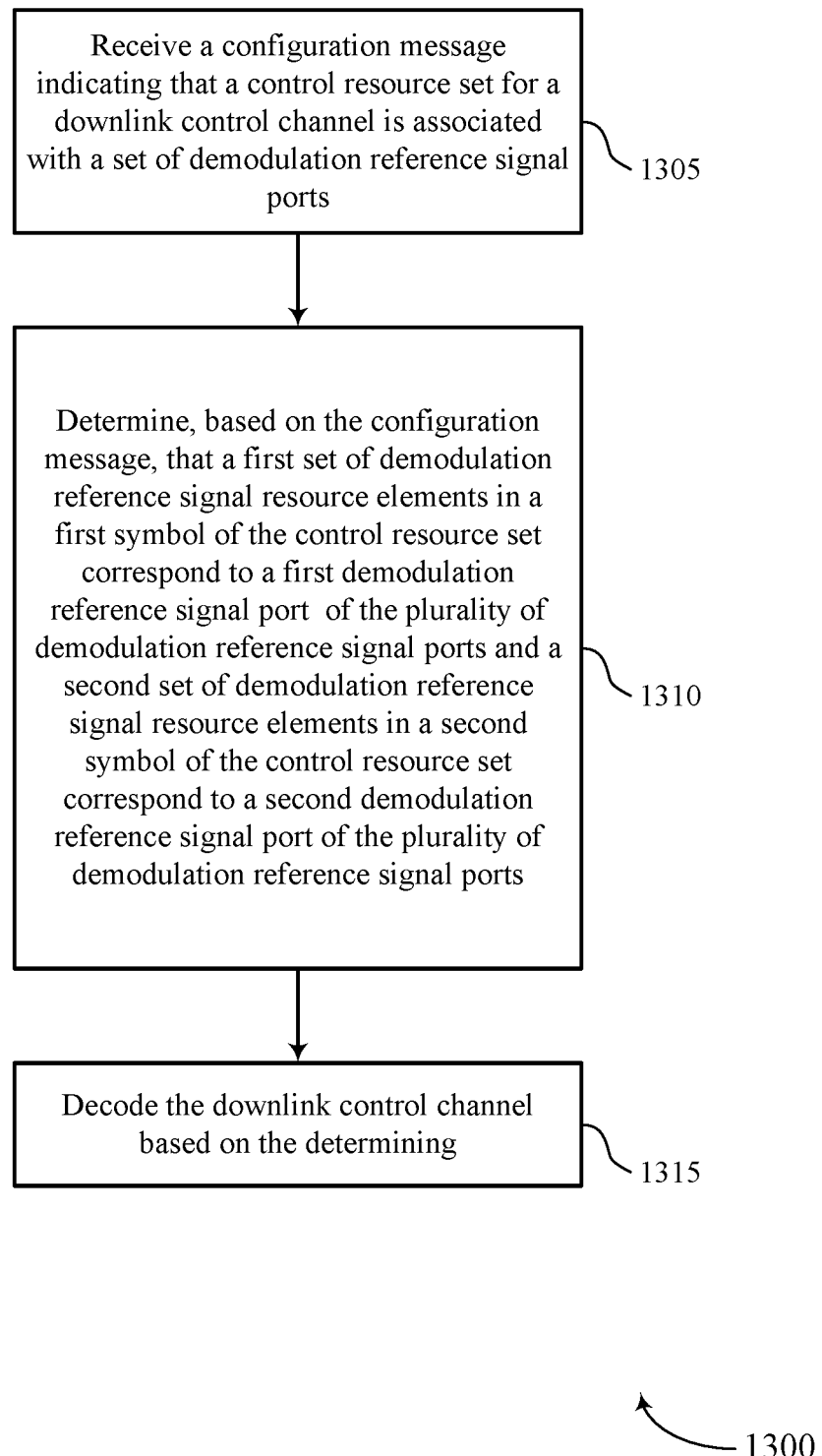
FIGS. 13 through 25 show flowcharts illustrating methods that support reference signal port mapping for control channels in accordance with aspects of the present disclosure.

FIG. 13 shows a flowchart illustrating a method 1300 that supports reference signal port mapping for control channels in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive a configuration message indicating that a CORESET for a downlink control channel is associated with a set of DMRS ports. The operations of 1305 may be performed according to the methods described herein. In some examples, aspects of the operations of 1305 may be performed by a configuration receiver as described with reference to FIGS. 5 through 8.

At 1310, the UE may determine, based on the configuration message, that a first set of DMRS REs in a first symbol of the CORESET correspond to a first DMRS port of the set of DMRS ports and a second set of DMRS REs in a second symbol of the CORESET correspond to a second DMRS port of the set of DMRS ports. The operations of 1310 may be performed according to the methods described herein. In some examples, aspects of the operations of 1310 may be performed by a resource set manager as described with reference to FIGS. 5 through 8.

At 1315, the UE may decode the downlink control channel based on the determining. The operations of 1315 may be performed according to the methods described herein. In some examples, aspects of the operations of 1315 may be performed by a decoder as described with reference to FIGS. 5 through 8.

Figure 14:
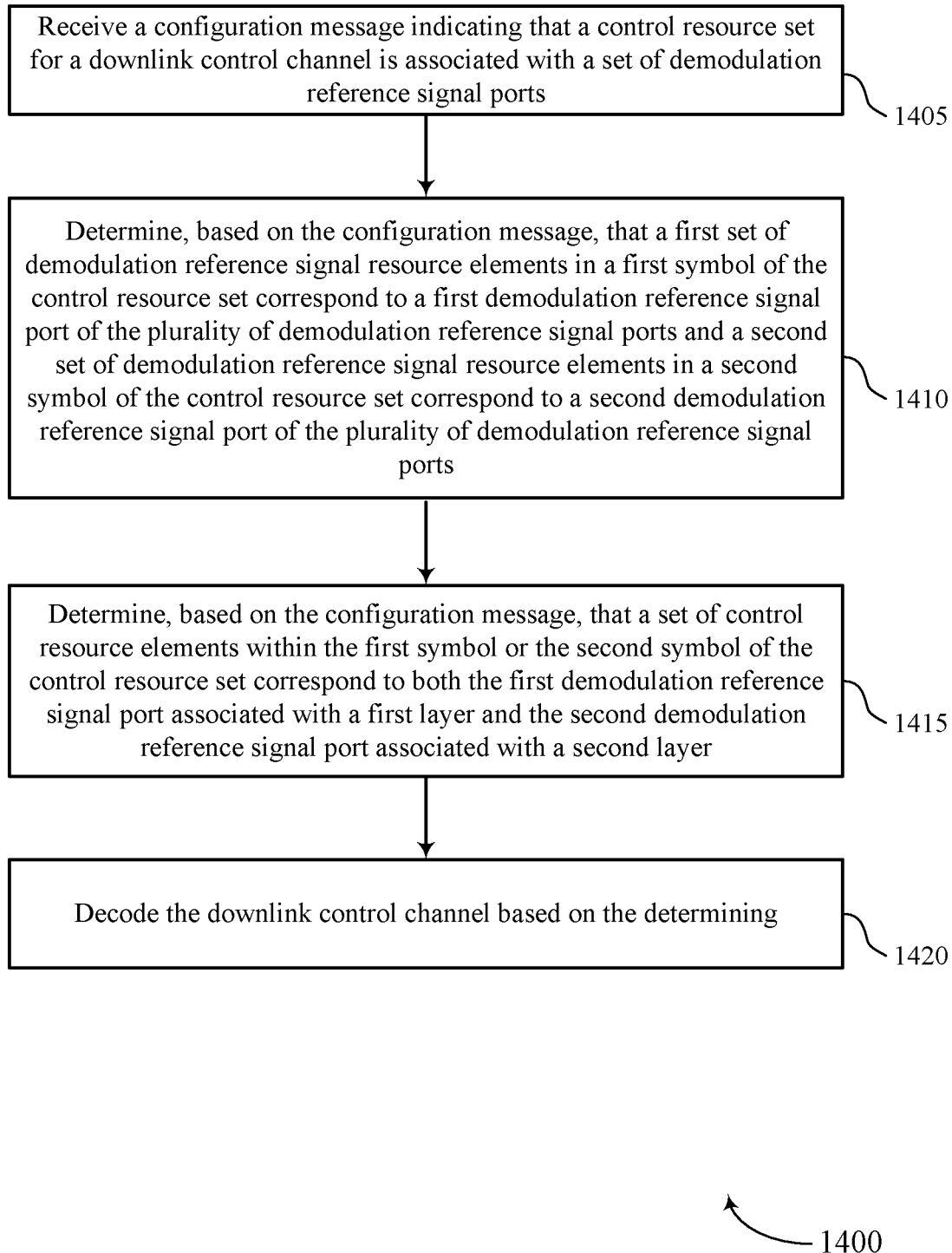

FIG. 14 shows a flowchart illustrating a method 1400 that supports reference signal port mapping for control channels in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive a configuration message indicating that a CORESET for a downlink control channel is associated with a set of DMRS ports. The operations of 1405 may be performed according to the methods described herein. In some examples, aspects of the operations of 1405 may be performed by a configuration receiver as described with reference to FIGS. 5 through 8.

At 1410, the UE may determine, based on the configuration message, that a first set of DMRS REs in a first symbol of the CORESET correspond to a first DMRS port of the set of DMRS ports and a second set of DMRS REs in a second symbol of the CORESET correspond to a second DMRS port of the set of DMRS ports. The operations of 1410 may be performed according to the methods described herein. In some examples, aspects of the operations of 1410 may be performed by a resource set manager as described with reference to FIGS. 5 through 8.

At 1415, the UE may determine, based on the configuration message, that a set of control REs within the first symbol or the second symbol of the CORESET correspond to both the first DMRS port associated with a first layer and the second DMRS port associated with a second layer. The operations of 1415 may be performed according to the methods described herein. In some examples, aspects of the operations of 1415 may be performed by a resource set manager as described with reference to FIGS. 5 through 8.

At 1420, the UE may decode the downlink control channel based on the determining. The operations of 1420 may be performed according to the methods described herein. In some examples, aspects of the operations of 1420 may be performed by a decoder as described with reference to FIGS. 5 through 8.

Figure 15:
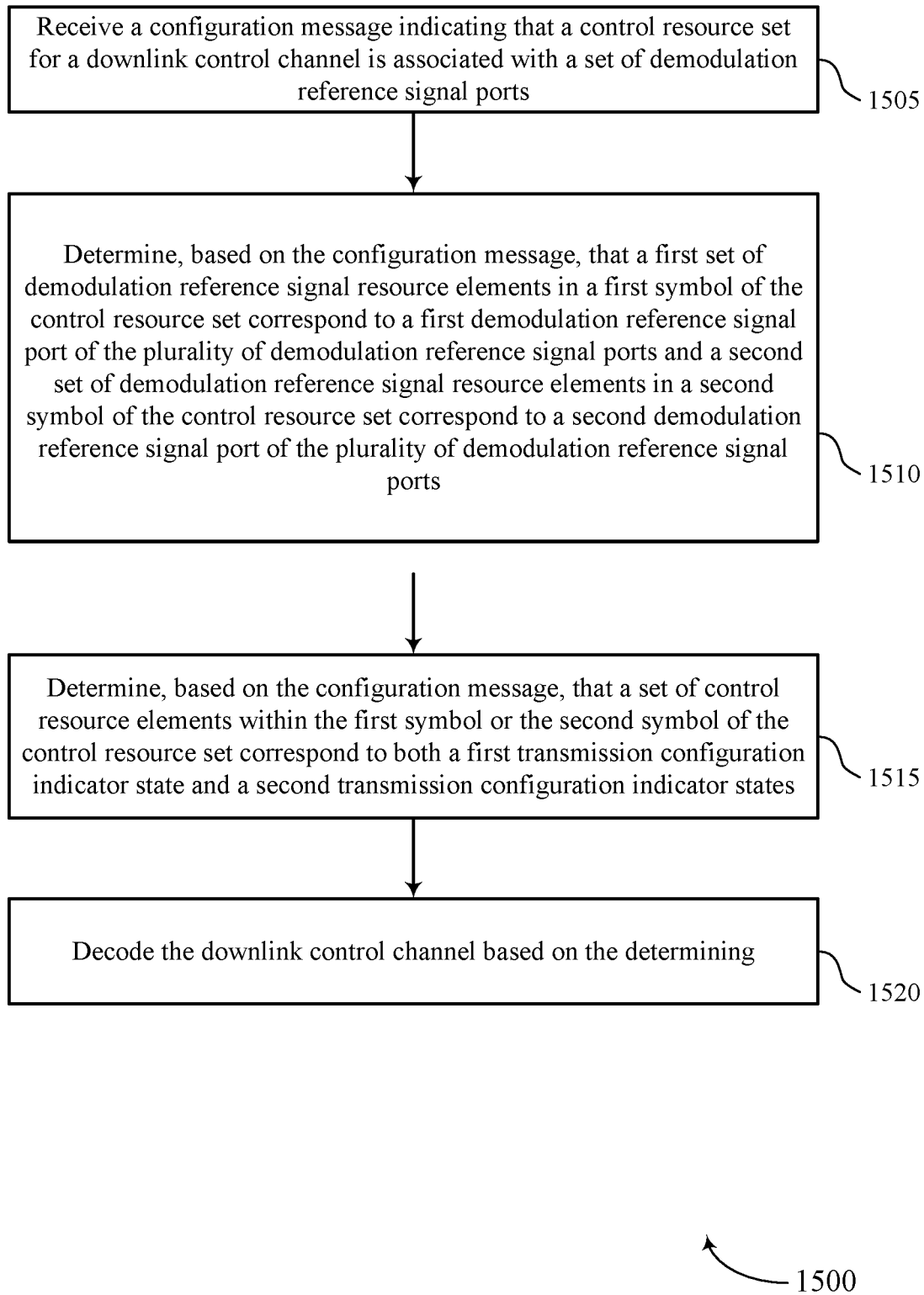

FIG. 15 shows a flowchart illustrating a method 1500 that supports reference signal port mapping for control channels in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive a configuration message indicating that a CORESET for a downlink control channel is associated with a set of DMRS ports. The operations of 1505 may be performed according to the methods described herein. In some examples, aspects of the operations of 1505 may be performed by a configuration receiver as described with reference to FIGS. 5 through 8.

At 1510, the UE may determine, based on the configuration message, that a first set of DMRS REs in a first symbol of the CORESET correspond to a first DMRS port of the set of DMRS ports and a second set of DMRS REs in a second symbol of the CORESET correspond to a second DMRS port of the set of DMRS ports. The operations of 1510 may be performed according to the methods described herein. In some examples, aspects of the operations of 1510 may be performed by a resource set manager as described with reference to FIGS. 5 through 8.

At 1515, the UE may determine, based on the configuration message, that a set of control REs within the first symbol or the second symbol of the CORESET correspond to both a first TCI state and a second TCI states. The operations of 1515 may be performed according to the methods described herein. In some examples, aspects of the operations of 1515 may be performed by a resource set manager as described with reference to FIGS. 5 through 8.

At 1520, the UE may decode the downlink control channel based on the determining. The operations of 1520 may be performed according to the methods described herein. In some examples, aspects of the operations of 1520 may be performed by a decoder as described with reference to FIGS. 5 through 8.

Figure 16:
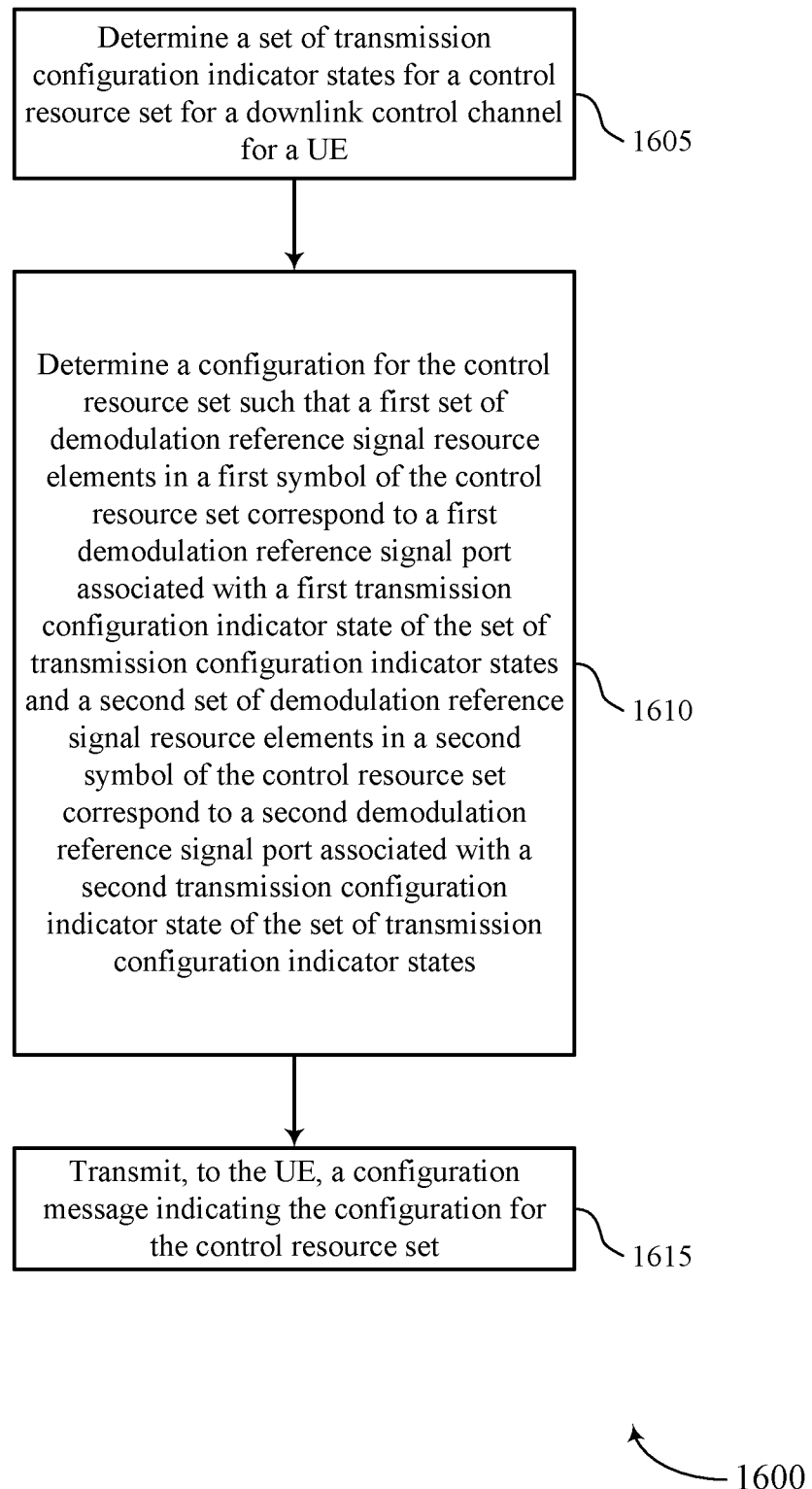

FIG. 16 shows a flowchart illustrating a method 1600 that supports reference signal port mapping for control channels in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may determine a set of TCI states for a CORESET for a downlink control channel for a UE. The operations of 1605 may be performed according to the methods described herein. In some examples, aspects of the operations of 1605 may be performed by a TCI state component as described with reference to FIGS. 9 through 12.

At 1610, the base station may determine a configuration for the CORESET such that a first set of DMRS REs in a first symbol of the CORESET correspond to a first DMRS port associated with a first TCI state of the set of TCI states and a second set of DMRS REs in a second symbol of the CORESET correspond to a second DMRS port associated with a second TCI state of the set of TCI states. The operations of 1610 may be performed according to the methods described herein. In some examples, aspects of the operations of 1610 may be performed by a configuration manager as described with reference to FIGS. 9 through 12.

At 1615, the base station may transmit, to the UE, a configuration message indicating the configuration for the CORESET. The operations of 1615 may be performed according to the methods described herein. In some examples, aspects of the operations of 1615 may be performed by a message transmitter as described with reference to FIGS. 9 through 12.

Figure 17:
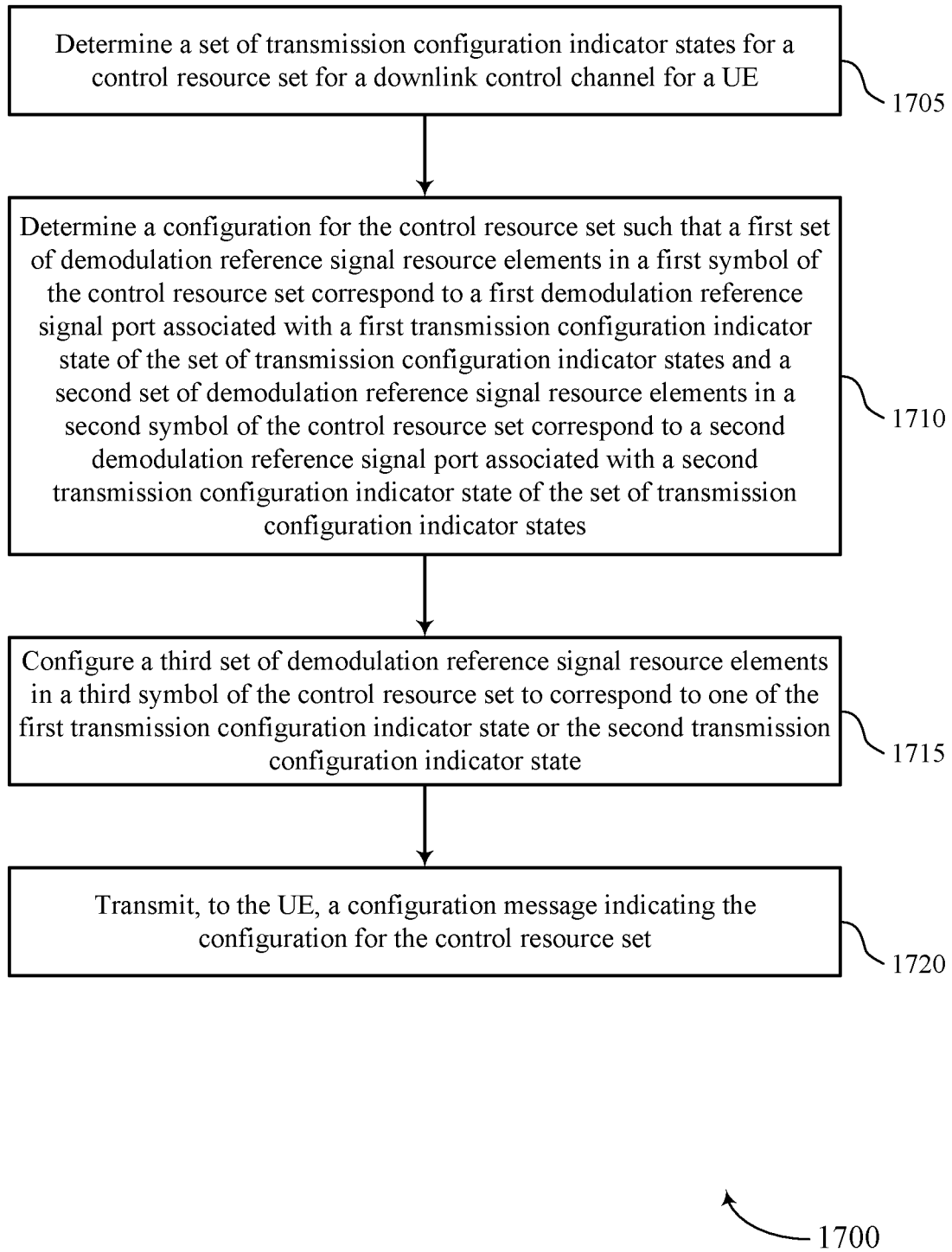

FIG. 17 shows a flowchart illustrating a method 1700 that supports reference signal port mapping for control channels in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may determine a set of TCI states for a CORESET for a downlink control channel for a UE. The operations of 1705 may be performed according to the methods described herein. In some examples, aspects of the operations of 1705 may be performed by a TCI state component as described with reference to FIGS. 9 through 12.

At 1710, the base station may determine a configuration for the CORESET such that a first set of DMRS REs in a first symbol of the CORESET correspond to a first DMRS port associated with a first TCI state of the set of TCI states and a second set of DMRS REs in a second symbol of the CORESET correspond to a second DMRS port associated with a second TCI state of the set of TCI states. The operations of 1710 may be performed according to the methods described herein. In some examples, aspects of the operations of 1710 may be performed by a configuration manager as described with reference to FIGS. 9 through 12.

At 1715, the base station may configure a third set of DMRS REs in a third symbol of the CORESET to correspond to one of the first TCI state or the second TCI state. The operations of 1715 may be performed according to the methods described herein. In some examples, aspects of the operations of 1715 may be performed by a configuration manager as described with reference to FIGS. 9 through 12.

At 1720, the base station may transmit, to the UE, a configuration message indicating the configuration for the CORESET. The operations of 1720 may be performed according to the methods described herein. In some examples, aspects of the operations of 1720 may be performed by a message transmitter as described with reference to FIGS. 9 through 12.

Figure 18:
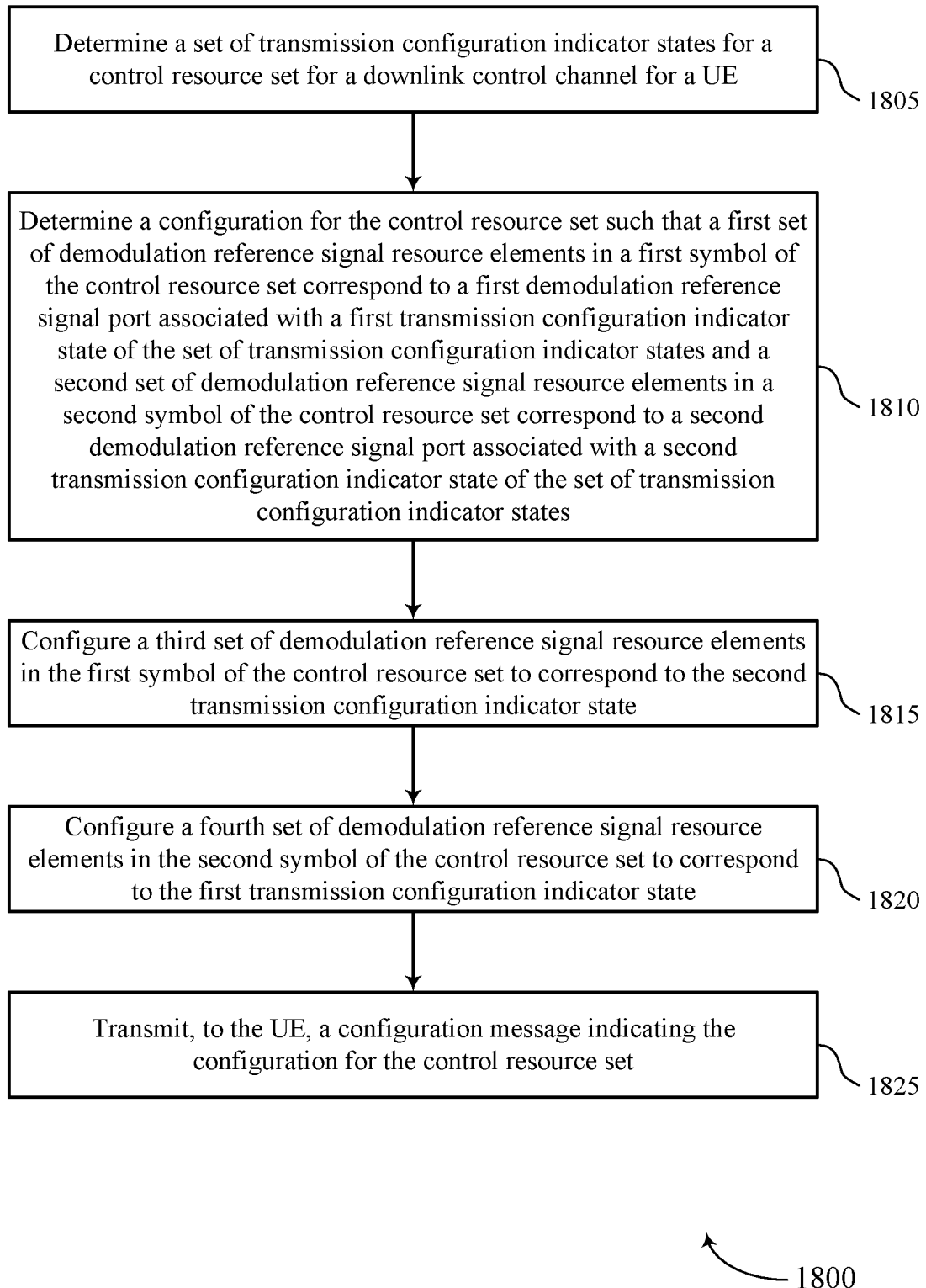

FIG. 18 shows a flowchart illustrating a method 1800 that supports reference signal port mapping for control channels in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may determine a set of TCI states for a CORESET for a downlink control channel for a UE. The operations of 1805 may be performed according to the methods described herein. In some examples, aspects of the operations of 1805 may be performed by a TCI state component as described with reference to FIGS. 9 through 12.

At 1810, the base station may determine a configuration for the CORESET such that a first set of DMRS REs in a first symbol of the CORESET correspond to a first DMRS port associated with a first TCI state of the set of TCI states and a second set of DMRS REs in a second symbol of the CORESET correspond to a second DMRS port associated with a second TCI state of the set of TCI states. The operations of 1810 may be performed according to the methods described herein. In some examples, aspects of the operations of 1810 may be performed by a configuration manager as described with reference to FIGS. 9 through 12.

At 1815, the base station may configure a third set of DMRS REs in the first symbol of the CORESET to correspond to the second TCI state. The operations of 1815 may be performed according to the methods described herein. In some examples, aspects of the operations of 1815 may be performed by a configuration manager as described with reference to FIGS. 9 through 12.

At 1820, the base station may configure a fourth set of DMRS REs in the second symbol of the CORESET to correspond to the first TCI state. The operations of 1820 may be performed according to the methods described herein. In some examples, aspects of the operations of 1820 may be performed by a configuration manager as described with reference to FIGS. 9 through 12.

At 1825, the base station may transmit, to the UE, a configuration message indicating the configuration for the CORESET. The operations of 1825 may be performed according to the methods described herein. In some examples, aspects of the operations of 1825 may be performed by a message transmitter as described with reference to FIGS. 9 through 12.

Figure 19:
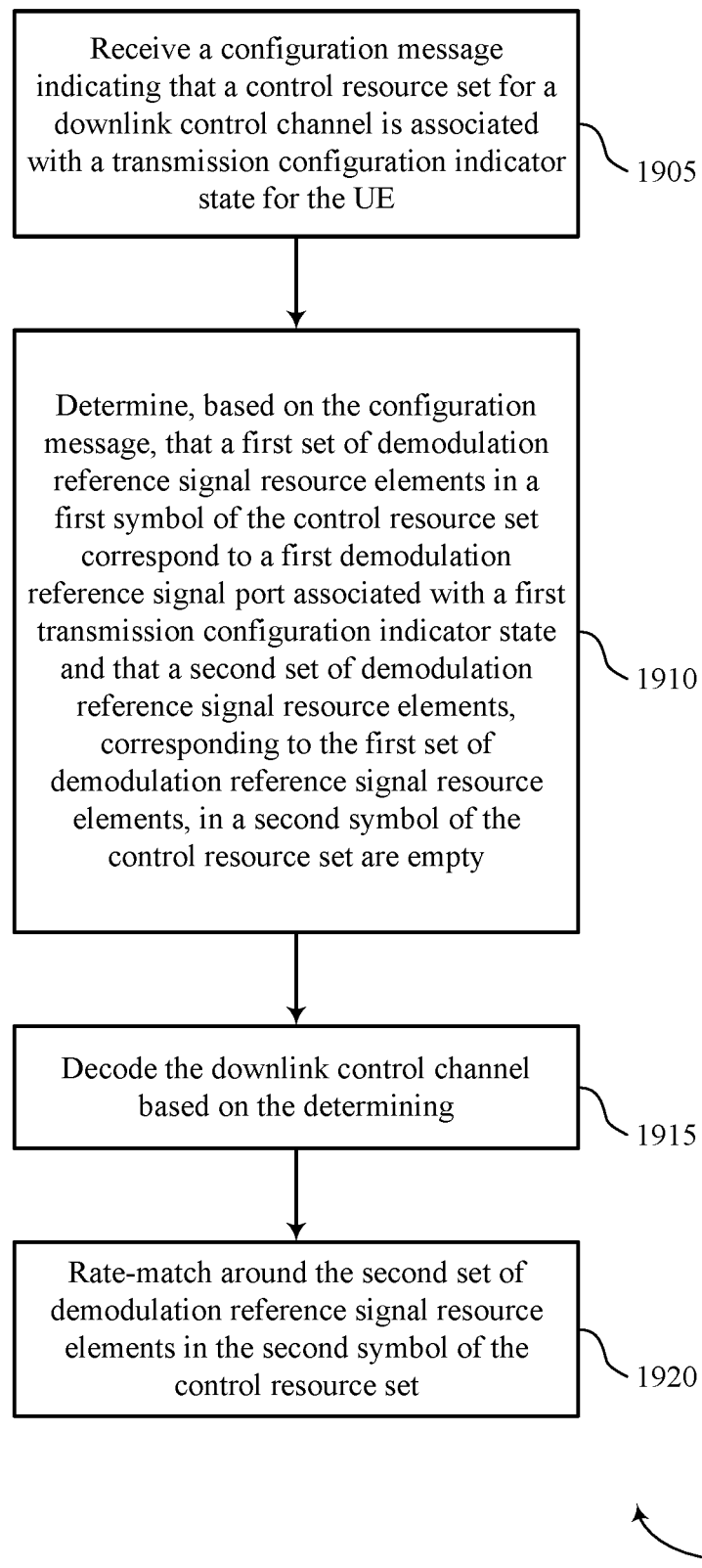

FIG. 19 shows a flowchart illustrating a method 1900 that supports reference signal port mapping for control channels in accordance with aspects of the present disclosure. The operations of method 1900 may be implemented by a UE 115 or its components as described herein. For example, the operations of method 1900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1905, the UE may receive a configuration message indicating that a CORESET for a downlink control channel is associated with a TCI state for the UE. The operations of 1905 may be performed according to the methods described herein. In some examples, aspects of the operations of 1905 may be performed by a configuration receiver as described with reference to FIGS. 5 through 8.

At 1910, the UE may determine, based on the configuration message, that a first set of DMRS REs in a first symbol of the CORESET correspond to a first DMRS port associated with a first TCI state and that a second set of DMRS REs, corresponding to the first set of DMRS REs, in a second symbol of the CORESET are empty. The operations of 1910 may be performed according to the methods described herein. In some examples, aspects of the operations of 1910 may be performed by a resource set manager as described with reference to FIGS. 5 through 8.

At 1915, the UE may decode the downlink control channel based on the determining. The operations of 1915 may be performed according to the methods described herein. In some examples, aspects of the operations of 1915 may be performed by a decoder as described with reference to FIGS. 5 through 8.

At 1920, the UE may rate-match around the second set of DMRS REs in the second symbol of the CORESET. The operations of 1920 may be performed according to the methods described herein. In some examples, aspects of the operations of 1920 may be performed by a decoder as described with reference to FIGS. 5 through 8.

Figure 20:
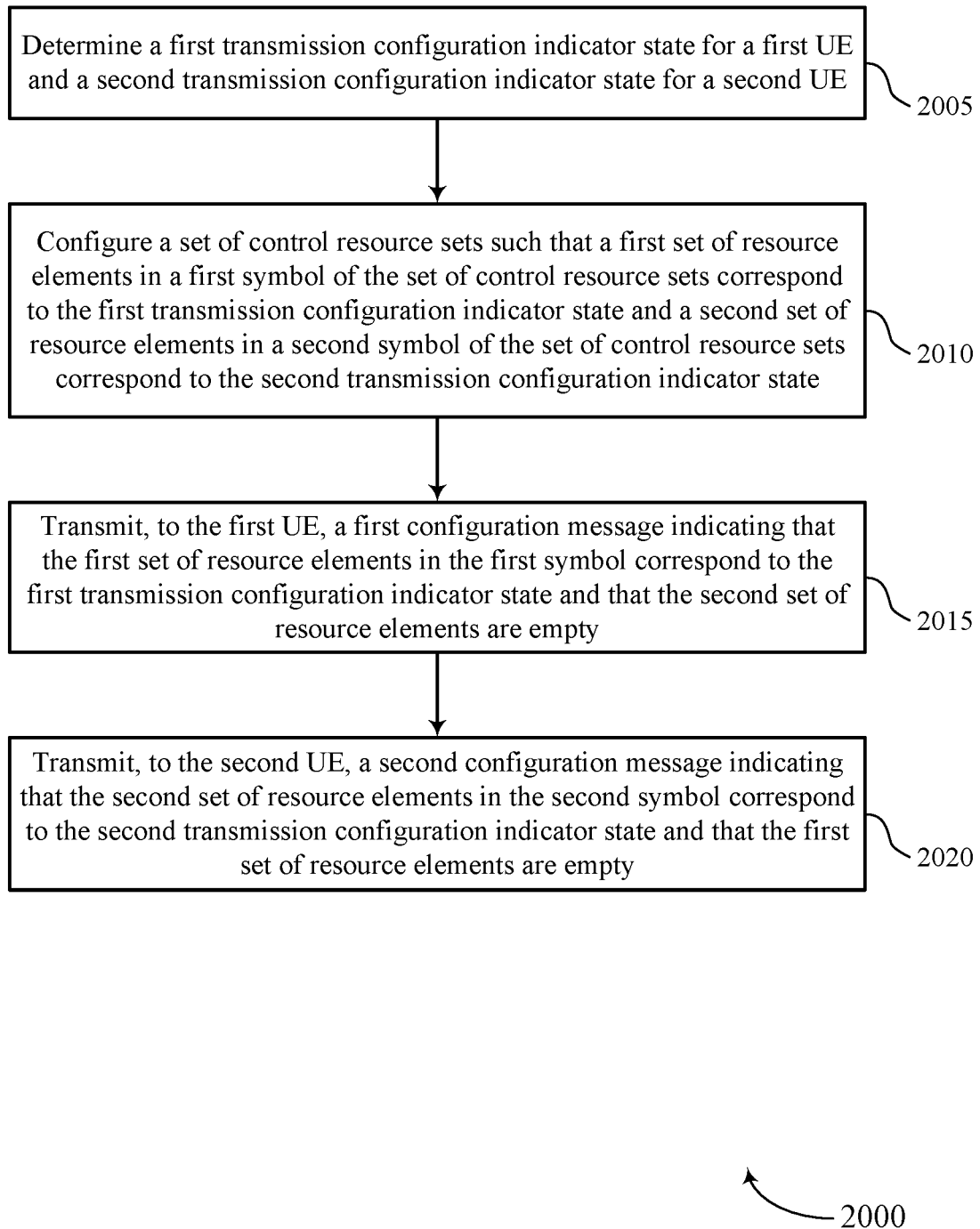

FIG. 20 shows a flowchart illustrating a method 2000 that supports reference signal port mapping for control channels in accordance with aspects of the present disclosure. The operations of method 2000 may be implemented by a base station 105 or its components as described herein. For example, the operations of method 2000 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2005, the base station may determine a first TCI state for a first UE and a second TCI state for a second UE. The operations of 2005 may be performed according to the methods described herein. In some examples, aspects of the operations of 2005 may be performed by a TCI state component as described with reference to FIGS. 9 through 12.

At 2010, the base station may configure a set of CORESETs such that a first set of REs in a first symbol of the set of CORESETs correspond to the first TCI state and a second set of REs in a second symbol of the set of CORESETs correspond to the second TCI state. The operations of 2010 may be performed according to the methods described herein. In some examples, aspects of the operations of 2010 may be performed by a control set manager as described with reference to FIGS. 9 through 12.

At 2015, the base station may transmit, to the first UE, a first configuration message indicating that the first set of REs in the first symbol correspond to the first TCI state and that the second set of REs are empty. The operations of 2015 may be performed according to the methods described herein. In some examples, aspects of the operations of 2015 may be performed by a message transmitter as described with reference to FIGS. 9 through 12.

At 2020, the base station may transmit, to the second UE, a second configuration message indicating that the second set of REs in the second symbol correspond to the second TCI state and that the first set of REs are empty. The operations of 2020 may be performed according to the methods described herein. In some examples, aspects of the operations of 2020 may be performed by a message transmitter as described with reference to FIGS. 9 through 12.

Figure 21:
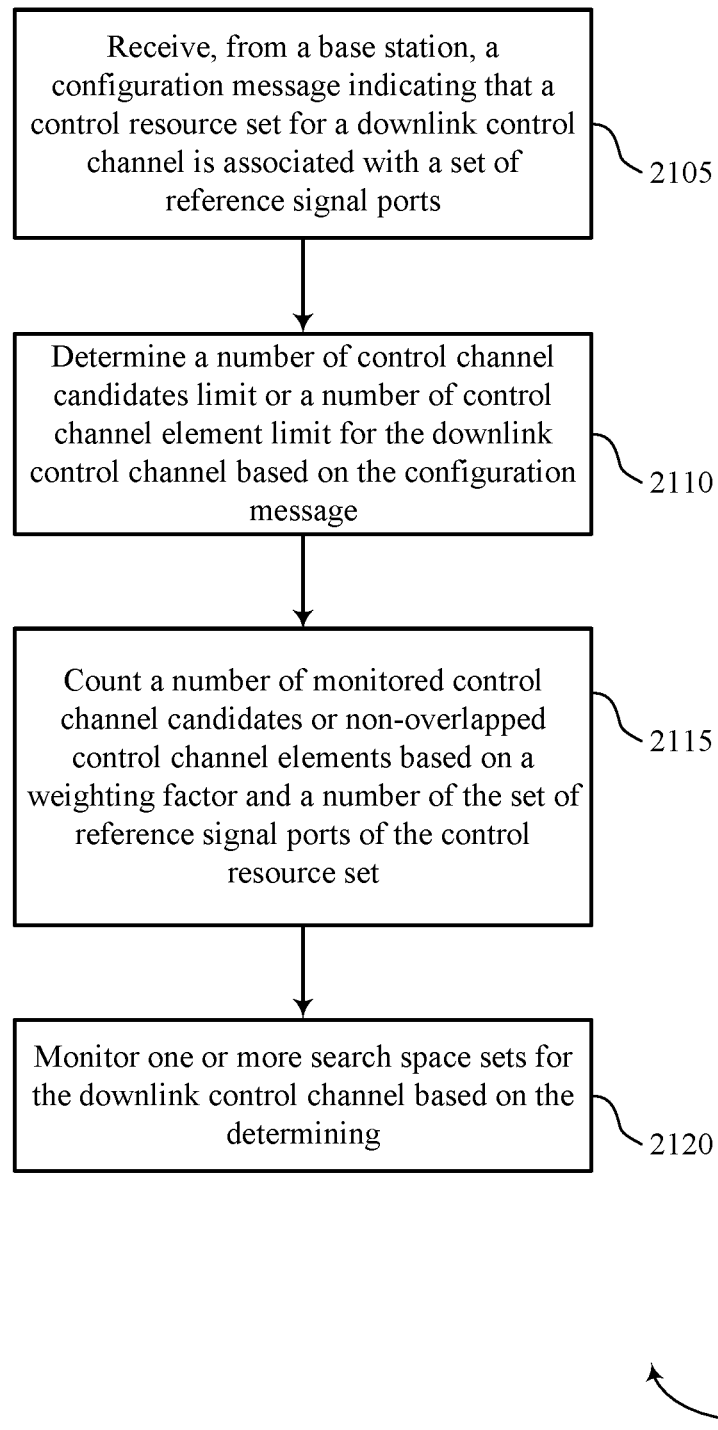

FIG. 21 shows a flowchart illustrating a method 2100 that supports reference signal port mapping for control channels in accordance with aspects of the present disclosure. The operations of method 2100 may be implemented by a UE 115 or its components as described herein. For example, the operations of method 2100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 2105, the UE may receive, from a base station, a configuration message indicating that a CORESET for a downlink control channel is associated with a set of reference signal ports. The operations of 2105 may be performed according to the methods described herein. In some examples, aspects of the operations of 2105 may be performed by a configuration receiver as described with reference to FIGS. 5 through 8.

At 2110, the UE may determine a number of control channel candidates limit or a number of CCE limit for the downlink control channel based on the configuration message. The operations of 2110 may be performed according to the methods described herein. In some examples, aspects of the operations of 2110 may be performed by a control channel component as described with reference to FIGS. 5 through 8.

At 2115, the UE may count a number of monitored control channel candidates or non-overlapped CCEs based on a weighting factor and a number of the set of reference signal ports of the CORESET. The operations of 2115 may be performed according to the methods described herein. In some examples, aspects of the operations of 2115 may be performed by a search space monitor as described with reference to FIGS. 5 through 8.

At 2120, the UE may monitor one or more search space sets for the downlink control channel based on the determining. The operations of 2120 may be performed according to the methods described herein. In some examples, aspects of the operations of 2120 may be performed by a counting manager as described with reference to FIGS. 5 through 8.

Figure 22:
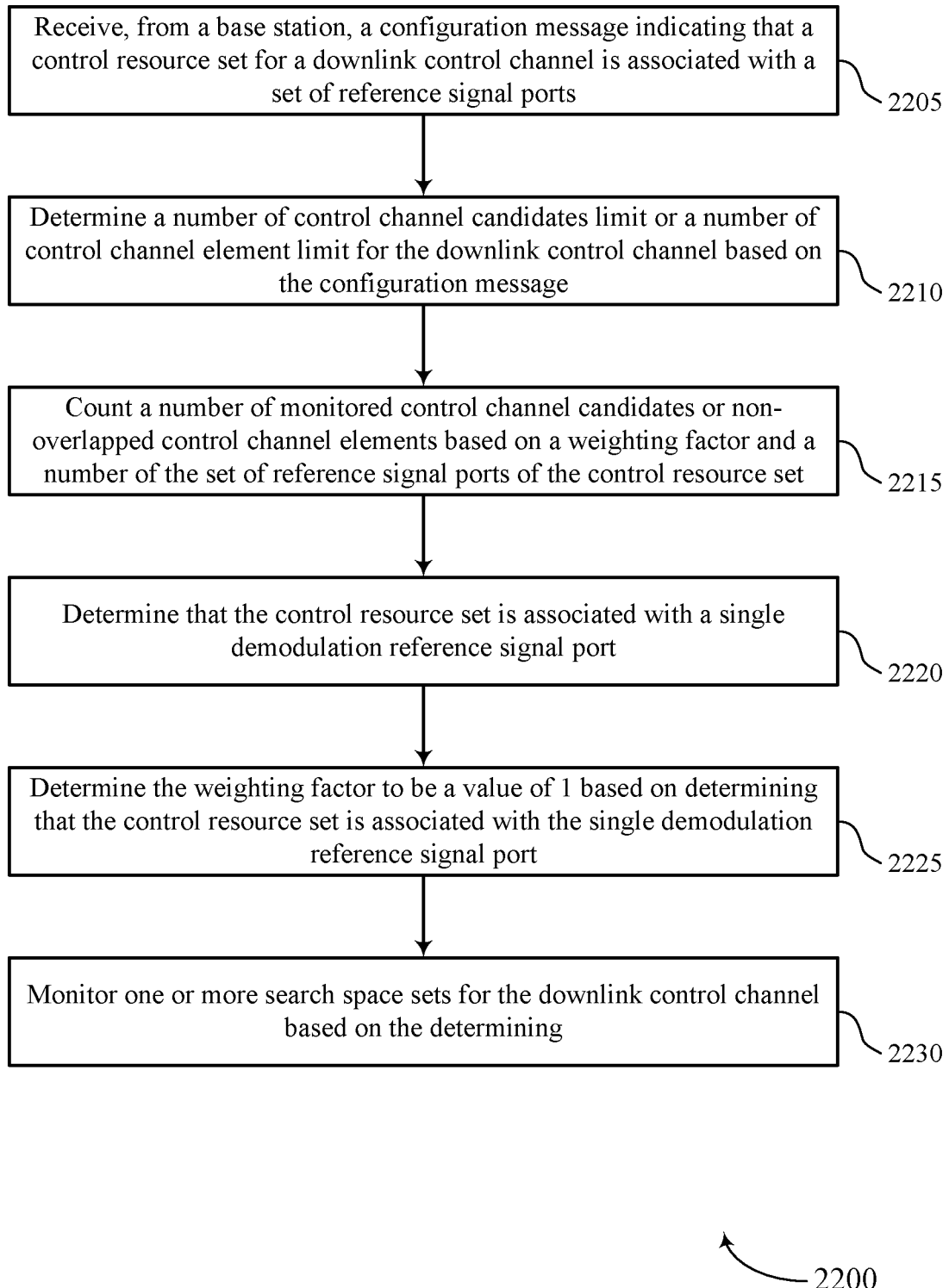

FIG. 22 shows a flowchart illustrating a method 2200 that supports reference signal port mapping for control channels in accordance with aspects of the present disclosure. The operations of method 2200 may be implemented by a UE 115 or its components as described herein. For example, the operations of method 2200 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 2205, the UE may receive, from a base station, a configuration message indicating that a CORESET for a downlink control channel is associated with a set of reference signal ports. The operations of 2205 may be performed according to the methods described herein. In some examples, aspects of the operations of 2205 may be performed by a configuration receiver as described with reference to FIGS. 5 through 8.

At 2210, the UE may determine a number of control channel candidates limit or a number of CCE limit for the downlink control channel based on the configuration message. The operations of 2210 may be performed according to the methods described herein. In some examples, aspects of the operations of 2210 may be performed by a control channel component as described with reference to FIGS. 5 through 8.

At 2215, the UE may count a number of monitored control channel candidates or non-overlapped CCEs based on a weighting factor and a number of the set of reference signal ports of the CORESET. The operations of 2215 may be performed according to the methods described herein. In some examples, aspects of the operations of 2215 may be performed by a search space monitor as described with reference to FIGS. 5 through 8.

At 2220, the UE may determine that the CORESET is associated with a single DMRS port. The operations of 2220 may be performed according to the methods described herein. In some examples, aspects of the operations of 2220 may be performed by a weighting component as described with reference to FIGS. 5 through 8.

At 2225, the UE may determine the weighting factor to be a value of 1 based on determining that the CORESET is associated with the single DMRS port. The operations of 2225 may be performed according to the methods described herein. In some examples, aspects of the operations of 2225 may be performed by a weighting component as described with reference to FIGS. 5 through 8.

At 2230, the UE may monitor one or more search space sets for the downlink control channel based on the determining. The operations of 2230 may be performed according to the methods described herein. In some examples, aspects of the operations of 2230 may be performed by a counting manager as described with reference to FIGS. 5 through 8.

Figure 23:
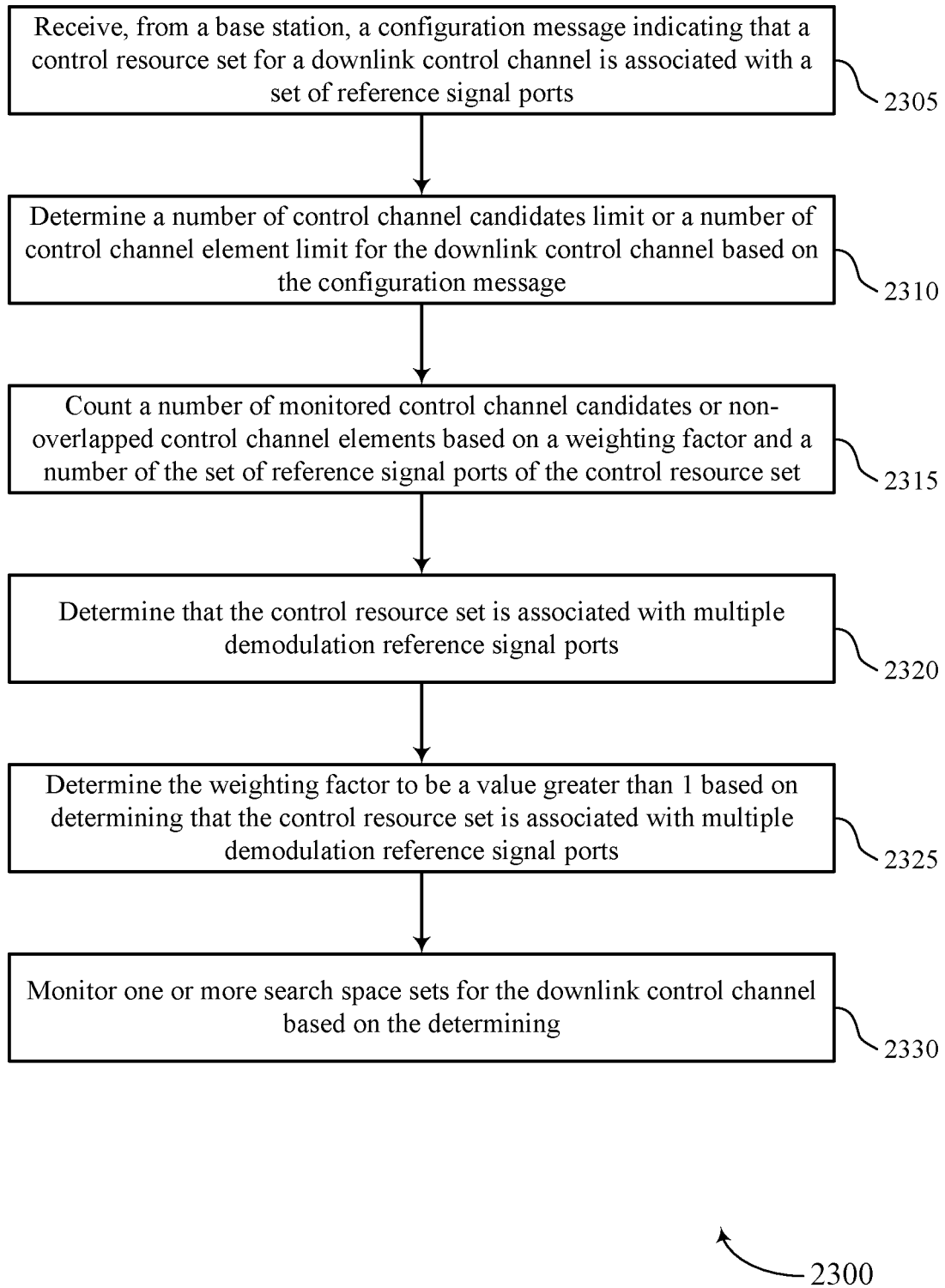

FIG. 23 shows a flowchart illustrating a method 2300 that supports reference signal port mapping for control channels in accordance with aspects of the present disclosure. The operations of method 2300 may be implemented by a UE 115 or its components as described herein. For example, the operations of method 2300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 2305, the UE may receive, from a base station, a configuration message indicating that a CORESET for a downlink control channel is associated with a set of reference signal ports. The operations of 2305 may be performed according to the methods described herein. In some examples, aspects of the operations of 2305 may be performed by a configuration receiver as described with reference to FIGS. 5 through 8.

At 2310, the UE may determine a number of control channel candidates limit or a number of CCE limit for the downlink control channel based on the configuration message. The operations of 2310 may be performed according to the methods described herein. In some examples, aspects of the operations of 2310 may be performed by a control channel component as described with reference to FIGS. 5 through 8.

At 2315, the UE may count a number of monitored control channel candidates or non-overlapped CCEs based on a weighting factor and a number of the set of reference signal ports of the CORESET. The operations of 2315 may be performed according to the methods described herein. In some examples, aspects of the operations of 2315 may be performed by a search space monitor as described with reference to FIGS. 5 through 8.

At 2320, the UE may determine that the CORESET is associated with multiple DMRS ports. The operations of 2320 may be performed according to the methods described herein. In some examples, aspects of the operations of 2320 may be performed by a weighting component as described with reference to FIGS. 5 through 8.

At 2325, the UE may determine the weighting factor to be a value greater than 1 based on determining that the CORESET is associated with multiple DMRS ports. The operations of 2325 may be performed according to the methods described herein. In some examples, aspects of the operations of 2325 may be performed by a weighting component as described with reference to FIGS. 5 through 8.

At 2330, the UE may monitor one or more search space sets for the downlink control channel based on the determining. The operations of 2330 may be performed according to the methods described herein. In some examples, aspects of the operations of 2330 may be performed by a counting manager as described with reference to FIGS. 5 through 8.

Figure 24:
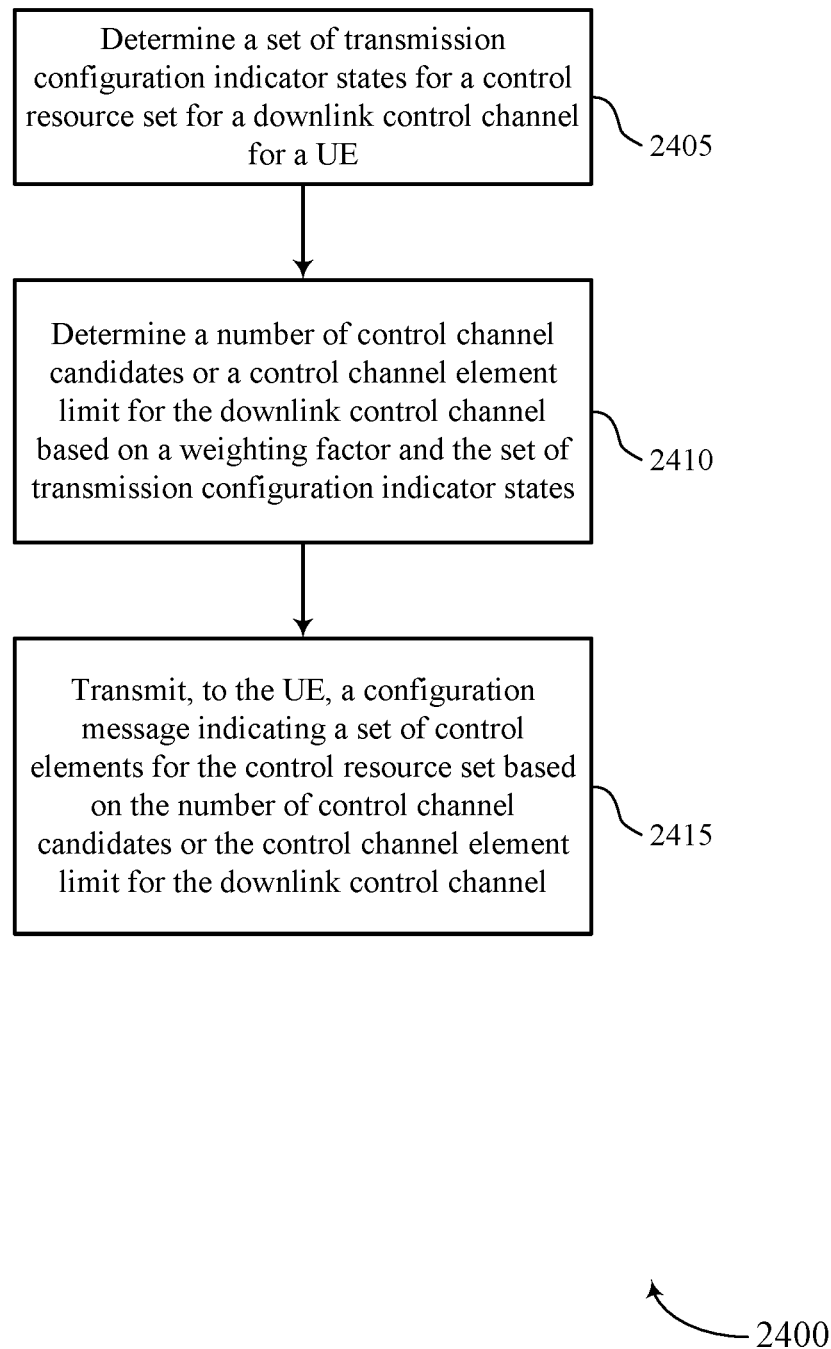

FIG. 24 shows a flowchart illustrating a method 2400 that supports reference signal port mapping for control channels in accordance with aspects of the present disclosure. The operations of method 2400 may be implemented by a base station 105 or its components as described herein. For example, the operations of method 2400 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2405, the base station may determine a set of TCI states for a CORESET for a downlink control channel for a UE. The operations of 2405 may be performed according to the methods described herein. In some examples, aspects of the operations of 2405 may be performed by a TCI state component as described with reference to FIGS. 9 through 12.

At 2410, the base station may determine a number of control channel candidates or a CCE limit for the downlink control channel based on a weighting factor and the set of TCI states. The operations of 2410 may be performed according to the methods described herein. In some examples, aspects of the operations of 2410 may be performed by a control channel manager as described with reference to FIGS. 9 through 12.

At 2415, the base station may transmit, to the UE, a configuration message indicating a set of control elements for the CORESET based on the number of control channel candidates or the CCE limit for the downlink control channel. The operations of 2415 may be performed according to the methods described herein. In some examples, aspects of the operations of 2415 may be performed by a message transmitter as described with reference to FIGS. 9 through 12.

Figure 25:
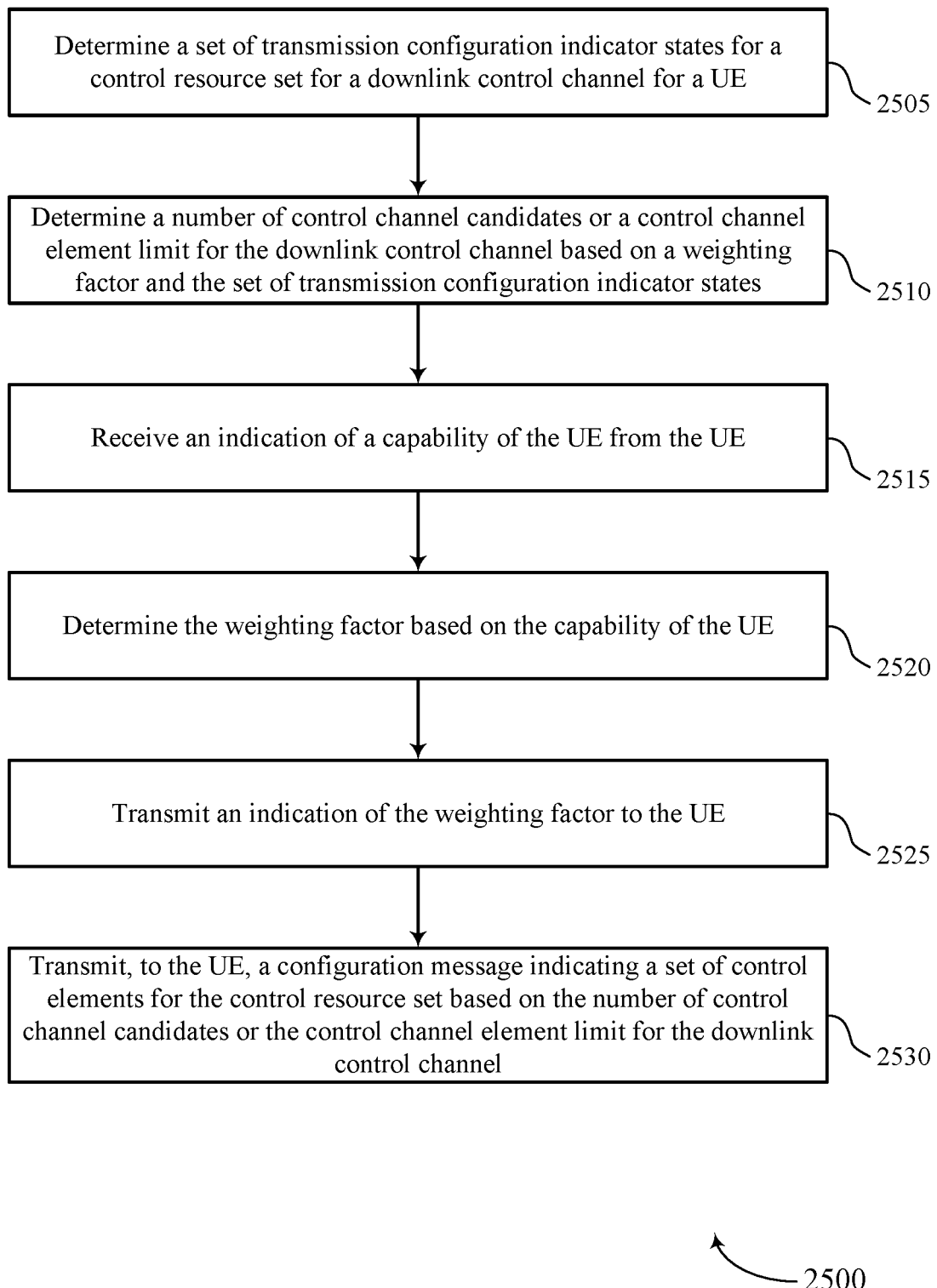

FIG. 25 shows a flowchart illustrating a method 2500 that supports reference signal port mapping for control channels in accordance with aspects of the present disclosure. The operations of method 2500 may be implemented by a base station 105 or its components as described herein. For example, the operations of method 2500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2505, the base station may determine a set of TCI states for a CORESET for a downlink control channel for a UE. The operations of 2505 may be performed according to the methods described herein. In some examples, aspects of the operations of 2505 may be performed by a TCI state component as described with reference to FIGS. 9 through 12.

At 2510, the base station may determine a number of control channel candidates or a CCE limit for the downlink control channel based on a weighting factor and the set of TCI states. The operations of 2510 may be performed according to the methods described herein. In some examples, aspects of the operations of 2510 may be performed by a control channel manager as described with reference to FIGS. 9 through 12.

At 2515, the base station may receive an indication of a capability of the UE from the UE. The operations of 2515 may be performed according to the methods described herein. In some examples, aspects of the operations of 2515 may be performed by a capability component as described with reference to FIGS. 9 through 12.

At 2520, the base station may determine the weighting factor based on the capability of the UE. The operations of 2520 may be performed according to the methods described herein. In some examples, aspects of the operations of 2520 may be performed by a weighting module as described with reference to FIGS. 9 through 12.

At 2525, the base station may transmit an indication of the weighting factor to the UE. The operations of 2525 may be performed according to the methods described herein. In some examples, aspects of the operations of 2525 may be performed by a weighting module as described with reference to FIGS. 9 through 12.

At 2530, the base station may transmit, to the UE, a configuration message indicating a set of control elements for the CORESET based on the number of control channel candidates or the CCE limit for the downlink control channel. The operations of 2530 may be performed according to the methods described herein. In some examples, aspects of the operations of 2530 may be performed by a message transmitter as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving a configuration message indicating that a CORESET for a downlink control channel is associated with a plurality of DMRS ports; determining, based at least in part on the configuration message, that a first set of DMRS REs in a first symbol of the CORESET correspond to a first DMRS port of the plurality of DMRS ports and a second set of DMRS REs in a second symbol of the CORESET correspond to a second DMRS port of the plurality of DMRS ports; and decoding the downlink control channel based at least in part on the determining.

Aspect 2: The method of aspect 1, further comprising: determining, based at least in part on the configuration message, that a set of control REs within the first symbol or the second symbol of the CORESET correspond to both the first DMRS port associated with a first layer and the second DMRS port associated with a second layer.

Aspect 3: The method of any of aspects 1 through 2, further comprising: determining, based at least in part on the configuration message, that a set of control REs within the first symbol or the second symbol of the CORESET correspond to both a first TCI state and a second TCI states.

Aspect 4: The method of any of aspects 1 through 3, further comprising: determining, based at least in part on the configuration message, that a first pattern of the first set of DMRS REs is the same across a first set of resource blocks of the first symbol of the CORESET and that a second pattern of the second DMRS REs is the same across a second set of resource blocks of the second symbol of the CORESET.

Aspect 5: The method of aspect 4, wherein the first set of resource blocks comprises all resource blocks of the first symbol allocated for the CORESET and the second set of resource blocks comprise all resource blocks of the second symbol allocated to the CORESET.

Aspect 6: The method of any of aspects 1 through, wherein the first DMRS port corresponds to a first layer; and the second DMRS port corresponds to a second layer.

Aspect 7: The method of any of aspects 1 through 6, further comprising: determining, based at least in part on the configuration message, that a third set of DMRS REs in a third symbol of the CORESET correspond to one of the first DMRS port or the second DMRS port.

Aspect 8: The method of any of aspects 1 through 7, further comprising: determining, based at least in part on the configuration message, that a third set of DMRS REs in the first symbol of the CORESET correspond to the second DMRS port; and determining, based at least in part on the configuration message, that a fourth set of DMRS REs in the second symbol of the CORESET correspond to the first DMRS port.

Aspect 9: The method of aspect 8, wherein resource blocks that contain the third set of DMRS REs are different from resource blocks that contain the first set of DMRS REs.

Aspect 10: The method of any of aspects 8 through 9, wherein the fourth set of DMRS REs is associated with a resource block different from the second set of DMRS REs.

Aspect 11: The method of any of aspects 1 through 10, wherein receiving the configuration message comprises: receiving the configuration message via RRC signaling.

Aspect 12: The method of any of aspects 1 through 11, wherein the first and second symbols are OFDM symbols.

Aspect 13: The method of any of aspects 1 through 11, the first DMRS port is associated with a first TCI state and the second DMRS port is associated with a second TCI state.

Aspect 14: A method for wireless communications at a base station, comprising: determining a plurality of TCI states for a CORESET for a downlink control channel for a UE; determining a configuration for the CORESET such that a first set of DMRS REs in a first symbol of the CORESET correspond to a first DMRS port associated with a first TCI state of the plurality of TCI states and a second set of DMRS REs in a second symbol of the CORESET correspond to a second DMRS port associated with a second TCI state of the plurality of TCI states; and transmitting, to the UE, a configuration message indicating the configuration for the CORESET.

Aspect 15: The method of aspect 14, further comprising: configuring a set of control REs within the first symbol or the second symbol of the CORESET to correspond to both the first DMRS port associated with a first layer and the second DMRS port associated with a second layer.

Aspect 16: The method of any of aspects 14 through 15, further comprising: configuring a set of control REs within the first symbol or the second symbol of the CORESET to correspond to both the first TCI state and the second TCI state.

Aspect 17: The method of any of aspects 14 through 16, further comprising: configuring a pattern of the first set of DMRS REs to be the same across a set of resource blocks of the first symbol of the CORESET.

Aspect 18: The method of any of aspects 14 through 17, further comprising: configuring a pattern of the second set of DMRS REs to be the same across a set of resource blocks of the second symbol of the CORESET.

Aspect 19: The method of any of aspects 14 through 18, further comprising: configuring a third set of DMRS REs in a third symbol of the CORESET to correspond to one of the first TCI state or the second TCI state.

Aspect 20: The method of any of aspects 14 through 19, further comprising: configuring a third set of DMRS REs in the first symbol of the CORESET to correspond to the second TCI state; and configuring a fourth set of DMRS REs in the second symbol of the CORESET to correspond to the first TCI state.

Aspect 21: The method of aspect 20, wherein the third set of DMRS REs is associated with a resource block different from the first set of DMRS REs.

Aspect 22: The method of any of aspects 20 through 21, wherein the fourth set of DMRS REs is associated with a resource block different from the second set of DMRS REs.

Aspect 23: The method of any of aspects 14 through 22, further comprising: transmitting the configuration message via RRC signaling.

Aspect 24: The method of any of aspects 14 through 23, wherein the first and second symbols are OFDM symbols.

Aspect 25: A method for wireless communications at a UE, comprising: receiving a configuration message indicating that a CORESET for a downlink control channel is associated with a TCI state for the UE; determining, based at least in part on the configuration message, that a first set of DMRS REs in a first symbol of the CORESET correspond to a first DMRS port associated with a first TCI state and that a second set of DMRS REs, corresponding to the first set of DMRS REs, in a second symbol of the CORESET are empty; and decoding the downlink control channel based at least in part on the determining.

Aspect 26: The method of aspect 25, wherein decoding the downlink control channel comprises: rate-matching around the second set of DMRS REs in the second symbol of the CORESET.

Aspect 27: The method of any of aspects 25 through 26, further comprising: determining, based at least in part on the configuration message, that a set of control REs within the first symbol of the CORESET is associated with the first TCI state and the first DMRS port, wherein the set of control REs and the first set of DMRS REs are non-overlapping.

Aspect 28: The method of any of aspects 25 through 27, further comprising: determining, based at least in part on the configuration message, that a set of control REs within the second symbol of the CORESET is associated with the first TCI state and the first DMRS port, wherein the set of control REs and the second set of DMRS REs are non-overlapping.

Aspect 29: The method of any of aspects 25 through 28, further comprising: determining, based at least in part on the configuration message, that the first set of DMRS REs correspond to the first DMRS port associated with the first TCI state.

Aspect 30: The method of aspect 29, wherein the first DMRS port corresponds to a first layer.

Aspect 31: The method of any of aspects 25 through 30, further comprising: determining, based at least in part on the configuration message, that a pattern of the first set of DMRS REs is the same across a set of resource blocks of the first symbol of the CORESET.

Aspect 32: The method of any of aspects 25 through 31, further comprising: receiving the configuration message via RRC signaling.

Aspect 33: The method of any of aspects 25 through 32, wherein the first and second symbols are OFDM symbols.

Aspect 34: A method for wireless communications at a base station, comprising: determining a first TCI state for a first UE and a second TCI state for a second UE; configuring a plurality of CORESETs such that a first set of REs in a first symbol of the plurality of CORESETs correspond to the first TCI state and a second set of REs in a second symbol of the plurality of CORESETs correspond to the second TCI state; transmitting, to the first UE, a first configuration message indicating that the first set of REs in the first symbol correspond to the first TCI state and that the second set of REs are empty; and transmitting, to the second UE, a second configuration message indicating that the second set of REs in the second symbol correspond to the second TCI state and that the first set of REs are empty.

Aspect 35: The method of aspect 34, further comprising: performing rate-matching around the second set of REs for a downlink control channel for the first UE.

Aspect 36: The method of any of aspects 34 through 35, further comprising: performing rate-matching around the first set of REs for a downlink control channel for the second UE.

Aspect 37: The method of any of aspects 34 through 36, further comprising: configuring the first set of REs for a first DMRS port associated with the first TCI state; and configuring the second set of REs for a second DMRS port associated with the second TCI state.

Aspect 38: The method of any of aspects 34 through 37, further comprising: transmitting the first and second configuration messages via RRC signaling.

Aspect 39: The method of any of aspects 34 through 38, wherein the first and second symbols are OFDM symbols.

Aspect 40: A method for wireless communications at a UE, comprising: receiving, from a base station, a configuration message indicating that a CORESET for a downlink control channel is associated with a plurality of reference signal ports; determining a number of control channel candidates limit or a number of CCE limit for the downlink control channel based at least in part on the configuration message; counting a number of monitored control channel candidates or non-overlapped CCEs based at least in part on a weighting factor and a number of the plurality of reference signal ports of the CORESET; and monitoring one or more search space sets for the downlink control channel based at least in part on the determining.

Aspect 41: The method of aspect 40, wherein counting comprises multiplying the weighting factor with the number of monitored control channel candidates or the number of non-overlapped CCEs.

Aspect 42: The method of any of aspects 40 through 41, further comprising: determining that the CORESET is associated with a single DMRS port; and determining the weighting factor to be a value of 1 based at least in part on determining that the CORESET is associated with the single DMRS port.

Aspect 43: The method of any of aspects 40 through 42, further comprising: determining that the CORESET is associated with multiple DMRS ports; and determining the weighting factor to be a value greater than 1 based at least in part on determining that the CORESET is associated with multiple DMRS ports.

Aspect 44: The method of any of aspects 40 through 43, further comprising: transmitting an indication of a capability of the UE to the base station; and receiving an indication of the weighting factor from the base station, wherein the weighting factor is based at least in part on the capability of the UE.

Aspect 45: The method of any of aspects 40 through 44, further comprising: determining whether the plurality of reference signal ports correspond to the same or different TCI states; and determining the weighting factor based at least in part on whether the plurality of reference signal ports correspond to the same or different TCI states.

Aspect 46: The method of any of aspects 40 through 45, further comprising: determining whether the plurality of reference signal ports correspond to one or multiple TCI states; and determining the weighting factor based at least in part on whether the plurality of reference signal ports correspond to one or multiple TCI states.

Aspect 47: A method for wireless communications at a base station, comprising: determining a plurality of TCI states for a CORESET for a downlink control channel for a UE; determining a number of control channel candidates or a CCE limit for the downlink control channel based at least in part on a weighting factor and the plurality of TCI states; and transmitting, to the UE, a configuration message indicating a set of control elements for the CORESET based at least in part on the number of control channel candidates or the CCE limit for the downlink control channel.

Aspect 48: The method of aspect 47, further comprising: determining that the CORESET is associated with a single DMRS port; and determining the weighting factor to be a value of 1 based at least in part on determining that the CORESET is associated with the single DMRS port.

Aspect 49: The method of any of aspects 47 through 48, further comprising: determining that the CORESET is associated with multiple DMRS ports; and determining the weighting factor to be a value greater than 1 based at least in part on determining that the CORESET is associated with multiple DMRS ports.

Aspect 50: The method of any of aspects 47 through 49, further comprising: receiving an indication of a capability of the UE from the UE; and determining the weighting factor based at least in part on the capability of the UE.

Aspect 51: The method of aspect 50, further comprising: transmitting an indication of the weighting factor to the UE.

Aspect 52: An apparatus for wireless communications at a UE, comprising a processor; memory coupled with the processor; and instructions stored in the memory and executable by the processor to cause the apparatus to perform a method of any of aspects 1 through 12.

Aspect 53: An apparatus for wireless communications at a UE, comprising at least one means for performing a method of any of aspects 1 through 12.

Aspect 54: A non-transitory computer-readable medium storing code for wireless communications at a UE, the code comprising instructions executable by a processor to perform a method of any of aspects 1 through 12.

Aspect 55: An apparatus for wireless communications at a base station, comprising a processor; memory coupled with the processor; and instructions stored in the memory and executable by the processor to cause the apparatus to perform a method of any of aspects 14 through 24.

Aspect 56: An apparatus for wireless communications at a base station, comprising at least one means for performing a method of any of aspects 14 through 24.

Aspect 57: A non-transitory computer-readable medium storing code for wireless communications at a base station, the code comprising instructions executable by a processor to perform a method of any of aspects 14 through 24.

Aspect 58: An apparatus for wireless communications at a UE, comprising a processor; memory coupled with the processor; and instructions stored in the memory and executable by the processor to cause the apparatus to perform a method of any of aspects 25 through 33.

Aspect 59: An apparatus for wireless communications at a UE, comprising at least one means for performing a method of any of aspects 25 through 33.

Aspect 60: A non-transitory computer-readable medium storing code for wireless communications at a UE, the code comprising instructions executable by a processor to perform a method of any of aspects 25 through 33.

Aspect 61: An apparatus for wireless communications at a base station, comprising a processor; memory coupled with the processor; and instructions stored in the memory and executable by the processor to cause the apparatus to perform a method of any of aspects 34 through 39.

Aspect 62: An apparatus for wireless communications at a base station, comprising at least one means for performing a method of any of aspects 34 through 39.

Aspect 63: A non-transitory computer-readable medium storing code for wireless communications at a base station, the code comprising instructions executable by a processor to perform a method of any of aspects 34 through 39.

Aspect 64: An apparatus for wireless communications at a UE, comprising a processor; memory coupled with the processor; and instructions stored in the memory and executable by the processor to cause the apparatus to perform a method of any of aspects 40 through 46.

Aspect 65: An apparatus for wireless communications at a UE, comprising at least one means for performing a method of any of aspects 40 through 46.

Aspect 66: A non-transitory computer-readable medium storing code for wireless communications at a UE, the code comprising instructions executable by a processor to perform a method of any of aspects 40 through 46.

Aspect 67: An apparatus for wireless communications at a base station, comprising a processor; memory coupled with the processor; and instructions stored in the memory and executable by the processor to cause the apparatus to perform a method of any of aspects 47 through 51.

Aspect 68: An apparatus for wireless communications at a base station, comprising at least one means for performing a method of any of aspects 47 through 51.

Aspect 69: A non-transitory computer-readable medium storing code for wireless communications at a base station, the code comprising instructions executable by a processor to perform a method of any of aspects 47 through 51.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). The term "or" may be used interchangeably with "and/or." Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving, via radio resource control signaling, a configuration message indicating that a control resource set for a downlink control channel is associated with a plurality of demodulation reference signal ports;
   determining, based at least in part on the configuration message, that a first set of demodulation reference signal resource elements in a first symbol of the control resource set correspond to a first demodulation reference signal port of the plurality of demodulation reference signal ports and a second set of demodulation reference signal resource elements in a second symbol of the control resource set correspond to a second demodulation reference signal port of the plurality of demodulation reference signal ports, wherein the first symbol is different from the second symbol and the first demodulation reference signal port is different from the second demodulation reference signal port; and decoding the downlink control channel based at least in part on the determining.

2. The method of claim 1, further comprising:
determining, based at least in part on the configuration message, that a set of control resource elements within the first symbol or the second symbol of the control resource set correspond to both the first demodulation reference signal port associated with a first layer and the second demodulation reference signal port associated with a second layer.

3. The method of claim 1, further comprising:
determining, based at least in part on the configuration message, that a set of control resource elements within the first symbol or the second symbol of the control resource set correspond to both a first transmission configuration indicator state and a second transmission configuration indicator state.

4. The method of claim 1, further comprising:
determining, based at least in part on the configuration message, that a first pattern of the first set of demodulation reference signal resource elements is the same across a first set of resource blocks of the first symbol of the control resource set and that a second pattern of the second of demodulation reference signal resource elements is the same across a second set of resource blocks of the second symbol of the control resource set.

5. The method of claim 4, wherein the first set of resource blocks comprises all resource blocks of the first symbol allocated for the control resource set and the second set of resource blocks comprise all resource blocks of the second symbol allocated to the control resource set.

6. The method of claim 1, wherein:
the first demodulation reference signal port corresponds to a first layer; and
the second demodulation reference signal port corresponds to a second layer.

7. The method of claim 1, further comprising:
determining, based at least in part on the configuration message, that a third set of demodulation reference signal resource elements in a third symbol of the control resource set correspond to one of the first demodulation reference signal port or the second demodulation reference signal port.

8. The method of claim 1, further comprising:
determining, based at least in part on the configuration message, that a third set of demodulation reference signal resource elements in the first symbol of the control resource set correspond to the second demodulation reference signal port; and
determining, based at least in part on the configuration message, that a fourth set of demodulation reference signal resource elements in the second symbol of the control resource set correspond to the first demodulation reference signal port.

9. The method of claim 8, wherein:
resource blocks that contain the third set of demodulation reference signal resource elements are different from resource blocks that contain the first set of demodulation reference signal resource elements.

10. The method of claim 8, wherein the fourth set of demodulation reference signal resource elements is associated with a resource block different from the second set of demodulation reference signal resource elements.

11. The method of claim 1, wherein the first and second symbols are orthogonal frequency division multiplexing symbols.

12. The method of claim 1, wherein the first demodulation reference signal port is associated with a first transmission configuration indicator state and the second demodulation reference signal port is associated with a second transmission configuration indicator state.

13. A method for wireless communications at a user equipment (UE), comprising:
receiving a configuration message indicating that a control resource set for a downlink control channel is associated with a transmission configuration indicator state for the UE;
determining, based at least in part on the configuration message, that a first set of demodulation reference signal resource elements in a first symbol of the control resource set correspond to a first demodulation reference signal port associated with a first transmission configuration indicator state and that a second set of demodulation reference signal resource elements, corresponding to the first set of demodulation reference signal resource elements, in a second symbol of the control resource set are excluded from channel estimation by the UE; and
decoding the downlink control channel based at least in part on the determining.

14. The method of claim 13, wherein decoding the downlink control channel comprises:
rate-matching around the second set of demodulation reference signal resource elements in the second symbol of the control resource set.

15. The method of claim 13, further comprising:
determining, based at least in part on the configuration message, that a set of control resource elements within the first symbol of the control resource set is associated with the first transmission configuration indicator state and the first demodulation reference signal port, wherein the set of control resource elements and the first set of demodulation reference signal resource elements are non-overlapping.

16. The method of claim 13, further comprising:
determining, based at least in part on the configuration message, that a set of control resource elements within the second symbol of the control resource set is associated with the first transmission configuration indicator state and the first demodulation reference signal port, wherein the set of control resource elements and the second set of demodulation reference signal resource elements are non-overlapping.

17. The method of claim 13, further comprising:
determining, based at least in part on the configuration message, that the first set of demodulation reference signal resource elements correspond to the first demodulation reference signal port associated with the first transmission configuration indicator state.

18. The method of claim 17, wherein the first demodulation reference signal port corresponds to a first layer.

19. The method of claim 13, further comprising:
determining, based at least in part on the configuration message, that a pattern of the first set of demodulation reference signal resource elements is the same across a set of resource blocks of the first symbol of the control resource set.

20. The method of claim 13, further comprising:
receiving the configuration message via radio resource control signaling.

21. The method of claim 13, wherein the first and second symbols are orthogonal frequency division multiplexing symbols.

22. A method for wireless communications at a user equipment (UE), comprising:
- receiving, from a network device, a configuration message indicating that a control resource set for a downlink control channel is associated with a plurality of reference signal ports;
- determining a number of control channel candidates limit or a number of control channel element limit for the downlink control channel based at least in part on the configuration message;
- counting a number of monitored control channel candidates or a number of non-overlapped control channel elements based at least in part on a weighting factor and a number of the plurality of reference signal ports of the control resource set; and
- monitoring one or more search space sets for the downlink control channel based at least in part on the determining.

23. The method of claim 22, wherein counting comprises:
- multiplying the weighting factor with the number of monitored control channel candidates or the number of non-overlapped control channel elements.

24. The method of claim 22, further comprising:
- determining that the control resource set is associated with a single demodulation reference signal port; and
- determining the weighting factor to be a value of 1 based at least in part on determining that the control resource set is associated with the single demodulation reference signal port.

25. The method of claim 22, further comprising:
- determining that the control resource set is associated with multiple demodulation reference signal ports; and
- determining the weighting factor to be a value greater than 1 based at least in part on determining that the control resource set is associated with multiple demodulation reference signal ports.

26. The method of claim 22, further comprising:
- transmitting an indication of a capability of the UE to the network device; and
- receiving an indication of the weighting factor from the network device, wherein the weighting factor is based at least in part on the capability of the UE.

27. The method of claim 22, further comprising:
- determining whether the plurality of reference signal ports correspond to the same or different transmission configuration indicator states; and
- determining the weighting factor based at least in part on whether the plurality of reference signal ports correspond to the same or different transmission configuration indicator states.

28. An apparatus for wireless communications at a user equipment (UE), comprising:
- a processor,
- memory coupled with the processor; and
- instructions stored in the memory and executable by the processor to cause the apparatus to:
  - receive, via radio resource control signaling, a configuration message indicating that a control resource set for a downlink control channel is associated with a plurality of demodulation reference signal ports;
  - determine, based at least in part on the configuration message, that a first set of demodulation reference signal resource elements in a first symbol of the control resource set correspond to a first demodulation reference signal port of the plurality of demodulation reference signal ports and a second set of demodulation reference signal resource elements in a second symbol of the control resource set correspond to a second demodulation reference signal port of the plurality of demodulation reference signal ports, wherein the first symbol is different from the second symbol and the first demodulation reference signal port is different from the second demodulation reference signal port; and
  - decode the downlink control channel based at least in part on the determining.

29. The apparatus of claim 28, wherein the instructions are further executable by the processor to cause the apparatus to:
- determine, based at least in part on the configuration message, that a set of control resource elements within the first symbol or the second symbol of the control resource set correspond to both the first demodulation reference signal port associated with a first layer and the second demodulation reference signal port associated with a second layer.

* * * * *